US011042824B2

(12) United States Patent
Devarakonda et al.

(10) Patent No.: US 11,042,824 B2
(45) Date of Patent: Jun. 22, 2021

(54) CONTROLLING INVENTORY IN A SUPPLY CHAIN

(71) Applicant: Noodle Analytics, Inc., San Francisco, CA (US)

(72) Inventors: Sivantha Devarakonda, San Ramon, CA (US); Mahriah Elizabeth Alf, South San Francisco, CA (US)

(73) Assignee: Noodle Analytics, Inc., San Francisco, CA (US)

( * ) Notice: Subject to any disclaimer, the term of this patent is extended or adjusted under 35 U.S.C. 154(b) by 45 days.

(21) Appl. No.: 16/731,851

(22) Filed: Dec. 31, 2019

(65) Prior Publication Data
US 2020/0210947 A1 Jul. 2, 2020

Related U.S. Application Data

(60) Provisional application No. 62/787,013, filed on Dec. 31, 2018.

(51) Int. Cl.
G06Q 10/06 (2012.01)
H04W 4/12 (2009.01)
(Continued)

(52) U.S. Cl.
CPC ..... G06Q 10/06375 (2013.01); G05B 13/028 (2013.01); G06F 3/0486 (2013.01); G06F 3/04883 (2013.01); G06N 20/00 (2019.01); G06Q 10/0635 (2013.01); G06Q 10/06312 (2013.01); G06Q 10/06393 (2013.01); G06Q 10/087 (2013.01); G06Q 10/0834 (2013.01); G06Q 10/0838 (2013.01); G06Q 10/08355 (2013.01); G06Q 30/0205 (2013.01); G06Q 30/0206 (2013.01); G06Q 50/04 (2013.01); G06Q 50/28 (2013.01); H04W 4/12 (2013.01); G06Q 10/083 (2013.01)

(58) Field of Classification Search
CPC ....... G06Q 10/06375; G06Q 10/06312; G06Q 10/083
See application file for complete search history.

(56) References Cited

U.S. PATENT DOCUMENTS

2009/0043637 A1* 2/2009 Eder ................ G06N 7/005 705/35
2010/0179930 A1* 7/2010 Teller ................ G06N 20/00 706/12

(Continued)

Primary Examiner — A. Hunter Wilder
(74) Attorney, Agent, or Firm — Schwegman Lundberg & Woessner, P.A.

(57) ABSTRACT

Methods and systems for controlling inventory in a supply chain are described. The system receives supply chain data including input signals comprising operational plans and observed supply chain operational metrics. The system automatically generates predicted supply chain operational metrics including a value at risk that is predicted for a product. The system automatically infers causal factors including a shipment of the product. The causal factors impact the predicted supply chain operational metrics. The system communicates a user interface for shipments of the product and the system receives input causing a change to a shipment of the product impacting the predicted supply chain operational metrics including the value at risk for the first product.

13 Claims, 36 Drawing Sheets

(51) Int. Cl.
*G06Q 10/08* (2012.01)
*G06N 20/00* (2019.01)
*G05B 13/02* (2006.01)
*G06Q 30/02* (2012.01)
*G06Q 50/04* (2012.01)
*G06Q 50/28* (2012.01)
*G06F 3/0486* (2013.01)
*G06F 3/0488* (2013.01)

(56) References Cited

U.S. PATENT DOCUMENTS

2015/0324715 A1* 11/2015 Nelson .................. G06Q 10/06 705/7.28
2018/0357714 A1* 12/2018 So .......................... G06N 5/022

* cited by examiner

1100

| ACTION RECOMMENDATIONS | | | |
|---|---|---|---|
| ACTION RECOMMENDATION 1106 | | 1108 | 1110 1112 |
| ACTION NO | ACTION DESCRIPTION | PVI | VALUE AT RISK | PRODUCT |
| 1. | EXPEDITE OUTBOUND SHIPMENT | $5,225.00 | $8,200.00 | Q7XT01000 |
| ACTION RECOMMENDATION | | | |
| ACTION NO | ACTION DESCRIPTION | PVI | VALUE AT RISK | PRODUCT |
| 2. | REALLOCATE QTY OF OUTBOUND SHIPMENT | $2,925.00 | $8,200.00 | Q7XT01000 |
| ACTION RECOMMENDATION | | | |
| ACTION NO | ACTION DESCRIPTION | PVI | VALUE AT RISK | PRODUCT |
| 3. | RESCHEDULE PRODUCTION OF PRODUCT | $2,812.00 | $8,200.00 | Q7XT01000 |

STOCK TRANSFER REQUEST

PRODUCT IDENTIFIER (1112)
Q7XT01000

OUTBOUND NODE (1324)
XYZ HUB (1234)

INBOUND NODE (1326)
ABCD (1234)

SHIP DATE (1328)
2019-05-11

RECEIPT DATE (1330)
2019-06-13

SHIPMENT ID (1332)
12345678

SHIP QUANTITY (1334)
7104

STATUS (1336)
CONFIRMED

COMMIT EXPEDITE (1327)
☐

EXPIDITE (1323)
☒

REALLOCATE WEEKLY OUTBOUND SHIPMENTS — 1402

WEEK — 1403
05/04/2018

OUT NODE — 1324
FROM - XYZ HUB

PRODUCT — 1112
Q7XT01000

| IN NODE — 1326 | DAYS OF SUPPLY — 1412 | INVENTORY QUANTITY — 1414 | VALUE AT RISK — 1110 | SHIP QTY — 1334 | % — 1420 | NEW QTY — 1422 | NEW % — 1424 |
|---|---|---|---|---|---|---|---|
| CRUX (123) | 28 | 7020 | $0.00 | 3000 | 69.3% | 3000 | 69.3% |
| ABCD (1234) | -11 | -500 | $11,800 | 1000 | 23.1% | 1000 | 23.1% |
| AJ (4567) | 63 | 252 | $0.00 | 330 | 7.6% | 330 | 7.6% |

OUTBOUND SHIPMENTS CHANGE

| PRODUCT | SHIP DATE | OUTBOUND NODE | INBOUND NODE | SHP QTY | NEW QTY |
|---|---|---|---|---|---|
| Q7XT01000 | 2019-05-11 | XYZ HUB (1234) | CRUX (123) | 3000 | 2000 |
| | | | ABCD (1234) | 1000 | 2000 |

COMMIT NEW QUANTITIES

REMOVE

FIG. 13E

REALLOCATE WEEKLY OUTBOUND SHIPMENTS

1400 ▲

| WEEK 1403 | OUT NODE 1324 | PRODUCT 1112 |
|---|---|---|
| 05/04/2018 | FROM - XYZ HUB | Q7XT01000 |

| IN NODE 1326 | DAYS OF SUPPLY 1412 | INVENTORY QUANTITY 1414 | VALUE AT RISK 1110 | SHIP QTY 1334 | % 1420 | NEW QTY 1422 | NEW % 1424 |
|---|---|---|---|---|---|---|---|
| CRUX (123) | 28 | 7020 | $0.00 | 3000 | 69.3% | 2000 | 46.2% |
| ABCD (1234) | -11 | -500 | $0.00 | 1000 | 23.1% | 2000 | 46.2% |
| AJ (4567) | 63 | 252 | $0.00 | 330 | 7.6% | 330 | 7.6% |

PRODUCTION SCHEDULE CHANGE — 1552

| PRODUCTION ORDER 1556 | PRODUCT IDENTIFIER 1112 | PRODUCTION RESOURCE 1508 | PRODUCTION DATE 1558 | PRODUCTION QTY 1560 |
|---|---|---|---|---|
| 9876543210 | Q7XT01000 | X999AB | 2019-05-08 TO 2019-05-01 | 3800 |

COMMIT SAME RESOURCE — 1555

REMOVE — 1554

1550

CONTROLLING INVENTORY IN A SUPPLY CHAIN

RELATED APPLICATIONS

This application claims the priority benefit of U.S. Provisional Application No. 62/787,013, filed Dec. 31, 2018, incorporated by reference in its entirety.

TECHNICAL FIELD

This disclosure relates to the technical field of data processing and more particularly to controlling inventory in a supply chain.

BACKGROUND

Highly dynamic business environments present several technical challenges to Enterprise Resource Planning (ERP). In complex and fast-moving supply chains, in industries like retail, food, beverage and other consumer packaged goods, planners typically have limited predictive insight into causal factors across the value stream driving customer fulfillment issues. Even though planners and operational teams may have intuition and extensive experience on the underlying factors, they do not have access to systematic intelligence that quantifies the financial impact of the various actions and are, therefore, unable to prioritize the right action, at the right time, on the right product line or category depending on their function in the supply chain planning process. Example problems with current supply chain planning systems include: 1) information and tools, that supply chain planners have at their disposal, not providing them with relevant insight into a root cause of an issue, its context, or its propagation; 2) information that is voluminous and noisy indicators leading to long processing time by supply chain planners, resulting in an insufficient time to act or prioritize; 3) information and tools, at the planner's disposal, that do not facilitate prioritizing actions based on financial metrics or other objective metrics that are beneficial to the business and its operations; 4) information and tools, at the planner's disposal, that do not provide a way of measuring and/or understanding the impact (fiscal or operational) of taking a specific sequence of actions, resulting in unknowingly taking actions that are counter to the desired global objective; and 5) information and tools, at the planner's disposal, that isolate planners to focus on global objectives within their own operational silos rather than the objectives of the overall enterprise/business.

SUMMARY

This disclosure relates to three aspects of a supply chain including a first aspect for predicting supply chain performance, a second aspect for controlling inventory in the supply chain, and a third aspect for controlling production resources in the supply chain, as set out below.

According to the first aspect of the supply chain, predicting a supply chain performance is described. A machine-learning application, previously trained with supply chain training data, receives supply chain data including a delivery date of a product. The machine-learning application automatically generates predicted supply chain operational metrics based on the supply chain data. The predicted supply chain operational metrics provide a meaningful context for making decisions. For example, the predicted supply chain operational metrics include a value at risk that is predicted for the product. The machine-learning application automatically infers causal factors that impact the predicted supply chain operational metrics including the value at risk that is predicted for the product. Finally, the machine-learning application generates action recommendations for the supply chain. Each action recommendation includes a predicted value impact for implementing the action recommendation, a sequence of actions impacting the delivery date of the product and the value at risk. The action recommendations are selectable for execution in a semi-autonomous mode or automatically executed in a fully-autonomous mode.

According to the second aspect of the supply chain, controlling inventory in the supply chain is described. The machine-learning application, previously trained with supply chain training data, receives supply chain data. The machine-learning application automatically generates predicted supply chain operational metrics across a plurality of nodes of the supply chain. The predicted supply chain operational metrics include a value at risk that is predicted for a product. The predicted supply chain operational metrics provide a meaningful context for controlling inventory in the supply chain. The machine-learning application automatically infers causal factors impacting the predicted supply chain operational metrics and communicates, over a network, a user interface for shipments of the product. Finally, the machine-learning application receives input causing a change to a shipment of the product. The change to the shipment of the product impacts the predicted supply chain operational metrics including the value at risk for the product.

According to the third aspect of the supply chain, controlling production resources in the supply chain is described. A machine-learning application, previously trained with supply chain training data, receives supply chain data. The machine-learning application automatically generates predicted supply chain operational metrics across a plurality of nodes of the supply chain. The predicted supply chain operational metrics include a value at risk associated with a scheduling of a production run. The scheduling of the production run includes a scheduling of a production of the first product with a production resource. The machine-learning application automatically infers causal factors that impact the predicted supply chain operational metrics. The causal factors including a change to a utilization of the first production resource. The machine-learning application communicates a user interface including user interface elements corresponding to production runs being scheduled on the production resource. The user interface includes user interface elements representing a scheduling of the production run associated with the value at risk. The machine-learning application receives input, over the network, causing a change to a utilization of the production resource impacting the predicted supply chain operational metrics including the value at risk associated with the scheduling of the first production run.

A problem to be solved includes how to provide intuitive and easy to use workflows including decision support processes to supply chain planners who analyze their own respective silos of supply chain data to make decisions in a global supply chain system based on non-intuitive (e.g., tabular) data. The solution to the problem is to combine machine learning with real-time supply chain data to cause decision making processes for supply chain planners to be presented in electronic user interfaces including contextual data that is normalized, visually intuitive, and value-centered. The contextual data includes, at least, predicted supply chain operational metrics including an alert metric, a value at risk metric, an inventory days of supply metric, a fill rate metric, a capacity metric, and other metrics described below. For example, the alert metric includes alerts for product families and/or products and the value at risk metric includes a value at risk for the product families and/or the products.

BRIEF DESCRIPTION OF THE DRAWINGS

To easily identify the discussion of any particular element or act, the most significant digit or digits in a reference number refer to the figure number in which that element is first introduced.

FIG. 11A illustrates an action recommendations user interface, according to an embodiment;

FIG. 13B illustrates a stock transfer request user interface, according to an embodiment;

FIG. 13D illustrates a reallocate outbound shipment user interface, according to an embodiment;

FIG. 13E illustrates an outbound shipments change user interface, according to an embodiment;

FIG. 13F illustrates the reallocate outbound shipment user interface, according to an embodiment;

FIG. 14B illustrates a production schedule change user interface, according to an embodiment:

DETAILED DESCRIPTION

Figure 1:
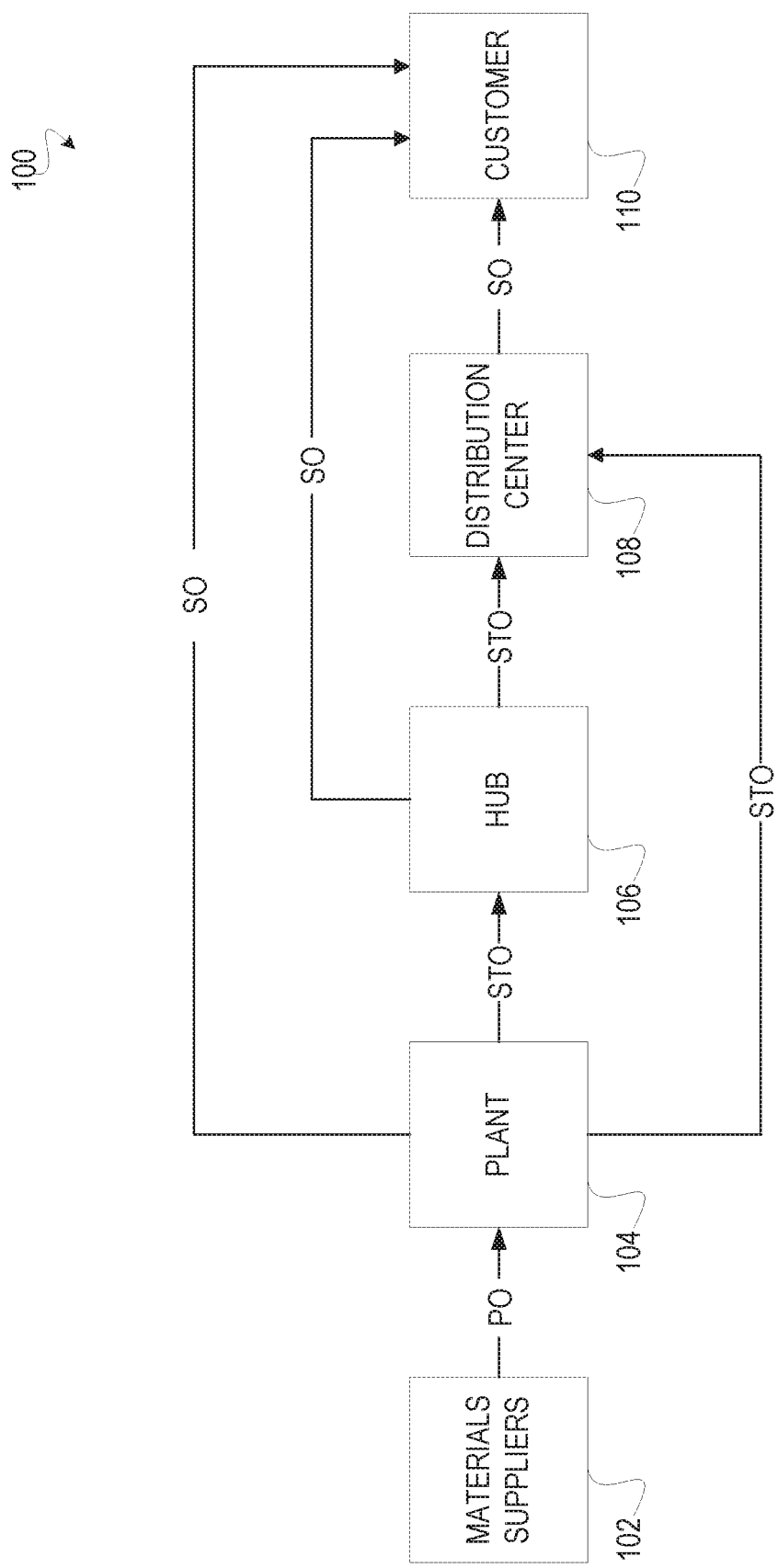
FIG. 1 is a block diagram illustrating a supply chain, according to an embodiment.

The example systems disclosed herein seek to address problems in fast moving supply chains with complex planning processes and tools in use.

An example system includes electronic components configured to receive planning and operational supply chain time series data at varying frequencies, wherein the input signals are suitable for measuring planning and operational metrics across a supply chain at various points in time and process to 1) predict and forecast critical supply chain operational metrics; 2) infer causal factors; and 3) provide action recommendations.

The prediction and forecasting of critical supply chain operational metrics include predicting and forecasting metrics across multiple nodes (e.g., physical locations such as warehouses, distribution/logistics centers, production plants etc.) of a supply chain network. The predicting and forecasting is performed at various hierarchical levels (e.g., product category, geo-location, customers, distribution centers, hubs, logistic centers, customer locations, geography, etc.) for product lines including products referred to as stock keeping units (SKUs) and over forward-looking time horizons (e.g., weeks/months/years). System parameters measured and predictions include, but are not limited to, a fill-rate, service levels, inventory metrics, demand forecasts, forecast attainment, and value at risk. The fill-rate is defined as a fraction of customer demand (e.g., sales orders) met through immediate stock availability (e.g., without backorders or lost sales) at forward-looking time horizons. Service levels are defined as the expected probability of not receiving a "stock out" message responsive to a request for a product. Inventory metrics include various inventory-level metrics including a days of supply, inventory turns, delta-to-target stock metric, a safety stock metric, and the like. Demand forecasts predict the amount of product being demanded at a future time. Demand forecasts, in turn, facilitate predicting inventory levels. For example, inventory levels may be predicted by taking the amount of product available at a particular node at a specific point in time, adding the number of products (e.g., production in) being shipped into the node, and subtracting the number of products (e.g., demand out) being shipped out of the node.

Forecast attainment is defined with respect to a shipped product or ordered products. Forecast attainment for shipped products is defined as a shipped quantity of products divided by forecasted quantity of shipped products. Forecast attainment for ordered products is defined as an ordered quantity of products divided by forecasted quantity of ordered products. In addition, forecast attainment is sometimes referred to as bookings-to-forecast ratio. The value at risk is a predicted composite comprised of: 1) lost sales (in case of low stock (backorders or lost sales)); 2) inventory holding costs that accrue for stock that is produced and waiting as inventory to be filled responsive to receiving purchase requisitions and orders for the stock; 3) expedited costs that accrue because of a low quantity of stock in one location in the supply chain and a high quantity of stock in another location in the supply chain; liquidation costs associated with dispensing of stock that is not sold; and other operational costs (e.g., production resource maintenance, production resource repair, production resource replacement, production resource labor). 4. Liquidation costs due to expiration of inventory or constituent materials to produce the product; 5) Discounting or remarketing costs due to price reduction in order to move inventory off the shelf/reduce inventory holding.

The inferring of causal factors includes understanding the drivers that impact the above defined predicted supply chain operational metrics across the hierarchical nodes in the supply chain distribution network. The capability to infer causal factors provides planners insight, quantitative measures via a visual interfaces and electronic media, and action controls for impacting the above defined predicted supply chain operational metrics in a meaningful way and quantitatively measurable way.

The provision of action recommendations includes providing action recommendations that include predicted value impacts (e.g., improvement in service level or operational cost reduction) associated with actions (financial/operational) directed at shipment of products in the supply chain or production of products on production resources in the supply chain. For example, each action recommendation may include a future-looking quantified cost-benefit analysis (financial and operational) that maximizes business value (or a specific objective) associated with an action path for shipping or producing products. Accordingly, predicted value impacts associated with one or more action recommendations may provide the user (planners, etc.) an ability to simulate various scenarios and understand an impact to a value at risk without actually executing or committing a specific set of actions in the real-time execution engines. That is, comparing predicted value impacts provides the users with the opportunity to perform scenario simulation prior to taking a decision. For example, a first set of action recommendations (each including a predicted value impact) provides a user with an opportunity to perform scenario simulation prior to taking the same decision over various time-horizons (e.g., 1 day from today, 2 days from today, etc.). Further for example, a second set of action recommendations may provide a user with the ability to simulate a multitude of scenarios taking various expedite actions (as described later in this document) to understand the impact of a particular action recommendation on a value at risk that is being predicted and then choose the best possible action recommendation to minimize the value at risk. Further for example, a third set of action recommendations may provide a user with the ability to simulate various scenarios by taking various inventory allocations (as described later in this document) to understand the impact of a particular action recommendation on a value at risk being predicted and then choose the best possible action to minimize the value at risk.

To these ends, there are provided methods and systems, according to various example embodiments, that may: 1) identify root cause information based on instantaneous, real-time or near real-time supply chain information and present the root cause information to specific users as contextualized information (e.g., key performance indicators in supply chain such as lead-time changes or production down-time) at various functional locations within a system; 2) provide prognostic alerts to users based on the causal factors, predictive indicators of degradation in key performance metrics across the supply chain network; 3) predict key underlying system parameters and key performance metrics based on variation introduced at different network nodes: 4) recommend an action or a sequence of actions to empower users to choose workflows that improve operational and/or financial key performance metrics; and 5) calculate value at risk for a range of controllable action sequences and prioritize this information. The above information may be presented to users via electronic user interfaces and other media that are normalized, visually intuitive, and value centered. In addition, the above information is fed back into real-time execution systems within the user domain.

The example methods and systems may function in a manual mode, a semi-autonomous mode, or a fully-autonomous mode. The manual mode receives user input (e.g., via selection(s) of user interface elements from one or more user interfaces) (e.g., user data) causing an execution of an action sequence including one or more actions. Each action sequence is executed responsive to its selection and in accordance with real-time information. The manual mode may be utilized to receive user input for causing action sequences effecting the movement of products in the supply chain or effecting production of products in the supply chain. For example, the manual mode may receive user input that causes a change to a means of shipping a product, or a change to a quantity of product shipped, or a change to a utilization of one or more production resources used for producing a product.

The semi-autonomous mode receives user input causing selection of an action recommendation from a set of action recommendation actions. The action recommendations may be prioritized according to a value at risk. Each action recommendation includes an action sequence including one or more actions that, if executed, eliminates or significantly reduces the value at risk. Each action recommendation is executed responsive to its selection in accordance with real-time information. The semi-autonomous mode may be utilized to select an action recommendation including action sequences effecting the movement of products in the supply chain or effecting production of products in the supply chain. For example, the semi-autonomous mode may be utilized to change to a means of a shipment of a product, or to change a quantity of product shipped, or to change a utilization of one or more production resources for producing the product.

The fully-autonomous mode operates with minimal user intervention. For example, the fully-autonomous mode may be turned on to automatically and periodically select an action recommendation based on an optimization of a system objective function (related to key performance metrics). The system objective function may be utilized for driving operational and financial behavior of an organization for a product. If for example, a value at risk associated with an action recommendation for a product is greater than a predetermined value, then the action recommendation may be executed. Also, if for example, a predicted value impact associated with an action recommendation for a product is greater than a predetermined value, then the action recommendation may be executed. The fully-autonomous mode may be utilized to select an action recommendation from a set of action recommendations. The action recommendations include action sequences affecting the movement of products in the supply chain or affecting production of products in the supply chain.

Example methods and systems may continuously learn from execution of the above described action sequences, whether initiated in the manual mode, semi-autonomous mode or fully-autonomous mode. For example, the methods and systems may monitor the efficacy of the action sequences to generate an adjustment to an action sequence, automatically modify the corresponding action recommendation based on the adjustment or generate a new action recommendation based on the adjustment. The adjustment may be generated by learning from past behavior and identifying changes to action sequences that would further maximize the reward or minimize value at risk (or the key operational metric).

FIG. 1 is a block diagram illustrating an example supply chain 100, which may be managed by an automated supply chain intelligence system. The supply chain 100 is defined as a sequence of processes involved in the production and distribution of a product. The automated supply chain intelligence system may manage one or more sequences of processes involved in the production and distribution of a product. In some example embodiments, the automated supply chain intelligence system may operate to predict fill rates, service levels, inventory performance, demand forecasts, forecast attainment, value at risk, as well as infer root causes and recommended prescriptive action for planners that manage fast-moving supply chains, such as the supply chain 100.

The example supply chain includes nodes in the form of a materials supplier 102, a plant 104, a hub 106 and a distribution center 108. The material suppliers 102 fulfill material purchase orders (POs) received from a plant 104, such fulfillment including a specific lead time (e.g., five weeks). The plant 104 executes a process order (e.g., production) to produce products (e.g., stock), fulfils stock transfer orders to the hub 106 and the distribution center 108, each of these fulfillments in turn having their respective lead times. The plant 104 furthermore may fulfill direct sales orders for products to a customer 110, again with a specific lead time. Likewise, the hub 106 may fulfill the stock transfer order to the distribution center 108 for moving products. The distribution center 108 in turn may fulfill a sales order in delivering products to the customer 110. Each of the materials purchase orders, process orders, stock transfer orders and sales orders have respective lead times, and management of these lead times presents a number of logistical and technical challenges, particularly when delays are introduced into the supply chain by unforeseen circumstances.

Figure 2:
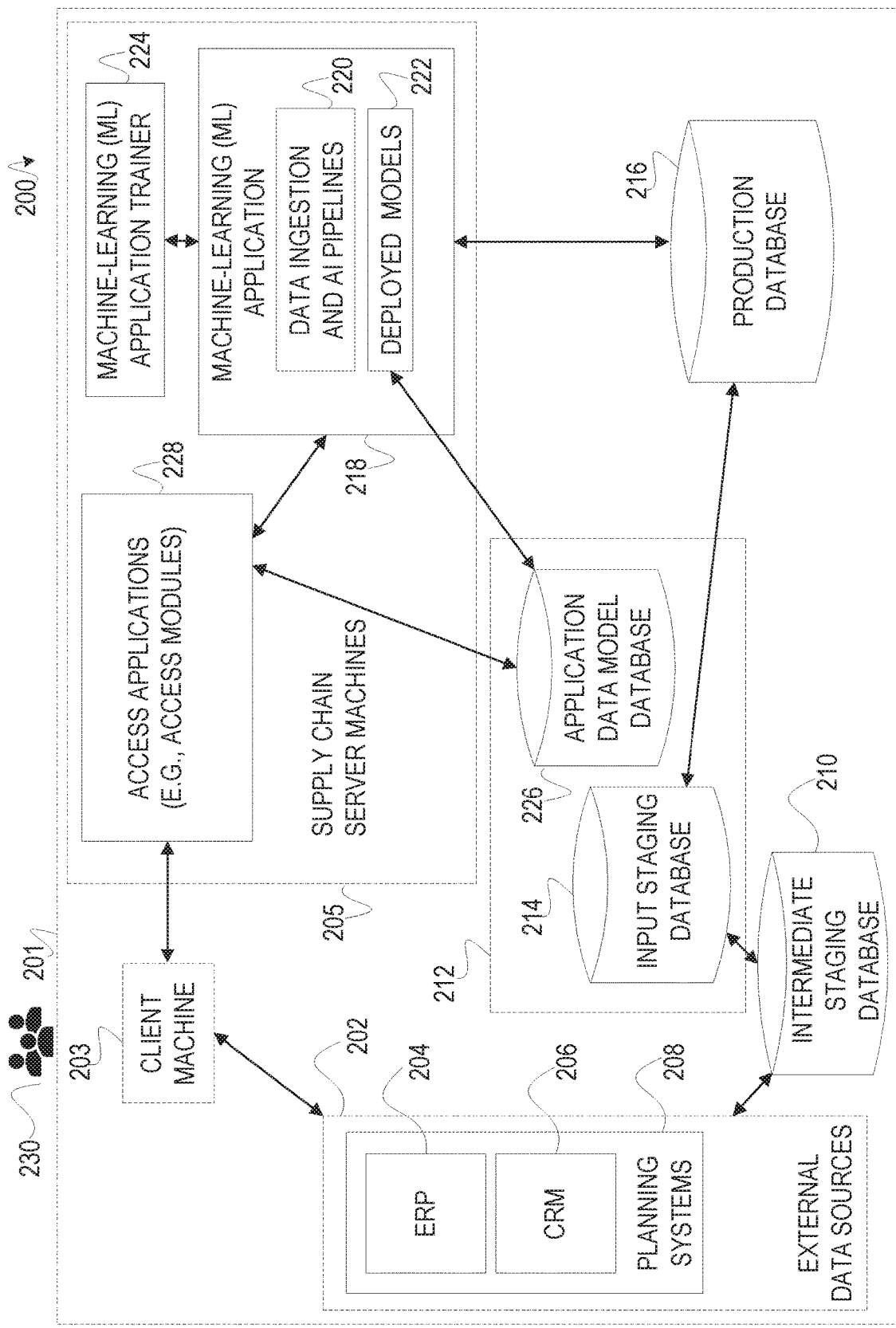
FIG. 2 is a block diagram illustrating a supply chain intelligence system, according to an embodiment.

FIG. 2 is a block diagram illustrating a supply chain intelligence system 200, according to an embodiment. The supply chain intelligence system 200 includes a networked system 201 that includes network entities in the form of one or more client machines 203 that are communicatively coupled with one or more supply chain server machines 205 that, in turn, are communicatively coupled with external data sources 202, that, in turn, are communicatively coupled with a relational database system 212, that, in turn, is communicatively coupled with an intermediate staging database 210, that, in turn, is communicatively coupled with a production database 216.

The networked system 201 may be embodied as a networked computing environment where the client machines 203, the supply chain server machines 205, the external data sources 202, the relational database system 212, the intermediate staging database 210, and the production database 216 are interconnected through one or more public networks (e.g., Vendors that provide Cloud Computing Platform & Services or Super-computing as a service over the web. Web Services, and the like) and/or proprietary networks. Accordingly, the arrows between the network entities are only suggestive of the possible interconnections between the network entities included in the networked system 201.

The relational database system 212 may include an input staging database 214 and an application data model database 226. The relational database system 212 provides an interface between the external data sources 202 (via the intermediate staging database 210), the supply chain server machines 205, and the production database 216, as described further below.

The external data sources 202 may receive and process information pertaining to a supply chain, such as the supply chain 100 shown in FIG. 1. These external data sources 202 include planning systems 208 including an enterprise resource planning (ERP) system 204 and a customer resource planning (CRM) system 206. Various supply chain information items, which will be discussed in further detail below, are extracted from the external data sources 202, and stored in an intermediate staging database 210, before being transferred to the relational database system 212. Here, the supply chain information is staged within the input staging database 214, before being transferred to the production database 216.

The supply chain server machines 205 host a machine-learning (ML) application 218, a machine-learning (ML) application trainer 224, and access applications 228. The machine-learning (ML) application 218 (e.g., model) may access the production database 216, and user data ingestion and AI pipelines 220 to ingest and process supply chain information from the production database 216. The machine-learning application 218 also includes various deployed models 222 that may be selected and deployed, as further described below. The output of the deployed models 222 may be stored within the application data model database 226.

The access applications 228 provide an interface between the supply chain planners 230 and the machine-learning application 218. For example, the machine-learning application 218 includes deployed models 222 that generate output that is stored within the application data model database 226, which, in turn, may be accessed, via the access applications 228 and the client machines 203, by the supply chain planners 230. In addition, the machine-learning application 218 is accessible, via the access applications 228 and the client machines 203, to the supply chain planners 230.

The supply chain planners 230 may include demand planners, inventory managers, product brand managers, operations managers and production resource managers. The inventory managers control inventory (e.g., SKU, products) in the supply chain 100. For example, the inventory managers may move inventory that is located at the plant 104, the hub 106, or the distribution center 108, as shown in FIG. 1, to another plant 104, hub 106, or distribution center 108. Returning to FIG. 2, for example, the inventory manager may expedite a shipment of a product (e.g., first action)

and/or reallocate quantities of products being shipped in outbound shipments (e.g., second action).

The resource planners control production resources that produce products (identified by their stock keeping units (SKUs)). A production resource may include one or more machines, one or more tools, one or more employees, or any combination thereof. The production resources may be located at the plants 104 in the supply chain 100, as shown in FIG. 1. In addition, the production resources may be located at the hubs 106 or distribution centers 108 in the supply chain 100, as shown in FIG. 1. Returning to FIG. 2, the resource planner may reschedule a production (e.g., production run) of a product (e.g., lipstick, red) on a first production resource (e.g., third action) and/or reschedule a production of a product from the first production resource to a second production resource (e.g., fourth action) and/or increase a quantity of the production of the product on the first production resource (e.g., fifth action).

Figure 3:
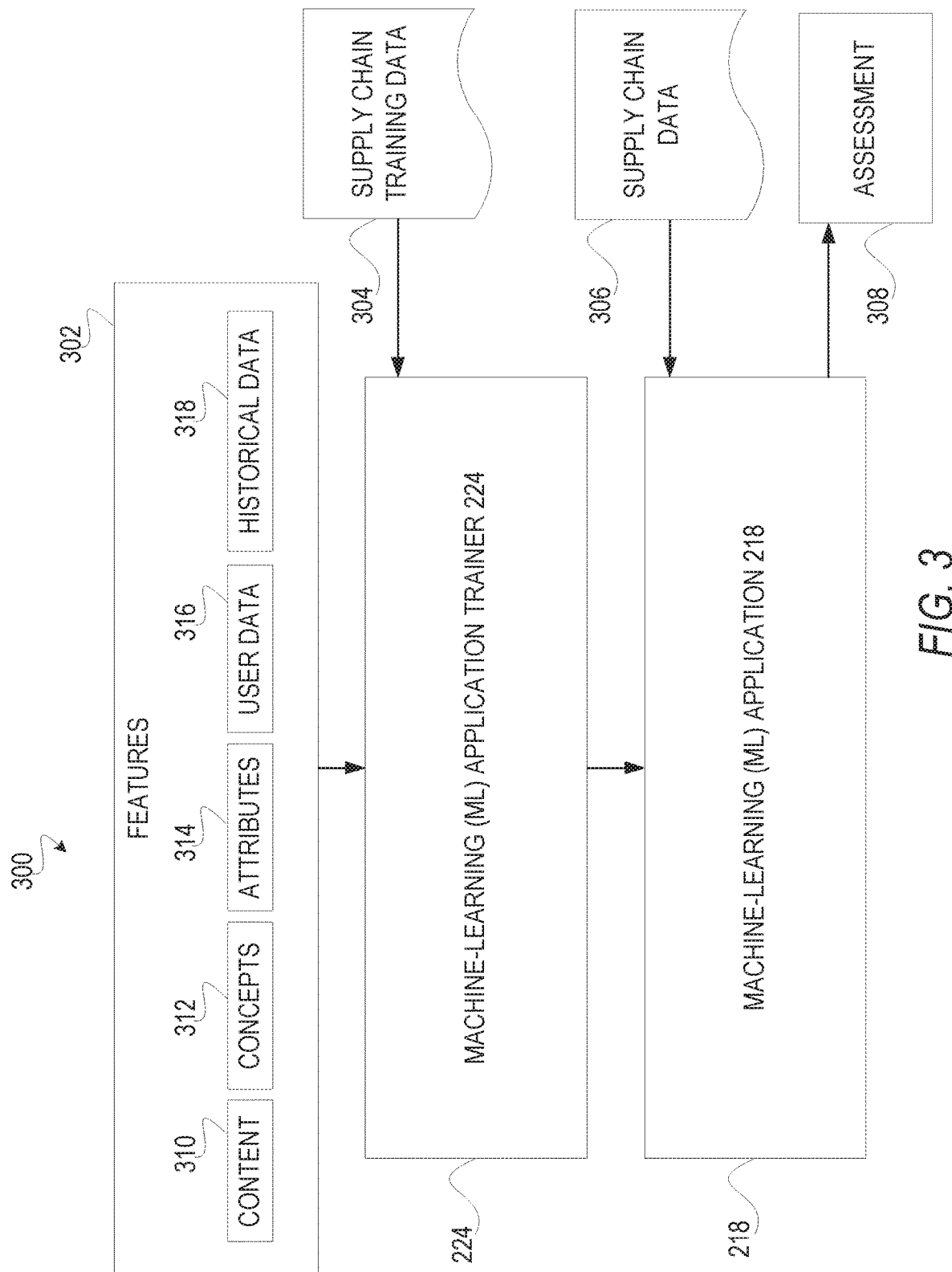
FIG. 3 is a block diagram illustrating training and use of a machine-learning program, according to an embodiment.

A machine-learning application trainer 224 operates to train the machine-learning application 218, as described further in FIG. 3.

FIG. 3 illustrates training and utilization 300, according to an embodiment, of a machine-learning program. In some example embodiments, machine-learning programs, also referred to as machine-learning algorithms or tools, are used to perform operations automated in supply chain management and optimization.

Machine learning is a field of study that gives computers the ability to learn relationships that are not explicitly programmed. Machine learning explores the study and construction of algorithms, also referred to herein as tools, that may learn from existing data and make predictions about new data. Such machine-learning tools operate by building a model (e.g., machine-learning application) from supply chain training data 304 in order to make data-driven predictions or decisions expressed as outputs or assessment 308. The supply chain training data 304 includes data generated by supply chains (e.g., supply chain data 306). In one embodiment, the supply chain training data 304 may include supply chain data 306 taken from one or more supply chains that are similar to the supply chain 100. In another embodiment, the supply chain training data 304 may include observed supply chain operational metrics observed in the supply chain 100 and operational plans. In one embodiment, the supply chain training data 304 may include observed supply chain operational metrics fed to the machine-learning application 218 and later recirculated as a subsequent version of the supply chain training data 304. Although example embodiments are presented with respect to a few machine-learning tools, the principles presented herein may be applied to other machine-learning tools.

In some example embodiments, different machine-learning tools may be used. For example, Logistic Regression (LR), Naïve-Bayes, Random Forest (RF), neural networks (NN), matrix factorization-based methods, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms use the supply chain training data 304 to find correlations among identified features 302 that affect an outcome.

The machine-learning algorithms of the machine-learning (ML) application 218 (e.g., model) use features 302 for analyzing the data to generate data for the application data model database 226. Each of the features 302 is an individual and measurable property of a phenomenon being observed. Choosing informative, discriminating, and independent features is important for effective operation of the machine-learning programs in pattern recognition, classification, and regression. Features may be of different types, including numeric, string, and graph. A feature may be Boolean (is_red?), discrete with multiple values (what color?) or continuous (what_wavelength?). In one example embodiment, the features 302 may include one or more of content 310, concepts 312, attributes 314, historical data 318 and/or user data 316.

The content 310 quantifies the information content of a feature 302. The information content of a feature 302 may be utilized to determine whether the feature 302 is selected to make a decision (e.g., in a decision tree). In one embodiment, the information content of a feature 302 may be defined as a measure of uncertainty in a decision minus a measure of uncertainty remaining in the decision, after including the feature 302 to make the decision. The content 310 metric facilitates making a decision sooner because the uncertainty remaining, in making the decision, may be insignificant. In one embodiment, the information content of the feature 302 may be compared with the information content of another feature 302 to select one of the features to make a decision (e.g., in a decision tree). In one embodiment, the information content of the feature 302 may be compared with a predetermined value. If, for example, the content 310 of the feature 302 is equal to or greater than a predetermined value, then the feature 302 may be selected to make a decision. In one embodiment, the content 310 may be a measurement of entropy. For example, the entropy of a decision may be measured before ("e-before") making a decision, measured after utilizing a feature 302 to make the decision ("e-after"), and subtracted to generate an "e-difference" (e.g., ("e-before")-("e-after")="e-difference"). If, for example, the "e-difference" is equal to or less than a predetermined value, then the feature 302 may be selected to make a decision.

A concept 312 categorizes features 302. For example, the concept 312 "transportation" may be utilized to classify the features 302 "number of cars," "number of trains." "number of busses," and the like. Accordingly, each of the aforementioned features 302 may be categorized with the concept 312 "transportation." In one approach, the concept 312 may refer to a design concept utilized at a concept level and the features 302 may be utilized to implement the design concept.

The attributes 314 of a feature 302 may be utilized to identify a source of the feature 302. For example, the attributes 314 may identify universal resource locater identifying a table and a column in the table from which a column of values are retrieved (e.g., each row corresponding to a row or object).

The historical data 318 may include data collected over time. For example, the historical data 318 may include data collected over time about suppliers. In one example, the historical data 318 may include whether suppliers delivered supplies early, on-time, or late. In another example, the historical data 318 may include the condition of supplies from suppliers. In another example, the historical data 318 may include suppliers lead time for a product, and the like.

The user data 316 may include data received from a user who interacts with supply chain 100. For example, the user data 316 may be data received from a supply chain planner 230 including the resource manager and/or supply chain manager, as previously described. The user data 316 received from the inventory manager may include data to expedite a shipment of the product (e.g., first action) and/or data to reallocate quantities of products being shipped in outbound shipments (e.g., second action). The user data 316 received from the resource manager may include data to reschedule a production (e.g., production run) of a product (e.g., lipstick, red) on a first production resource (e.g., third action) and/or data to reschedule a production of a product from the first production resource to a second production resource (e.g., fourth action) and/or data to increase a quantity of the production of the product on the first production resource (e.g., fifth action).

The machine-learning algorithms use the supply chain training data 304 to find correlations among the identified features 302 that affect the outcome or assessment 308. In some example embodiments, the supply chain training data 304 includes labeled data, which is known data for one or more identified features 302 and one or more outcomes, such as observing results, detecting patterns, detecting meaning, generating a summary, detecting action items, etc.

With the supply chain training data 304 and the identified features 302, the machine-learning application 218 (e.g., model) is trained by machine-learning application trainer 224. The machine-learning application 218 appraises the value of the features 302 as they correlate to the supply chain training data 304. The result of the training is the machine-learning application 218.

When the machine-learning (ML) application 218 is used to perform an assessment, supply chain data 306 is provided as an input to the machine-learning (ML) application 218, and the machine-learning (ML) application 218 generates the assessment 308 as output to the application data model database 226. Note that the supply chain data 306 is different from the supply chain training data 304 and that the supply chain data 306 may be captured in real-time as the supply chain is functioning. Note also that the supply chain data 306 may be utilized as a source of supply chain training data 304.

The features 302 for the supply chain 100 may include or be based on data included in the supply chain data 306 and/or combinations of data included in the supply chain data 306. The supply chain data 306 is described in association with FIG. 6. For example, the feature 302 may include stock levels, supplier lead times that are stated, supplier lead times that are actual, sales orders, stock transfer orders, stock transfer requests, and the like. Further for example, the feature 302 may include any combination of the stock levels, the supplier lead times that are stated, the supplier lead times that are actual, the sales orders, the stock transfer orders, the stock transfer requests, and the like.

Figure 4:
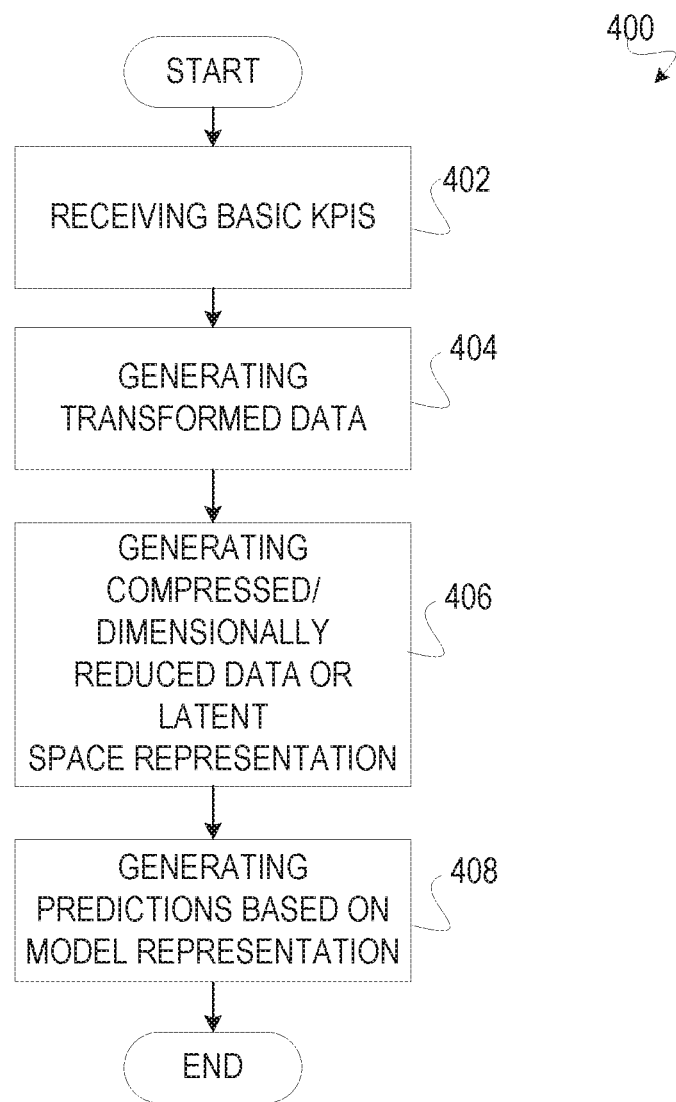
FIG. 4 is a block diagram illustrating a method, according to an embodiment, to receive and transform data.

FIG. 4 is high-level flowchart of a method 400, according to an embodiment, to receive and transform data. The method 400 provides a high-level overview of the ingestion and transformation of data. The method 400 may commence at operation 402, with a data analyst receiving basic key performance indicators (KPIs). At operation 404, the data analyst may generate transformed data based on the KPIs. At operation 406, the data analyst may generate compressed/dimensionally reduced data or a latent space representation based on the transformed data. At operation 408, the machine-learning (ML) application 218 generates predictions based on the compressed/dimensionally reduced data or the latent space representation. Further details are provided below with reference to FIG. 5. According to another embodiment, the operations 402, 404, and 406 may be fully or partially automated by utilizing one or more access applications 228 (e.g., access modules).

Figure 5:
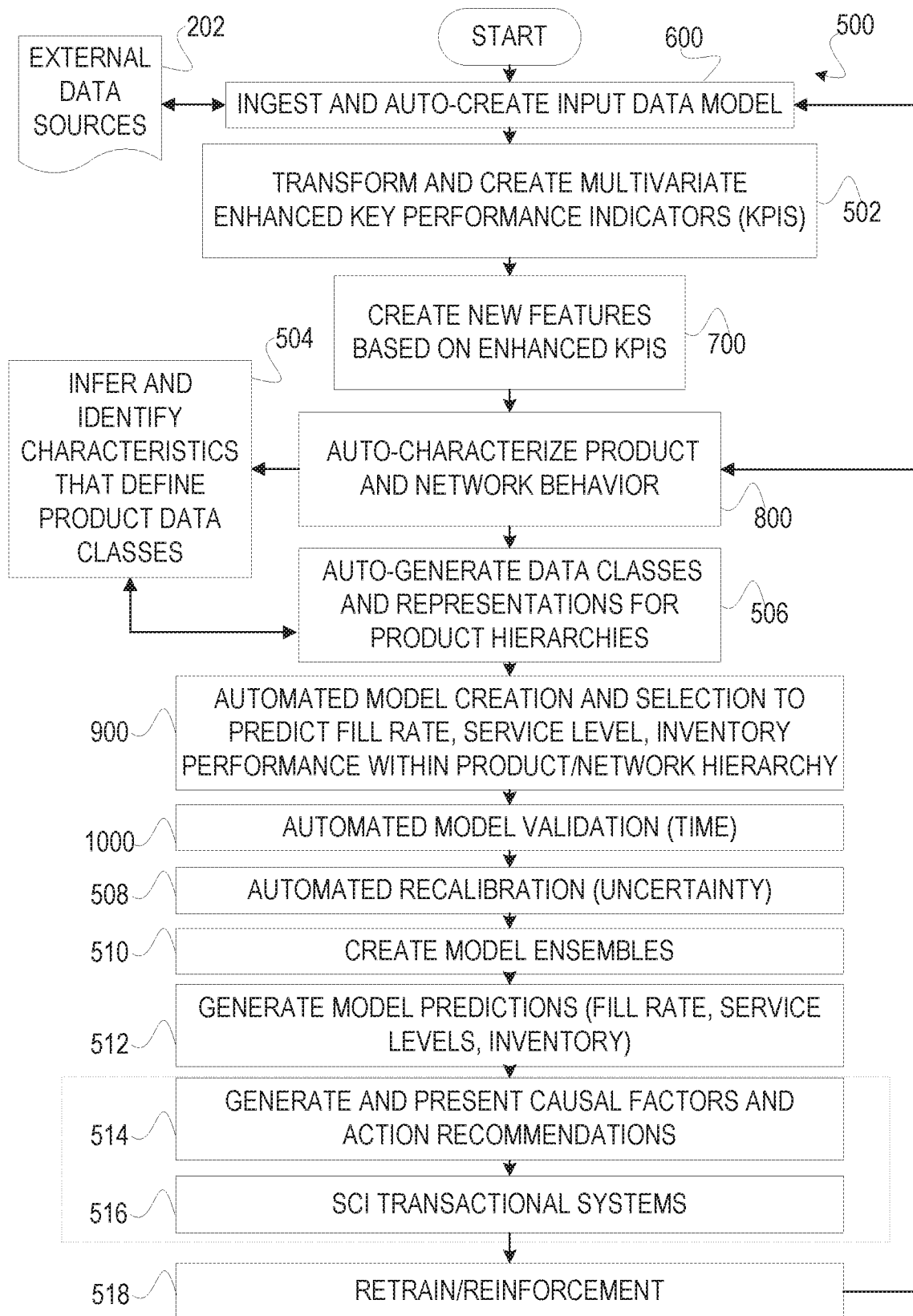
FIG. 5 is a block diagram illustrating a method, according to an embodiment, to manage a supply chain.

FIG. 5 is a flowchart illustrating a method 500, according to an embodiment, to manage a supply chain. The method 500 is performed by the automated supply chain intelligence system 200, which employs machine learning and artificial intelligence, to manage the supply chain 100. The method 500 may be used to predict fill-rate, service levels, inventory metrics, demand forecasts, forecast attainment, value at risk, as well as infer resources and recommend prescriptive action for planners in a fast-moving supply chain, such as the supply chain 100 shown in FIG. 1.

The method 500 commences at operation 600, ingesting supply chain data 306 is ingested (e.g., received) from a complex supply chain. For example, a data analyst may ingest the supply chain data 306 from the supply chain 100. The ingested supply chain data 306 relates to operational plans and observed (e.g., measured) supply chain operational metrics across the supply chain 100. The supply chain data 306 may be received from various external data sources 202, such as those described above with reference to FIG. 2. In addition to ingestion (e.g., in batches), the supply chain data 306 may be streamed, in real time, from the external data sources 202.

At operation 600, the supply chain data 306 is represented by an input data model, within the input staging database 214. For example, a data analyst may represent the supply chain data 306 as a data model within the input staging database 214. The input data model encapsulates relationships and links disparate information together in time, both as entities and as a hierarchy that reflects an actual supply chain execution sequence of the supply chain 100. The supply chain data 306 may consist of continuous signals in time, encoded entities (e.g., product codes, locations, network node numbers), textual information (e.g., the names of products, categories, users, customers), and documents containing unstructured data (e.g., schedules, agreements, marketing campaigns etc.).

At operation 502, the supply chain data 306 is ingested and transformed to create the features 302. For example, a data analyst may ingest and transform the supply chain data to create multi-variate heterogeneous features. The multi-variate heterogeneous features include but are not limited to key performance metrics (e.g., key performance indicators (KPIs)). Examples of such key performance metrics may include demand forecasts, inventory positions, production metrics, supply/demand networks, geographic hierarchies in time, etc.

At operation 700, the machine-learning application 218 modifies the features 302 (e.g., heterogeneous features) using mathematical, statistical, information theoretic transformations. Examples of the mathematical, statistical, and information theoretic transformations include log, exponent, sine or cosine moments of a feature distribution, mutual information score across multiple features, vectorization of word sequences or N-grams of word sequences and/or encoded representations of data using compression techniques or other mathematical transformations further described with reference to FIG. 7. The machine-learning application 218 modifies the features 302 to arrive at lower-dimensional representations capturing latent states within the supply chain 100, as represented by the features 302.

At operation 800, the machine-learning application 218 modifies the features 302 using the representations to learn and automatically characterize the behavior of hidden sources that generate externally observed external signals. For example, the hidden sources products A, B and C may generate similar signals at regions X, Y and Z during specific seasons. Further details regarding operations performed at operation 800 are described below with reference to FIG. 8.

At operation 506, the machine-learning application 218 may represent the behaviors as generative data models/classes that encapsulate the attributes and information needed to regenerate the observed signals. The behaviors are utilized as one or more methods to segment and categorize the observed information. These data models/classes form the basis for the first level of causal attribution, performed at operation 504, into signals that drive the system behavior across the supply chain network. In more detail, at operation 504, the machine-learning (ML) application 218 (e.g., model) iteratively operates to identify characteristics that define data classes for products.

At operation 504, the machine-learning application 218 identifies, scores, and ranks strong causal attributes that are inferred to relate significantly to the objective of interest. Representations generated at operation 506 are concatenated with the transformed heterogeneous features developed at operation 502 and with the ranked causal factors generated at operation 504 to provide synthetized and better organized information, in addition to causal attribution.

At operation 900, the machine-learning application 218 feeds this enriched data into the automated model creation to identify an optimal (or selected) set of models (e.g., machine-learning (ML) application 218) and selected features that predict key performance metrics (KPIs) that are indicative of process and operational efficiency of the supply chain networks (e.g., in supply chain 100). For example, the models may include random forest, gradient boosted machines, Bayesian hierarchical regression models, hidden Markov models, mixture models, deep learning and neural network architecture-based models) (e.g., feed-forward, recurrent, long-term short-term memory, adversarial, and the like). The machine-learning application 218 considers all such variables that directly or indirectly influence each other and the outcome of interest, examples of which include but are not limited to the predicted supply chain operational metrics in the form of service levels, fill-rates, operational expenses, cost of goods sold, inventory level metrics (safety stock, cycle stock, target stock, inventory turns, days of supply), forecast attainment, production throughput, capacity etc.

At operation 1000, the machine-learning application 218 validates the models and creates model ensembles. The operation 1000 may utilize the sub-operations described in operations 508 and 510. The operation 1000 is described in further detail in FIG. 10.

At operation 508, the machine-learning application 218 validates the models against unseen information to assess their accuracy and level of uncertainty (probabilistic) (e.g., Bayesian methods) using a variety of metrics and cross-validation techniques. The unseen data is available and could have been used for training but is intentionally not used during training for the purposes of testing model generalizability subsequent to training. Accordingly, it is essentially training data that is not used during the initial model construction and used only for model selection.

At operation 510, the machine-learning application 218 combines the models by using an objective function (e.g., value at risk encapsulating lost sales, inventory holding costs, expedite costs, etc.) that maximizes accuracy while minimizing uncertainty to derive weights of the model combinations; this weighted combination of models is referred to as an ensemble.

At operation 512, ensembles of data models are deployed by the machine-learning (ML) application 218 to generate forward-looking predictions of various KPIs/outcomes and to calibrate. For example, the machine-learning (ML) application 218 may deploy the ensembles of data models (e.g., deployed models 222) to generate predicted supply chain operational metrics as previously described.

At operation 514, the machine-learning (ML) application 218 generates these forward-looking positions of various outcomes (e.g., predicted supply chain operational metrics) and infers their underlying causal factors. In addition, machine-learning (ML) application 218 generates action recommendations based on the generated forward-looking positions and underlying causal factors. Further, the machine-learning (ML) application 218 presents the forward-looking positions and their underlying causal factors, via the access applications 228, to the functional users (e.g., supply chain planners 230) via visual media (e.g., respective user interfaces). The presentation of the forward-looking positions of various outcomes and the underlying causal factors are helpful inputs to create and explore a decision surface of possible actions that are available to the functional user (e.g., supply chain planners 230). In addition, a presentation of the forward-looking positions of various outcomes and the underlying causal factors in the context of the predicted supply chain operational metrics helps the functional user to make intelligent and insightful decisions in predicting the supply chain performance, controlling inventory in the supply chain, and controlling production resources in the supply chain. An optimization may be performed on the objective of interest/maximize the reward (e.g., value at risk, which may be a combination of lost sales, inventory holding costs, and expedite costs) at a network node or at a global level. The possible action sequences that maximize the desired objective function (based on a scored cost function/reward function) are then presented, within respective user interfaces, visually to equip a user with a set of choices based on which they may make decisions, and based on which the user, at operation 516, can authorize a specific workflow that is to be executed by the system described by interfacing and exchanging data with the real-time execution system within the user domain.

Further, at operation 516, the machine-learning (ML) application 218 may receive an authorization of a specific workflow, via the access applications 228, in a manual mode, a semi-autonomous mode, and/or a fully-autonomous mode. The utilization of the manual mode, and/or the semi-autonomous mode, and/or the fully-autonomous mode may cause the execution of one or more actions (e.g., sequence of actions). The one or more actions may impact a delivery date of a product. For example, the one or more actions may include a sequence of actions impacting the product (e.g., delivery date of the product) including a sequence of actions to expedite a shipment of the product (e.g., first action), a sequence of actions to reallocate quantities of products being shipped in outbound shipments (e.g., second action), a sequence of actions to reschedule a production (e.g., production run) of a product (e.g., lipstick, red) on a first production resource (e.g., third action), a sequence of actions to reschedule a production of a product from the first production resource to a second production resource (e.g., fourth action), and a sequence of actions to increase a quantity of the production of the product on the first production resource (e.g., fifth action). The action sequence may be described by an action description describing a set of actions including one or more actions impacting a delivery date of the product, such as those described above.

The option to operate in a manual mode may include receiving a selection and/or other user input causing the execution of the one or more actions. For example, the option to operate in a manual mode may include receiving a selection and/or other user input causing one or more actions impacting the delivery date of a product. The option to operate in a semi-autonomous mode may include receiving a selection and/or other user input that identifies an action recommendation (e.g., receiving a first selection identifying a first action recommendation) (e.g., lowest value at risk) from a set of suggested action recommendation actions prioritized by value at risk, causing the execution of one or more actions (e.g., action sequence) whereby the action sequence is then automatically executed by real-time information fed back into execution systems. The delivery date of a product may be initially received as part of an operational plan (e.g., a planned delivery date) but then changed in the manual mode or the semi-autonomous mode responsive to receiving user input from a supply chain planner 230. For example, the delivery date of the product may be changed in manual mode or semi-autonomous mode by a supply chain planner 230 including an inventory manager or a resource manager, as previously described The option to operate in fully-autonomous mode may include the optimal action sequence being executed automatically by the machine-learning (ML) application 218. For example, the machine-learning (ML) application 218 may automatically identify the first action recommendation as an optimal recommended action by identifying a predicted value impact as the highest predicted value impact from a set of predicted value impacts each associated with an action recommendation for a product in the supply chain 100. The delivery date of a product may be initially received as part of an operational plan (e.g., a planned delivery date) but then changed in the fully-autonomous mode.

The action sequence, whether executed in the manual mode, the semi-autonomous mode or the fully-autonomous mode, may include the machine-learning (ML) application 218 communicating, over a network, an electronic message to a planning system (enterprise resource planning system 204). The electronic message may cause an execution of at least a portion of the set of actions (e.g., first set of actions). For example, the action sequence may include one or more actions impacting a delivery date of the product, such as those described above. The action sequence being executed, according to an embodiment, may cause the supply chain intelligence system 200 to directly interact and transact with real-time execution systems. For example, the supply chain intelligence system 200 may directly interact and transact with an enterprise resource planning (ERP) system 204, a customer resource planning (CRM) system 206 and the like. According to an embodiment, the supply chain intelligence system 200 directly interacts and transacts within the user domain. Further details regarding operations 514 and 516 are described in FIG. 11D. The sequence of actions (e.g., action sequence) described above with reference to FIG. 5 may be executed iteratively in continuous time steps dependent on an identified execution frequency that depends on the supply chain execution frequencies.

At operation 518, the machine-learning (ML) application 218 may ingest, learn, retrain and reinforce each of the steps discussed above at a fixed frequency. For example, the machine-learning (ML) application 218 may regenerate, using the observed supply chain operational metrics, the predicted supply chain operational metrics across the plurality of nodes of the supply chain. According to one embodiment, the machine-learning (ML) application 218 tracks the actions that a user executes (e.g., manual mode, semi-autonomous mode, and/or a fully-autonomous mode), measures the benefit of the action in real-time, and feeds the actions and corresponding benefits back to the machine-learning (ML) application trainer 224 (e.g., model trainer). The machine-learning (ML) application 218 feeds the actions and the corresponding benefits back to the machine-learning (ML) application trainer 224 to further train the machine-learning (ML) application 218 (e.g., model). For example, the machine-learning (ML) application trainer 224 may further train the machine-learning (ML) application 218 (e.g., model) by again ingesting and auto-creating input data models (operation 600) with the actions and the corresponding benefits. In addition, the machine-learning (ML) application trainer 224 may further train the machine-learning (ML) application 218 by again auto-characterizing product and network behavior (operation 800) with the actions and the corresponding benefits. The supply chain intelligence system 200 feeds the actions and the corresponding benefits back to the machine-learning (ML) application trainer 224 via operation 600 and/or operation 800 to train the machine-learning (ML) application 218 to improve its prediction accuracy to make better recommendations.

Figure 6:
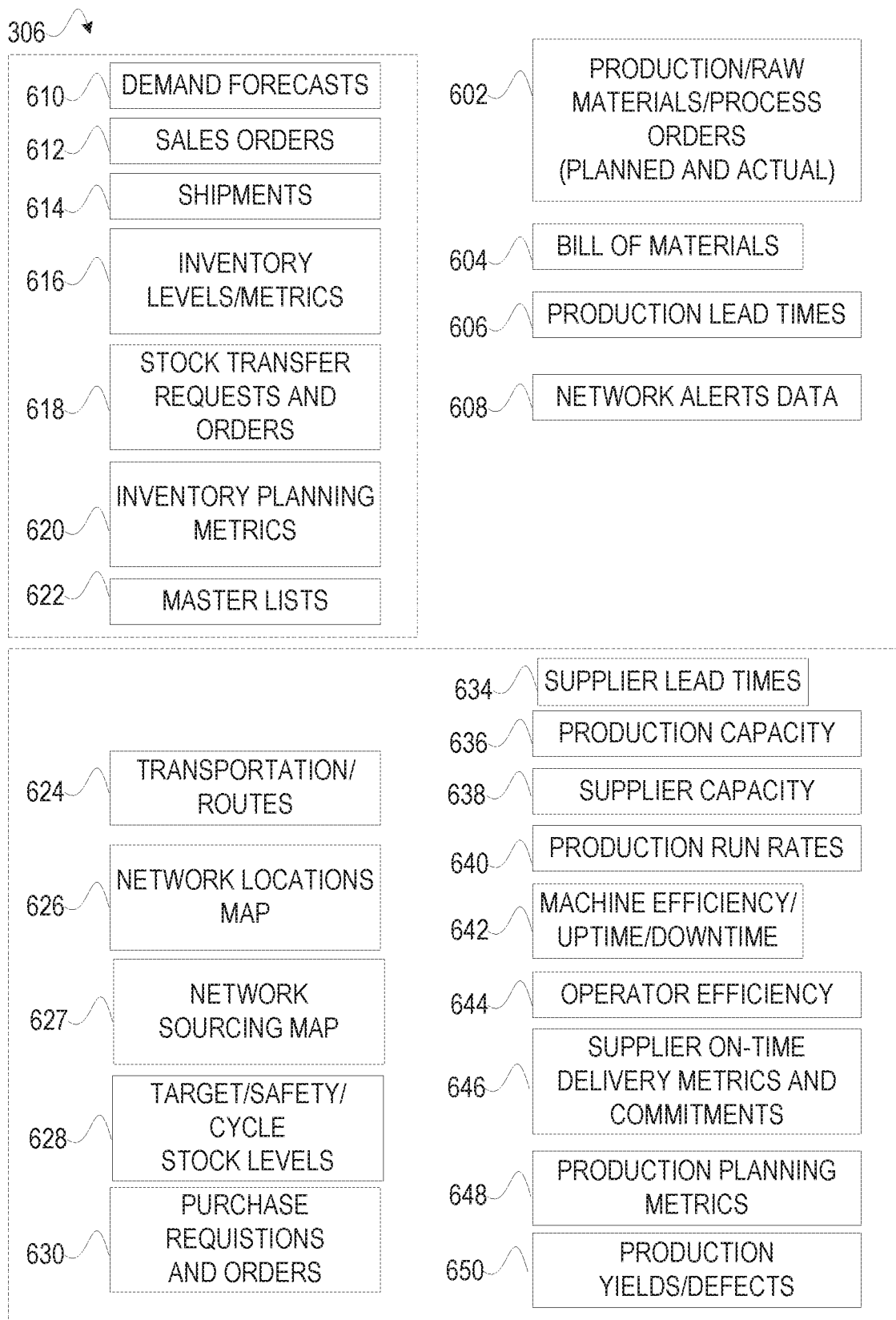
FIG. 6 is a block diagram illustrating supply chain data, according to an embodiment.

FIG. 6 is a block diagram illustrating supply chain data 306, according to an embodiment. The supply chain data 306 may be ingested to auto-create the input data model, as may be performed at operation 502. The supply chain data 306 includes operational plans, observed supply chain operational metrics, and the like.

The operational plans (e.g., operational action plans, planned operational action, etc.) may include demand forecasts 610, sales orders 612, shipments 614, inventory levels/metrics 616, stock transfer requests and orders 618, inventory planning metrics 620, master lists 622, and the like. The sales orders 612 and the shipments 614 may include a delivery date of a product.

The observed supply chain operational metrics may include information that is sensed in the real-time monitoring of a supply chain network including transportation/routes 624, network locations map 626, network sourcing map 627, target/safety/cycle stock levels 628, purchase requisitions and orders 630, and the like. The observed supply chain operational metrics may further include supplier lead times 634 (e.g., stated supplier lead times) (e.g., actual supplier lead times), real-time monitoring of production capacity 636, supplier capacity 638, production run rates 640, machine efficiency 642 (e.g., uptime/downtime), operator efficiency 644, supplier on-time delivery metrics and commitments 646, production planning metrics 648, production defects/yields 650, and the like.

The above mentioned various information items may then be consolidated into a data model that includes production/raw materials/process orders (planned and actual) 602, bill of materials 604, production lead times 606 and network alerts data 608. The network alerts data 608 may include alerts relating to demand planning, production planning, and supply network planning. It should be noted that operations at operation 502 combine data across the entire supply chain 100, and include both historic key performance indicators, as well as forward-looking predictions and targets for key performance metrics.

Figure 7:
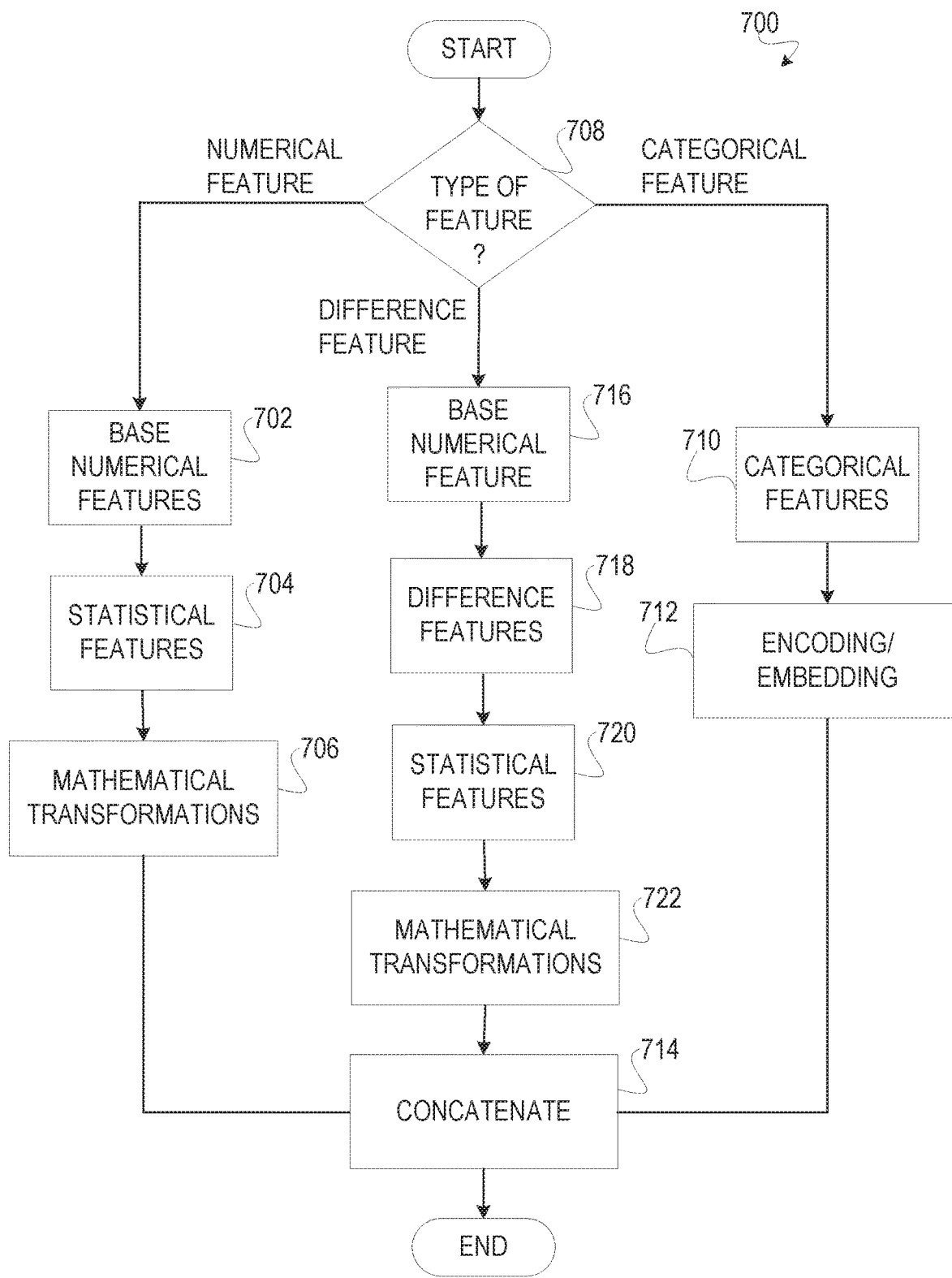
FIG. 7 is a block diagram illustrating a method, according to an embodiment, to create new features.

FIG. 7 is a flowchart illustrating various sub-operations that may be performed at operation 700 in order to create new features based on enhanced KPIs. Creating new features may include transformation of one more KPIs to make more meaningful predictions and/or to reduce the number of features. Sub-operations, in operation 700, may result in concatenating together new features including features in the form of mathematical transformations and/or encoding/embedding constructs. Concatenation may result in the formation of an N-dimensional tensor.

The flowchart commences at decision operation 708 by ingesting a feature and identifying whether the feature is a "numerical" feature, a "difference" feature, or a "categorical" feature. For example, the machine-learning (ML) application trainer 224 may ingest a feature in the form of data as illustrated in FIG. 6 (e.g., operational plans, observed supply chain operational metrics, and other types of data). If the feature (e.g., data) is "numerical," then a branch is made to operation 702, else if the feature is "difference" then a branch is made to operation 716, else if the feature is "categorical" then a branch is made to operation 710. At operation 702, base numerical features are received as input to the machine-learning (ML) application trainer 224. For example, the numeric features may include variables that utilize a continuous or an infinite number of values (e.g., miles a car has driven). At operation 704, the numeric features are registered to be utilized as statistical features. At operation 706, mathematical transformations are performed on the statistical features. For example, the mathematical transformation may include a distribution transformation (e.g., Box-Cox transformation). The mathematical transformations massage the data into a format that is better conducive to rapid machine learning. At operation 716, base numerical features are received as input to the machine-learning (ML) application trainer 224. At operation 718, the machine-learning application trainer 224 generates difference features based on the numeric features. For example, a first numeric feature may register "inventory shipped" and a second numeric feature may register "inventory produced." The machine-learning application trainer 224 may generate a difference feature (e.g., "inventory remaining") by subtracting the first numeric feature from the second numeric feature (e.g., "inventory produced"-"inventory shipped"="inventory remaining"). At operation 720, the numeric features are registered to be utilized as statistical features. At operation 722, the application trainer performs mathematical transformations on the statistical features. At operation 710, categorical features or non-numeric features are processed. For example, the non-numeric features may include variables that correspond to categories (e.g., red, blue, green) (e.g., enabled/disabled) (e.g., engine size). At operation 712, non-numeric features are encoded or embedded to make the feature suitable for application to machine learning libraries. For example, the value "red" may be encoded to the number "1," the value "blue" may be encoded to the number "2," and so forth. At operation 714, the machine-learning (ML) application trainer 224 concatenates mathematical transformations and/or encoding/embedding constructs. For example, one or more features may be concatenated together to form tensors. If, for example, a matrix is an array of numbers that forms a 2-dimensional tensor (e.g., rows and columns) (e.g., the columns correspond to features and rows correspond to values for each instance) then a tensor generally refers to the concept of a matrix to N>="3" dimensions. In some embodiments, concatenation may result in reducing the number of dimensions. Reducing the number of dimensions (e.g., feature variables), if possible, is desirable to expedite processing. For example, consider a data set illustrated as a three-dimensional cube with 1 million data points and each data point corresponding to one of three colors (e.g., red, green, blue). If the same data set were examined from a two-dimensional point of view (e.g., one side of the cube) then a smaller sample of the data set might be examined resulting in a computational savings. The above operations may iterate until features are exhausted.

Figure 8:
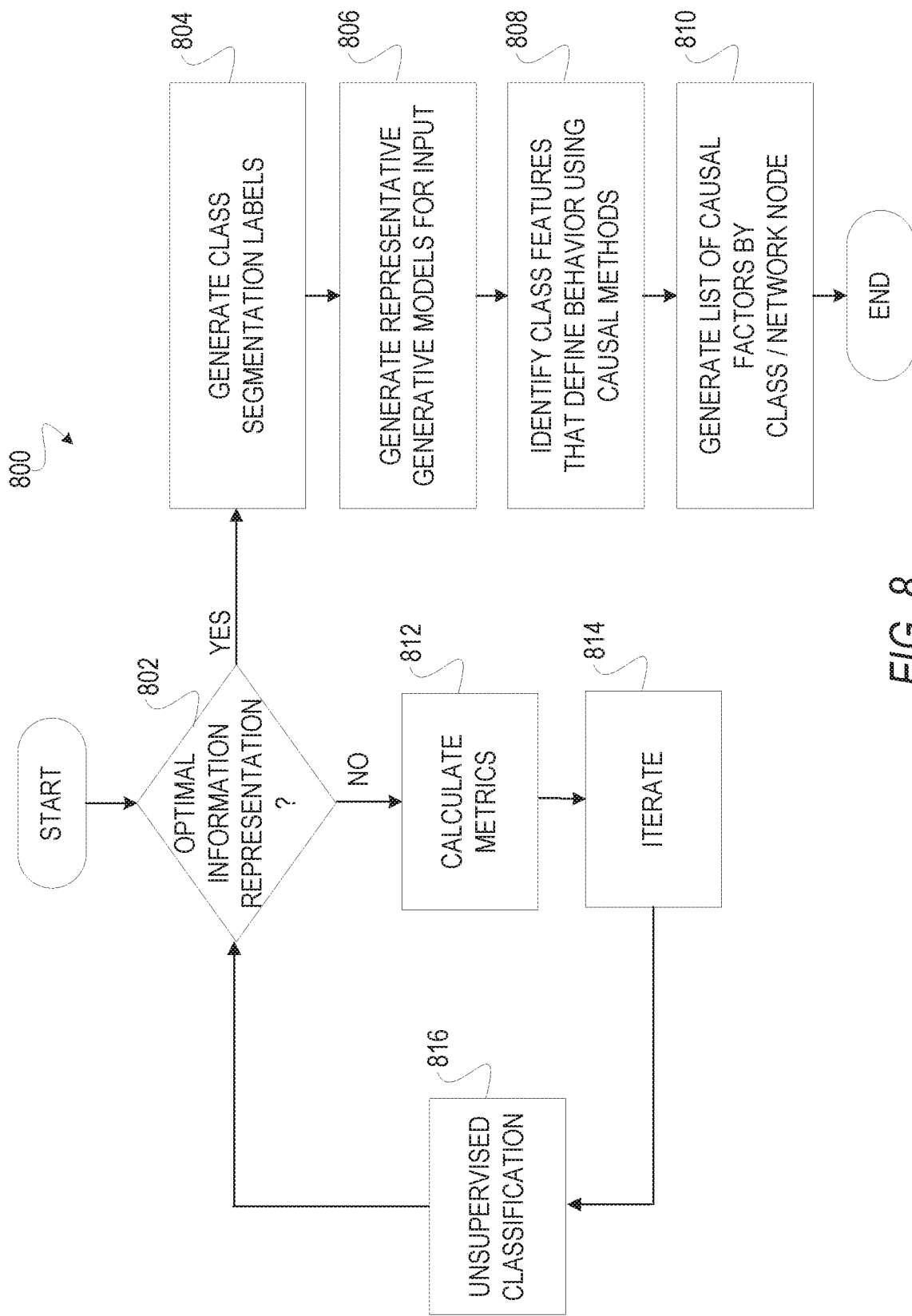
FIG. 8 is a block diagram illustrating a method, according to an embodiment, to characterize product and network node behavior.

FIG. 8 is a flowchart illustrating various sub-operations that may be performed at operation 800 of FIG. 5, in order to auto-characterize product behavior and network node behavior, and also to generate data classes at operation 506. The operation 800 commences at decision operation 802 identifying whether an optimal information representation has been generated. For example, a data analyst may utilize the concatenation described in FIG. 7 to decide whether it has generated an optimal information representation. If an optimal information representation is generated, then a branch is made to operation 804. Otherwise, a branch is made to operation 812. At operation 812, metrics are calculated based on the concatenation of the KPIs and at operation 814, an iteration may be performed. At operation 816, an unsupervised classification is performed. For example, the machine-learning application trainer 224 and/or access applications 228 and/or data analyst may utilize the concatenation described in FIG. 7 and clustering algorithms to manifest a clustering of the information. At operation 804, class segmentation labels are generated based on the clustering of the information. For examples, the class segmentation labels may be used to identify products produced by the supply chain 100 or nodes in the supply chain 100. At operation 806, representative generative models are generated for input. For example, the machine-learning (ML) application trainer 224 and/or access modules may utilize the concatenation described in FIG. 7 and clustering algorithms to generate representative generative models that are utilized by the machine-learning application for input. At operation 808, class features that define behavior are identified by using causal methods. For example, each class feature may correspond to a dimension that the machine-learning (ML) application trainer 224 identifies as causative. At operation 810, the machine-learning (ML) application trainer 224 generates a list of causal factors by class/network node.

The causal factors may be inferred for an inventory manager or a resource manager. The inventory manager is tasked with moving products to nodes in the supply chain 100 to minimize value at risk associated with the product. For example, the causal factors inferred for an inventory manager may include causal factors for shipping products including a method or means of outbound shipment of a product (e.g., expedited-air/non-expedited-ground) and a quantity of outbound shipment of a product. The resource manager is tasked with producing products on production resources in the supply chain 100 to minimize value at risk associated with the product. For example, the causal factors inferred for a resource manager may include causal factors for producing products including a scheduled production of a product on a production resource (e.g., network node) and an available capacity on a production resource (e.g., network node) including an available capacity on a production resource being utilized for a scheduled production of the product and an available capacity on a production resource not being utilized for the scheduled production of the product.

Figure 9:
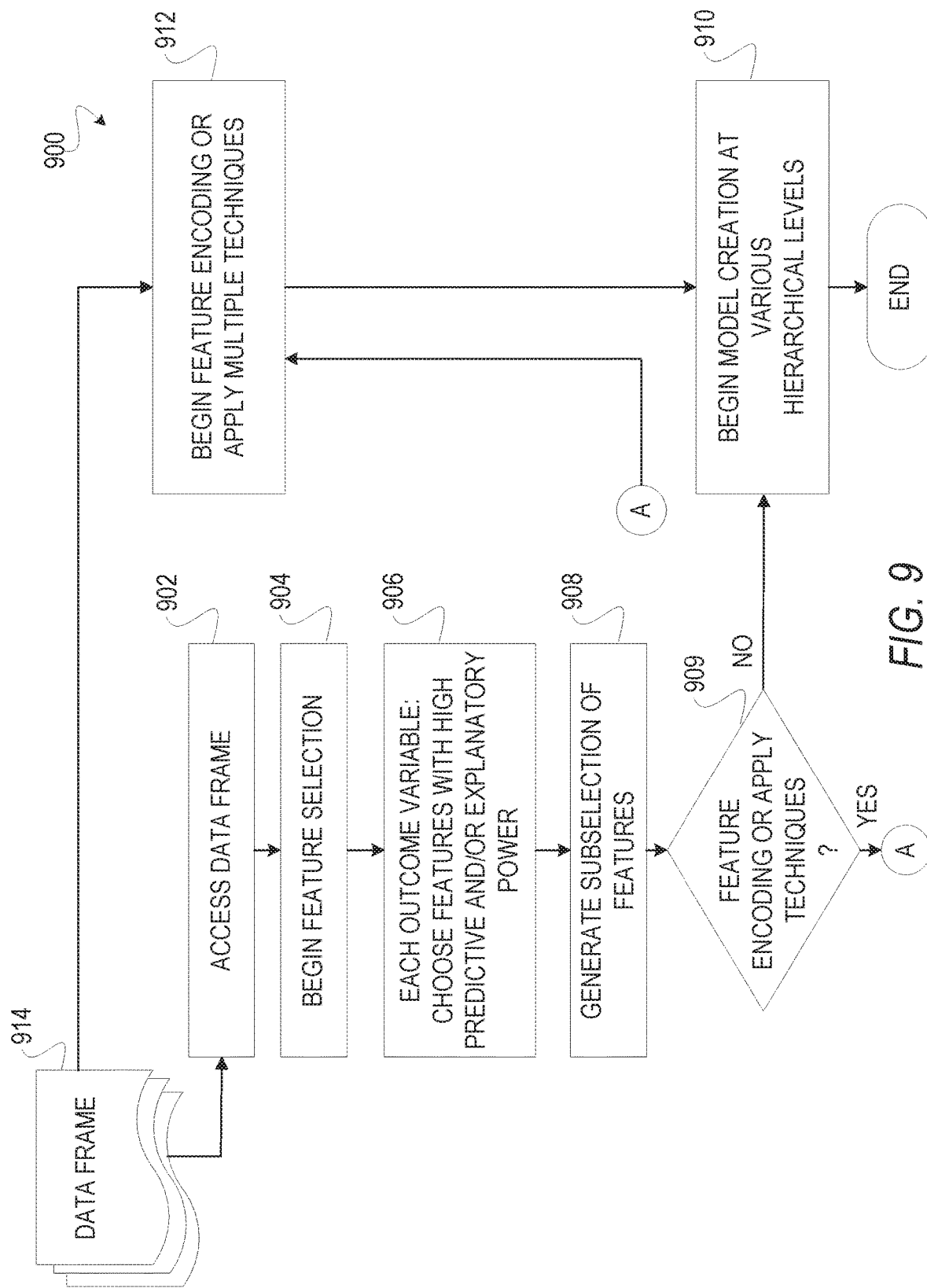
FIG. 9 is a block diagram illustrating a method, according to an embodiment, to perform feature selection and model selection to predict outcome variables.

FIG. 9 is a flowchart illustrating various sub-operations that may be performed at operation 900, in order to perform feature selection and model selection to predict outcome variables. The operation 900 commences at operation 902 by accessing a data frame 914. For example, the data frame 914 may include multiple features and data that are descriptive of products being produced in the supply chain 100 and shipped through the supply chain 100. At operation 904, feature selection begins. For example, the machine-learning application trainer 224 and/or access applications 228 and/or data analyst may perform the feature selection. At operation 906, machine-learning (ML) application trainer 224 identifies outcome variables (e.g., predicted supply chain operational metrics including "fill-rate," "service levels," and so forth). The machine-learning (ML) application trainer 224 chooses outcome variables based on their predictive or explanatory power. For example, "fill rate" may be considered an outcome variable with high explanatory power with respect to evaluating a value at risk (e.g., monetary) in the supply chain 100 because "fill rate" is the fraction of customer demand (e.g., sales orders) met through immediate stock availability, without backorders or lost sales. At operation 908, the machine-learning (ML) application trainer 224 selects features for the model (e.g., machine-learning (ML) application 218).

At operation 909, the machine-learning (ML) application trainer 224 determines whether feature encoding or techniques that facilitate creation of the model are applied. If feature encoding or techniques that facilitate creation of the model are applied, then the machine-learning (ML) application trainer 224 branches to operation 912. Otherwise, the machine-learning (ML) application trainer 224 branches to operation 910. At operation 912, the machine-learning (ML) application trainer 224 begins feature encoding and applies various techniques that facilitates creation of the model (e.g., machine-learning (ML) application 218). At operation 910, the machine-learning (ML) application trainer 224 begins model creation at different hierarchical levels (e.g., product category, geo-location, customers). For example, the machine-learning (ML) application trainer 224 begins model creation at hierarchical levels for production and shipment of products with respect to forward-looking time horizons (e.g., weeks/months/years).

Figure 10:
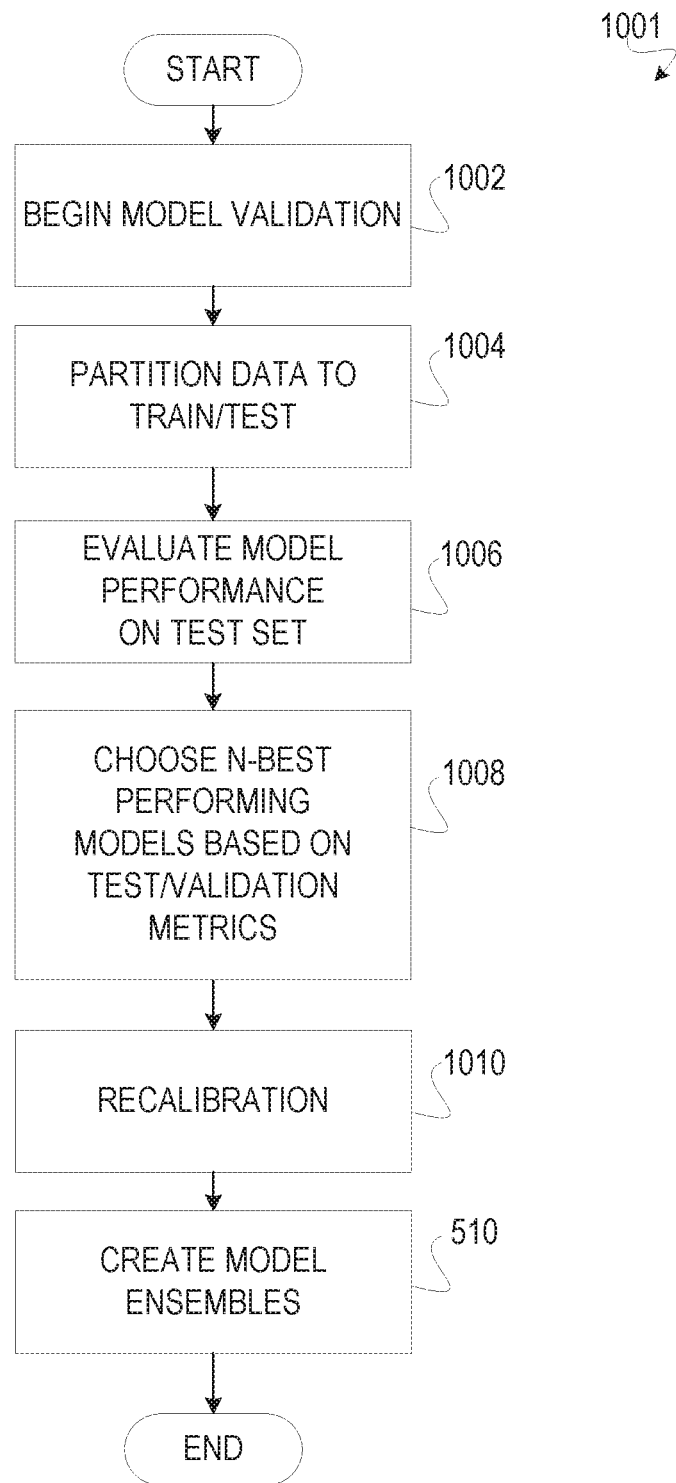
FIG. 10 is a block diagram illustrating a method, according to an embodiment, to perform model validation and create model ensembles.

FIG. 10 is a block diagram illustrating a method 1001 to perform model validation and create model ensembles, according to an embodiment. The method 1001 utilizes sub-operations that may be performed at operation 508 and automated model validation that may be performed at operation 510 in FIG. 5, in order to create model ensembles, according to an embodiment. At operation 1002, the machine-learning (ML) application trainer 224 begins model validation. At operation 1004, the machine-learning (ML) application trainer 224 may partition test data (e.g., supply chain training data 304) from a set of data. At operation 1006, the machine-learning (ML) application trainer 224 evaluates one or more models performance based on the test data. For example, the machine-learning (ML) application trainer 224 may utilize the supply chain training data 304 to evaluate the performance of a model. At operation 1008, the machine-learning (ML) application trainer 224 identifies the N-best performing models based on the test/validation metrics. At operation 1010, the machine-learning (ML) application trainer 224 recalibrates the models. The recalibration of a model includes adjusting and forcing the parameters of the model within the margins of uncertainties to obtain a model representation of the processes of interest that satisfies pre-agreed criteria (e.g., goodness-of-fit or cost function). At operation 510, the machine-learning (ML) application trainer 224 creates a model ensemble by utilizing the N-best performing models (e.g., machine-learning (ML) application 218). For example, the ensemble of models preform together as a whole rather than individually.

I Predicting a Supply Chain Performance
Action Recommendations

FIG. 11A illustrates an action recommendations user interface 1100, according to an embodiment. The action recommendations user interface 1100 (e.g., first electronic user interface) may be presented at operation 514 in FIG. 5. The action recommendations user interface 1100 includes one or more action recommendations 1127. Each action recommendation 1127 may include an action number 1105, an action description 1106, a predicted value impact 1108, a value at risk 1110, and a product identifier 1112. The action number 1105 uniquely identifies the action recommendation 1127 on the action recommendations user interface 1100. For example, the action recommendations 1127 may be assigned action numbers 1105 in an ascending order (e.g., "1," "2," "3" and so forth). The action description 1106 may include a title and a set of actions, as described further below. The predicted value impact 1108 is the predicted value of monetary savings realized by executing the action recommendation 1127. The value at risk 1110 is a monetary value that is predicted to be at risk for the product identified by the action recommendation 1127. For example, the value at risk 1110 may be expressed in a national currency (e.g., US Dollars. French Francs, and the like). The product identifier 1112 identifies a product that will be impacted by executing the action recommendation 1127. The predicted value impact 1108 and the value at risk 1110 may be continuously updated in real-time.

The set of actions included in the action description 1106 may impact a delivery date of the product identified by the product identifier 1112. For example, the action recommendation 1127 with the action number 1105 "1" includes the action description 1106 "EXPEDITE OUTBOUND SHIPMENT" and includes a set of actions (not shown) to expedite an outbound shipment of the product, as described later in this document. In a second example, the action recommendation 1127 with the action number 1105 "2" includes the action description 1106 "REALLOCATE QTY OF OUTBOUND SHIPMENT" and includes a set of actions (not shown) to reallocate the quantity of a products in an outbound shipment, as described later in this document. In a third example, the action recommendation 1127 with the action number 1105 "3" includes the action description 1106 "RESCHEDULE PRODUCTION OF PRODUCT" and includes a set of actions (not shown) to reschedule the production of a product on a production resource to a different date and/or time, as described later in this document. In a fourth example (not shown), the action recommendation 1127 may include the action description 1106 "RESCHEDULE PRODUCTION OF PRODUCT ON DIFFERENT PRODUCTION RESOURCE" and includes a set of actions (not shown) that reschedules a production of a product by stopping a production run on a production resource (e.g., a first production resource) and starting the production run on a different production resource (e.g., second production resource), as described later in this document. In a fifth example, the action recommendation 1127 may include the action description 1106 "INCREASE QUANTITY OF PRODUCT PRODUCED" and includes a set of actions (not shown) to change (e.g., increase) a quantity of a product that is scheduled for production in a production run on a production resource (e.g., first production resource).

Each action recommendation 1127 is selectable in the semi-autonomous mode or automatically selected in the fully-autonomous mode. Each action recommendation 1127 may be selectable in the semi-autonomous mode by a supply chain planner 230 (and the like) to execute the set of actions included in the action description 1106. In addition, each action recommendation 1127 may be automatically selected by the machine-learning application 218 in fully-autonomous mode to execute the set of actions included in the action description 1106. The set of actions may include one or more actions, according to an embodiment. The action recommendations user interface 1100 may be scrolled up or down to expose additional action recommendations 1127, according to an embodiment.

Figure 11B:
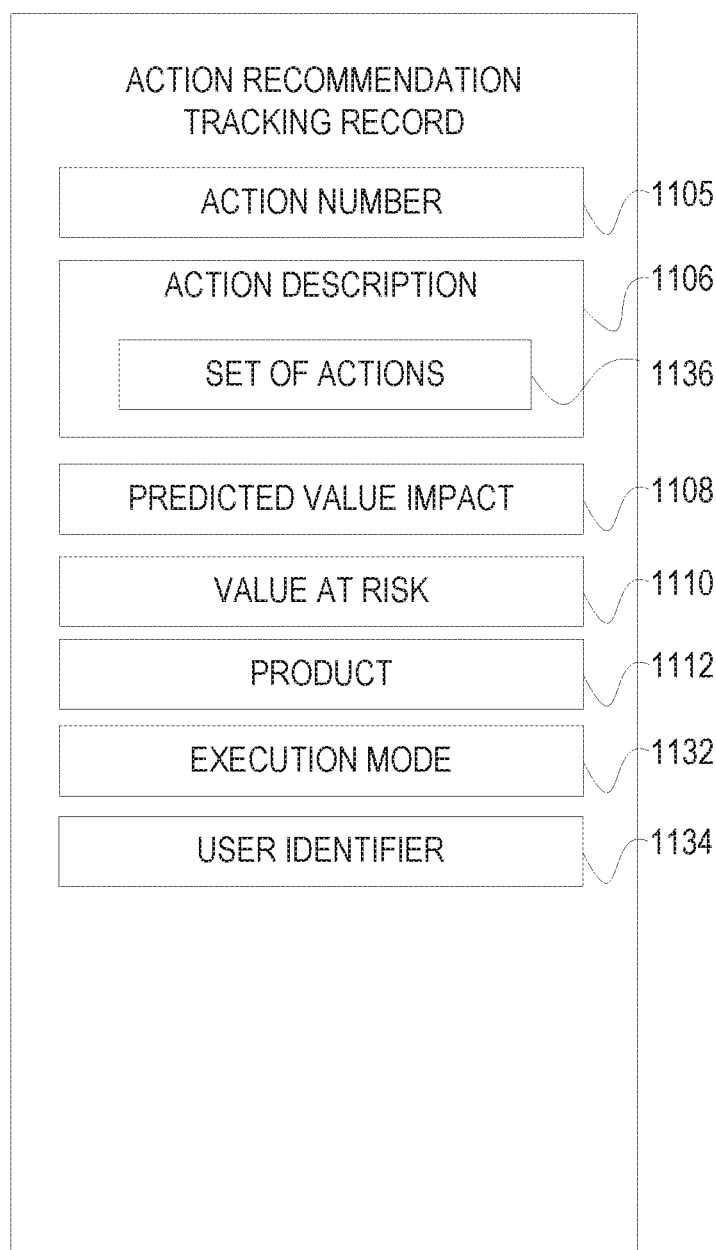
FIG. 11B illustrates an action recommendations tracking record, according to an embodiment.

FIG. 11B is a block diagram illustrating an action recommendation tracking record 1130, according to an embodiment. The action recommendation tracking record 1130 may be communicated to a planning system 208 responsive to selection of an action recommendation 1127. In addition, the action recommendation tracking record 1130 may be stored in the production database 216. The action recommendation tracking record 1130 includes the action number 1105, the action description 1106, the predicted value impact 1108, the value at risk 1110, the product identifier 1112 identifying the product, an execution mode 1132, a user identifier 1134, and a set of actions 1136. The action number 1105, the action description 1106, the predicted value impact 1108, the value at risk 1110, were previously described. The execution mode 1132 registers whether the action recommendation 1127 was executed in manual mode, semi-autonomous mode, or fully-autonomous mode. The user identifier 1134 identifies the supply chain planner 230 who executed the action recommendation 1127 (e.g., manual mode and semi-autonomous mode). The set of actions 1136 is the one or more actions included in the action description 1106 of the action recommendation 1127, as previously described. The set of actions 1136 may be performed by the machine-learning application 218 and/or the planning system 208 responsive to selection of the action recommendation 1127. For example, the set of actions 1136 may include a sequence of actions impacting the product (e.g., delivery date of the product) including a sequence of actions to expedite a shipment of the product (e.g., first action), a sequence of actions to reallocate quantities of products being shipped in outbound shipments (e.g., second action), a sequence of actions to reschedule a production (e.g., production run) of a product (e.g., lipstick, red) on a first production resource (e.g., third action), a sequence of actions to reschedule a production of a product from the first production resource to a second production resource (e.g., fourth action), and a sequence of actions to increase a quantity of the production of the product on the first production resource (e.g., fifth action).

Figure 11C:
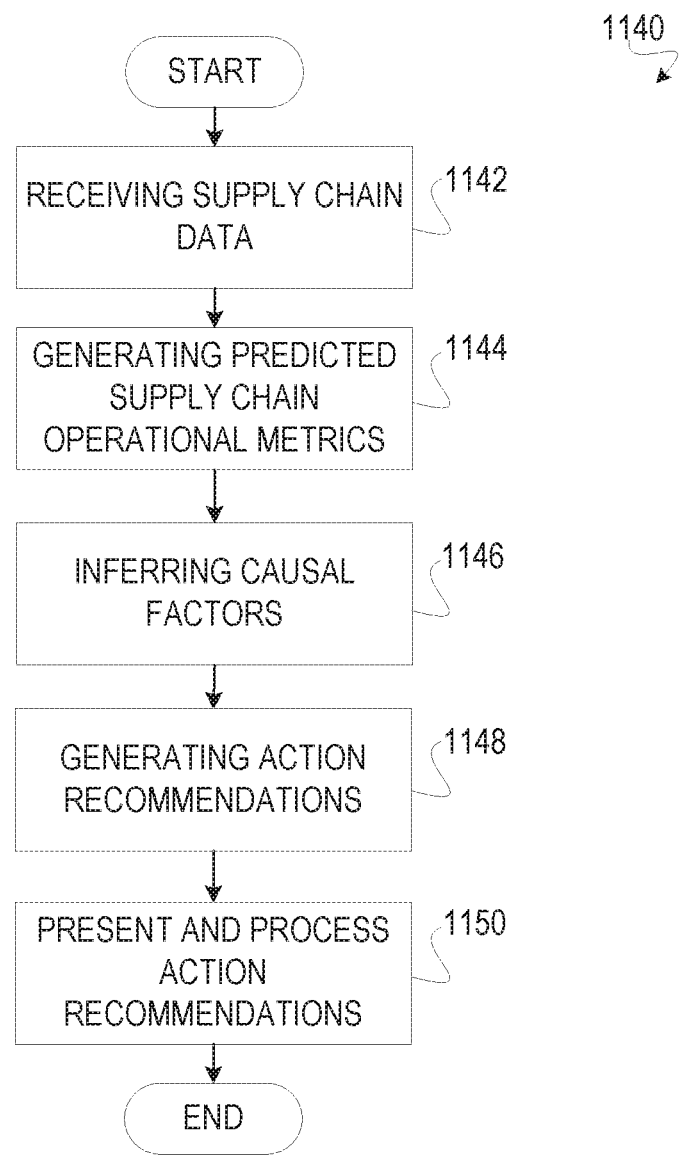
FIG. 11C illustrates a method, according to an embodiment, to manage an automated supply chain.

FIG. 11C illustrates a method 1140, according to an embodiment, to manage an automated supply chain, according to an embodiment. The method 1140 commences at operation 1142 with the machine-learning application 218, at the supply chain server machine 205, receiving supply chain data 306. For example, the machine-learning application 218 may receive the supply chain data 306 for delivery of a product. The supply chain data 306 may include input signals comprising operational plans and observed supply chain operational metrics, as previously described. In one embodiment, the observed supply chain operational metrics may be observed across the supply chain 100. The operation 1142 is described in further detail in operation 514 in FIG. 5.

At operation 1144, the machine-learning application 218 automatically generates predicted supply chain operational metrics. The machine-learning application 218 automatically generates the operational plans and the observed supply chain operational metrics to predict the supply chain operational metrics. The machine-learning application 218 may generate the predicted supply chain operational metrics across the nodes of the supply chain 100. The predicted supply chain operational metrics may include the value at risk 1110 that is predicted for the product. For example, the value at risk 1110 that is predicted for the product may be based on a shipment date of the product or a quantity of the product in a shipment or producing the product on a production resource that is overutilized, and the like. The predicted supply chain operational metrics may further include fill rate, service level, inventory metric, demand forecast, forecast attainment, inventory holding costs, expedite costs and liquidation costs. The predicted supply chain operational metrics may be generated for at least one hierarchical level including the distribution center 108, the hub 106, the plant 104, the logistic center, the customer 110 (e.g., customer location) and a geographic location (e.g., California. North America, Europe. San Jose. Santa Clara County, and the like). The operation 1144 is described in further detail in the operations illustrated in FIG. 5, excluding operations 600, 516, and 518.

At operation 1146, the machine-learning application 218 automatically infers causal factors that impact the predicted supply chain operational metrics. The machine-learning application 218 utilizes the observed supply chain operational metrics to automatically infer the causal factors. For example, the causal factors inferred may include causal factors for action recommendations 1127. The causal factors for action recommendations 1127 may include causal factors for shipping products and causal factors for producing products. The causal factors for shipping products may include a method or means of outbound shipment of a product (e.g., expedited-air/non-expedited-ground) and a quantity of outbound shipment of a product, a scheduled production of a product on a production resource (e.g., network node). The causal factors for producing products may include an available capacity on a production resource (e.g., network node) including an available capacity on a production resource being utilized for a scheduled production of the product, and an available capacity on a production resource not being utilized for the scheduled production of the product. The impacted predicted supply chain operational metrics may include the value at risk 1110 that is predicted for the product. The operation 1146 is described in further detail in the operations illustrated in FIG. 5, excluding operations 600, 516, and 518.

At operation 1148, the machine-learning application 218 generates action recommendations 1127, as illustrated in FIG. 11A, for the supply chain 100. The machine-learning application 218 may utilize the causal factors and the predicted supply chain operational metrics to generate the action recommendations 1127. The operation 1148 is described in further detail in operation 514, as illustrated in FIG. 5.

At operation 1150, the machine-learning application 218 presents and processes the action recommendations 1127. For example, the machine-learning application 218 may present the action recommendations 1127, via the access applications 228, over a network, to the client machine 203 operated by a supply chain planner 230. In addition, the machine-learning application 218 may process action recommendations 1127 responsive to receiving selections over the network, from the client machine 203, operated by the supply chain planner 230. These operations are described in further detail in FIG. 11C.

Figure 11D:
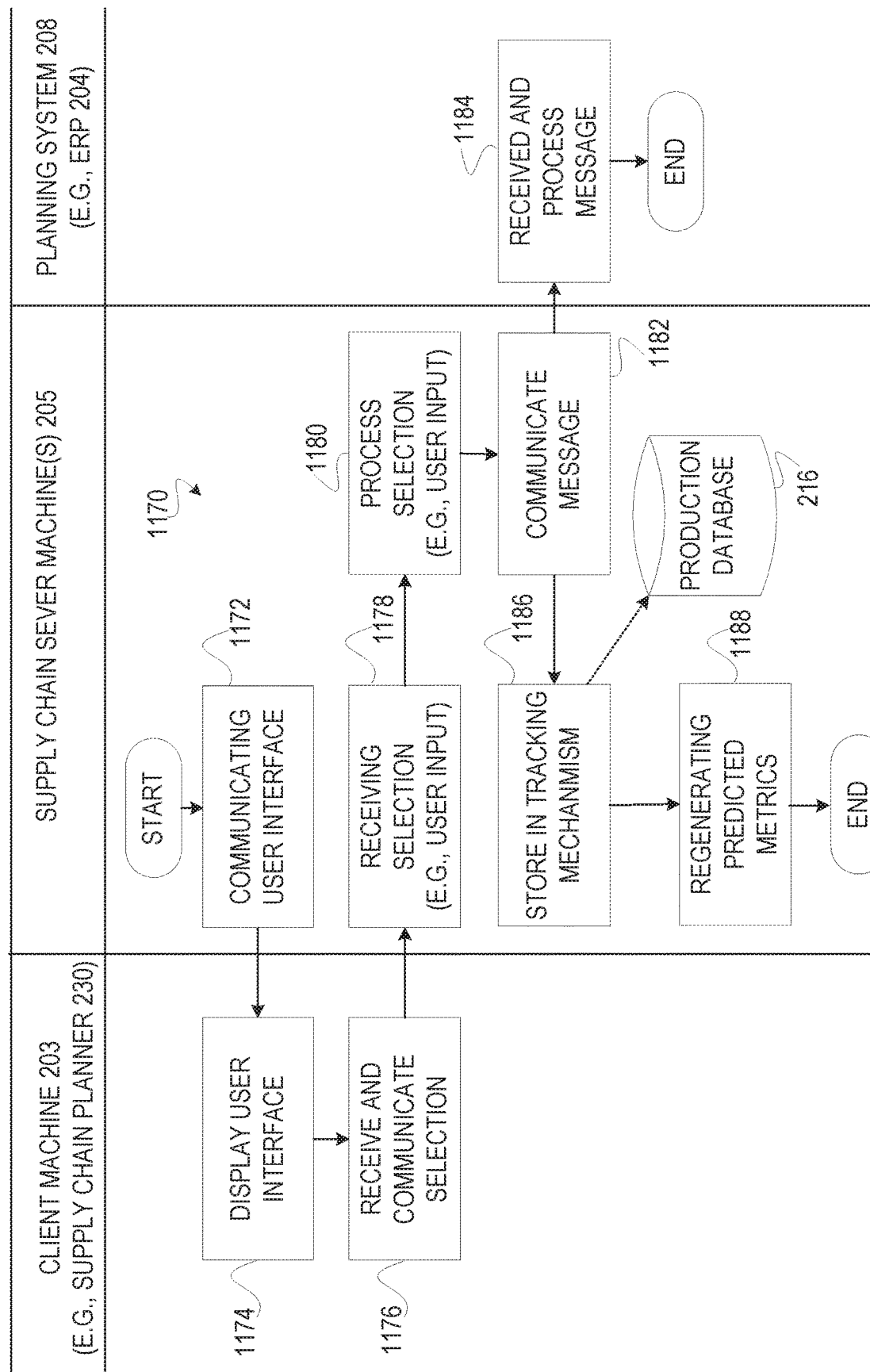
FIG. 11D is a block diagram illustrating a method, according to an embodiment, to present and process action recommendations.

FIG. 11D is a block diagram illustrating a method 1170, according to an embodiment, to present and process action recommendations. The method 1170 further describes operations performed in operations 514 and 516 of FIG. 5 and operation 1150 in FIG. 11C. Illustrated on the left is the client machine 203; illustrated in the middle are one or more supply chain server machines 205; and illustrated on the right are the planning systems 208 (e.g., enterprise resource planning system 204). The client machine 203 may be operated by a supply chain planner 230. The supply chain server machine 205 hosts the access applications 228, the machine-learning application 218, the machine-learning application trainer 224, and other applications, as illustrated in FIG. 2. The planning system 208 may include the enterprise resource planning system 204.

The method 1170 commences, at operation 1172, with the access applications 228 (e.g., access modules) presenting an electronic user interface (e.g., first electronic user interface) over a network (e.g., Internet) to the client machine 203. For example, the electronic user interface may be embodied as the action recommendations user interface 1100, as illustrated in FIG. 11A.

At operation 1174, the client machine 203 receives and displays the action recommendations user interface 1100. At operation 1176, the client machine 203 receives and communicates a selection (e.g., first selection). For example, the client machine 203 receives the selection (e.g., first selection) via the action recommendations user interface 1100. The selection may identify an action recommendation 1127. Further, at operation 1176, the client machine 203 communicates the selection to the supply chain server machine 205. The action recommendation (e.g., first action recommendation) may include one or more actions impacting a delivery date of a product (e.g., expedite shipping, etc.).

At operation 1178, the supply chain server machine 205 receives the selection and at operation 1180, the machine-learning application 218 processes the selection. For example, the machine-learning application 218 may processes one or more actions from the set of actions 1136. At operation 1182, the machine-learning application 218 communicates one or more messages to the planning system 208. The messages may include the action recommendation tracking record 1130, as illustrated in FIG. 11B.

At operation 1184, the planning system 208 receives and processes the messages. According to one embodiment, the receiving the message(s) may cause the planning system to expedite an inbound shipment (e.g., first inbound shipment) of the product (e.g., first product). For example, the planning system 208 may processes one or more actions from the set of actions 1136.

At operation 1186, the machine-learning application 218 stores the action recommendation tracking record 1130 in a tracking mechanism (e.g., table) in the production database 216. At operation 1188, the machine-learning application 218 regenerates the predicted supply chain operational metrics. For example, the operation 1188 includes machine-learning application 218 regenerating the predicted supply chain operational metrics in accordance as described in operation 518 on FIG. 5.

Figure 11E:
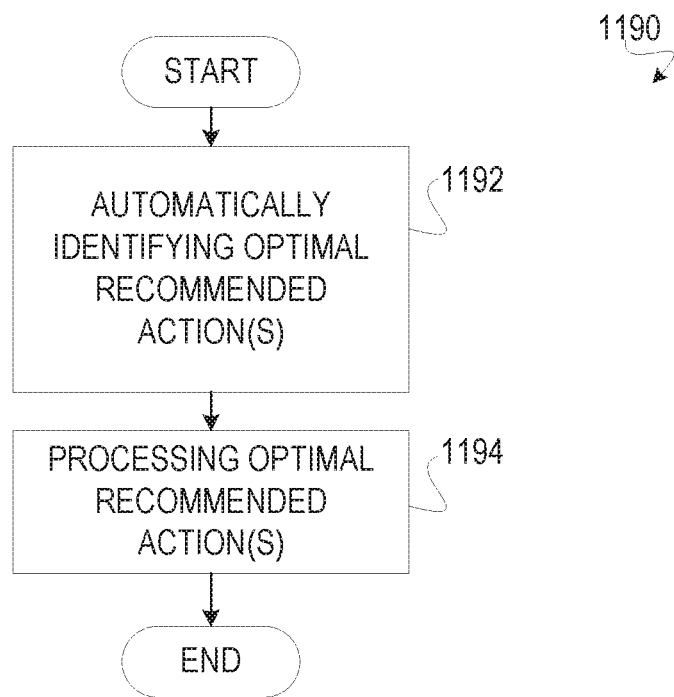
FIG. 11E is a block diagram illustrating a method, according to an embodiment, to execute action recommendations in fully-autonomous mode.

FIG. 11E is a block diagram illustrating a method 1190, according to an embodiment, to execute action recommendations 1127 in fully-autonomous mode. The method 1190 commences, at operation 1192, at the supply chain server machine 205, with the machine-learning application 218 identifying an optimal recommended action recommendation from a list of action recommendations 1127. At operation 1194, machine-learning application 218 executes the optimal recommended action recommendation. For example, the optimal recommended action recommendation provides the "user input" for the operations 1180, 1182, 1186 and 1188 as described in FIG. 11D.

In one embodiment, the operation 1192 and the operation 1194 may be iterated until a predetermined number of action recommendations 1127 are executed. For example, a predetermined number of action recommendations 1127 may be executed based on the value at risk 1110 in the action recommendation 1127 being compared with a predetermined limit. If the value at risk 1110 is greater than the predetermined limit, then the action recommendation 1127 is identified as the optimal recommended action recommendation and executed.

Supply Network Planning User Interface—Map Tree

Figure 12:
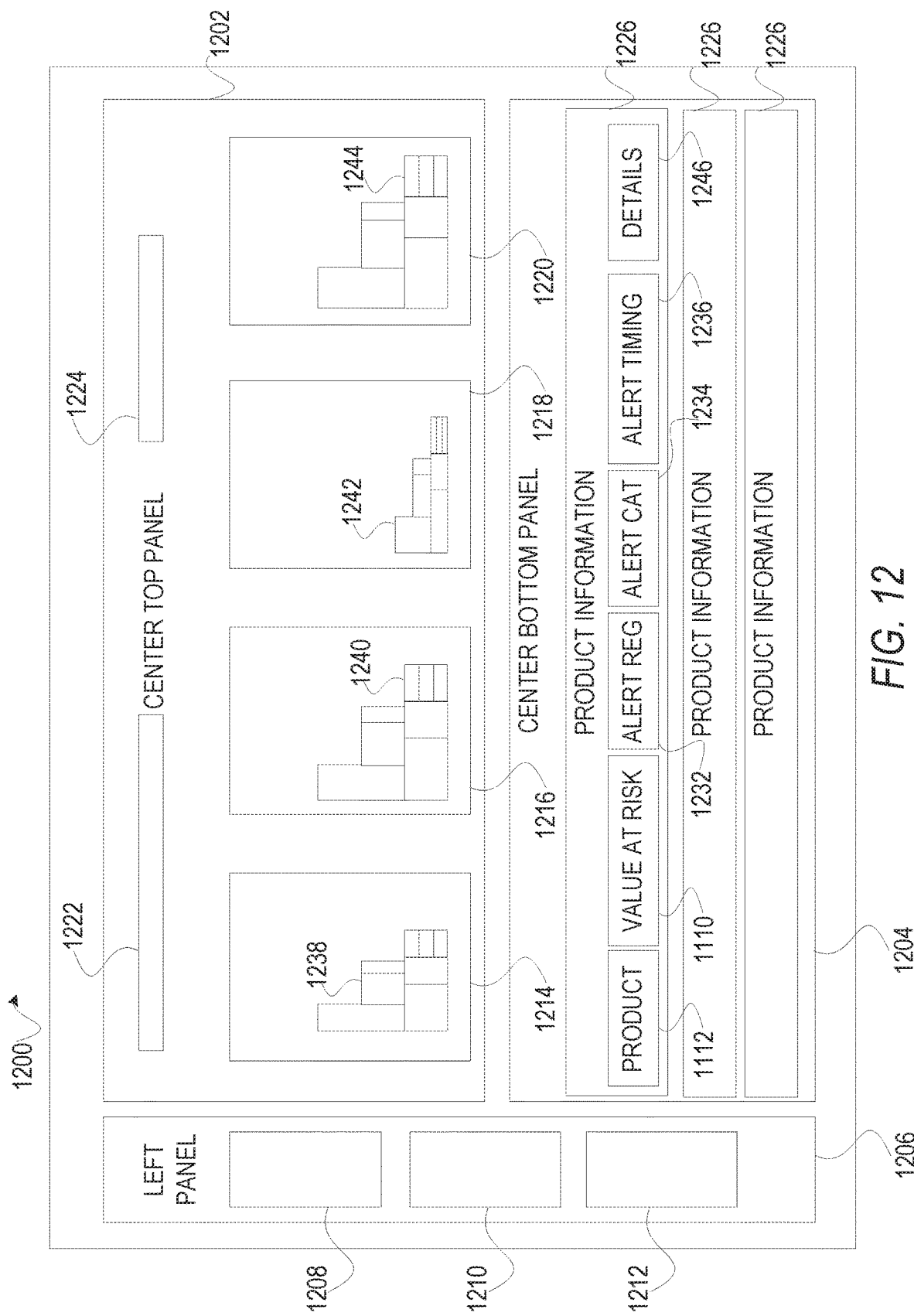
FIG. 12 is a block diagram illustrating supply network planning user interface, according to an embodiment.

FIG. 12 is a supply network planning user interface 1200, according to an embodiment. The supply network planning user interface 1200 (e.g., second electronic user interface) may be presented at operation 514 in FIG. 5. The supply network planning user interface 1200 may be utilized by an inventory manager who manages inventory of products in the supply chain 100. Features of the supply network planning user interface 1200 include a left panel 1206, a center top panel 1202, and a center bottom panel 1204. The left panel 1206 summarizes a value at risk (e.g., currency amount (e.g., U.S. dollars)) according to brands (or some other hierarchical level), as well as one or more alerts (alert clusters) associated with the brand. For example, each of the alert panels 1208, 1210, and 1212 may summarize a value at risk for a brand (e.g., retail brands like "Acme Cosmetics Inc.," "XYZ Cosmetics Inc.," and the like), value at risk for products of a brand, and alert clusters. According to one embodiment, the left panel 1206 may be presented before the center top panel 1202 and center bottom panel 1204 are populated with information. For example, the selection of the alert panel 1208 for "Acme Cosmetics Inc." by the inventory manager may cause the center top panel 1202 and the center bottom panel 1204 to populate with information based on the "Acme Cosmetics Inc.," brand and "Acme Cosmetics Inc." products. The inventory manager may be selecting the alert panel 1208 for "Acme Cosmetics Inc." to cause map trees and rows of product information for "Acme Cosmetics Inc." products and "Acme Cosmetics Inc." product families to be presented on the supply network planning user interface 1200. The center top panel 1202 includes category filters 1222, alert filters 1224, and map trees 1214, 1216, 1218, and 1220. The category filters 1222 may be utilized to filter the rows of product information 1226 being displayed in the center bottom panel 1204. For example, fashion retail brands may include category filters 1222 that may be utilized to filter rows of product information 1226 (e.g., product (SKU)). In addition, the alert filter 1224 may also be utilized to filter the rows of product information 1226. For example, the selected brand (e.g., "Acme Cosmetics Inc.") may be associated with one or more alert filters 1224 that may be selected to filter the rows of product information 1226 in the center bottom panel 1204 according to the selected alert. The supply network planning user interface 1200 may be scrolled, up or down, to expose additional rows of product information 1226.

Product Information

The rows of product information 1226 may be grouped according to product families that are respectively associated with a value at risk for the entire family. The map trees 1214, 1216, 1218, and 1220 correspond to different geographic regions. For example, the map trees include a map tree 1214 for the "Asia/Pacific" region, a map tree 1216 for the "Europe/Middle East/Africa" region, a map tree 1218 for the "North America" region, and a map tree 1220 for the "United Kingdom" region. Each map tree includes boxes/rectangles that are selectable. The boxes/rectangles respectively represent a value at risk for a product (SKU) or family of products. The product or family of products may be represented according to a value at risk across geographic regions (e.g., map trees). For example, a value at risk for a product (e.g., ruby red lipstick) by a first commercial provider (e.g. "Acme Cosmetics Inc.") may be represented with the user interface element 1238 in the "Asia/Pacific" map tree 1214, the user interface element 1240 in the "Europe/Middle East/Africa" map tree 1216, the user interface element 1242 in the "North America" map tree 1218, and the user interface element 1244 in the "United Kingdom" map tree 1220. Each of the user interface elements 1238, 1240, 1242, are 1244 are proportional in size to the value at risk for the product for the first commercial provider (e.g., "Acme Cosmetics Inc.") in the respective region. Selection of a user interface element 1238, 1240, 1242, or 1244 may cause interface elements corresponding to the same products to be outlined in bold in each of the other regions. For example, selection of the user interface element 1238 in a first map tree 1214 (e.g., Asia/Pacific) may cause the interface elements 1240, 1242, 1244, corresponding to the same product (e.g., ruby red lipstick), to be outlined in bold. In addition, a selection of a user interface element corresponding to a product family in a first map tree (e.g., map tree 1214) may cause the interface elements corresponding to the same product family to be outlined in bold in other map trees (e.g., map tree 1216, map tree 1218, map tree 1220).

The center bottom panel 1204 includes multiple rows of product information 1226. Each row of product information 1226 describes a product (SKU). Multiple rows of product information 1226 may be grouped together according to a product family and displayed in association with a value at risk for the entire family. Each row of product information 1226 for a product or family of products includes columns of information including user interface elements for a product identifier 1112, a value at risk 1110, alerts regions 1232, alert categories 1234, alert timing 1236, and details 1246. The product identifier 1112 includes a family identifier, identifying a product family, or a product identifier, identifying a product (e.g., SKU). The value at risk 1110 was previously described. The alerts regions 1232 include region identifiers, each identifying one or more alerts being asserted in the identified region. The alert categories 1234 include alerts respectively corresponding to alert categories. The alert timing 1236 includes product information 1226 including multiple user interface elements each corresponding to a week in a set of weeks. In addition, each user interface element (e.g., week) is color coded indicating whether an alert is asserted for the corresponding week. For example, a week may be color coded red (e.g., alert asserted) or grey (e.g., no alert asserted). The details 1246 are represented by a user interface element that is selectable to accesses additional user interfaces providing further details about the product and controls to control shipment of a product to facilitate supply network planning of the product and resources for producing a product to facilitate resource planning for the product. For example, an inbound shipments user interface 1300 (FIG. 13A) may be accessed via the details 1246 user interface element.

Controlling Inventory in a Supply Chain
A) Expedite Shipment

Figure 13A:
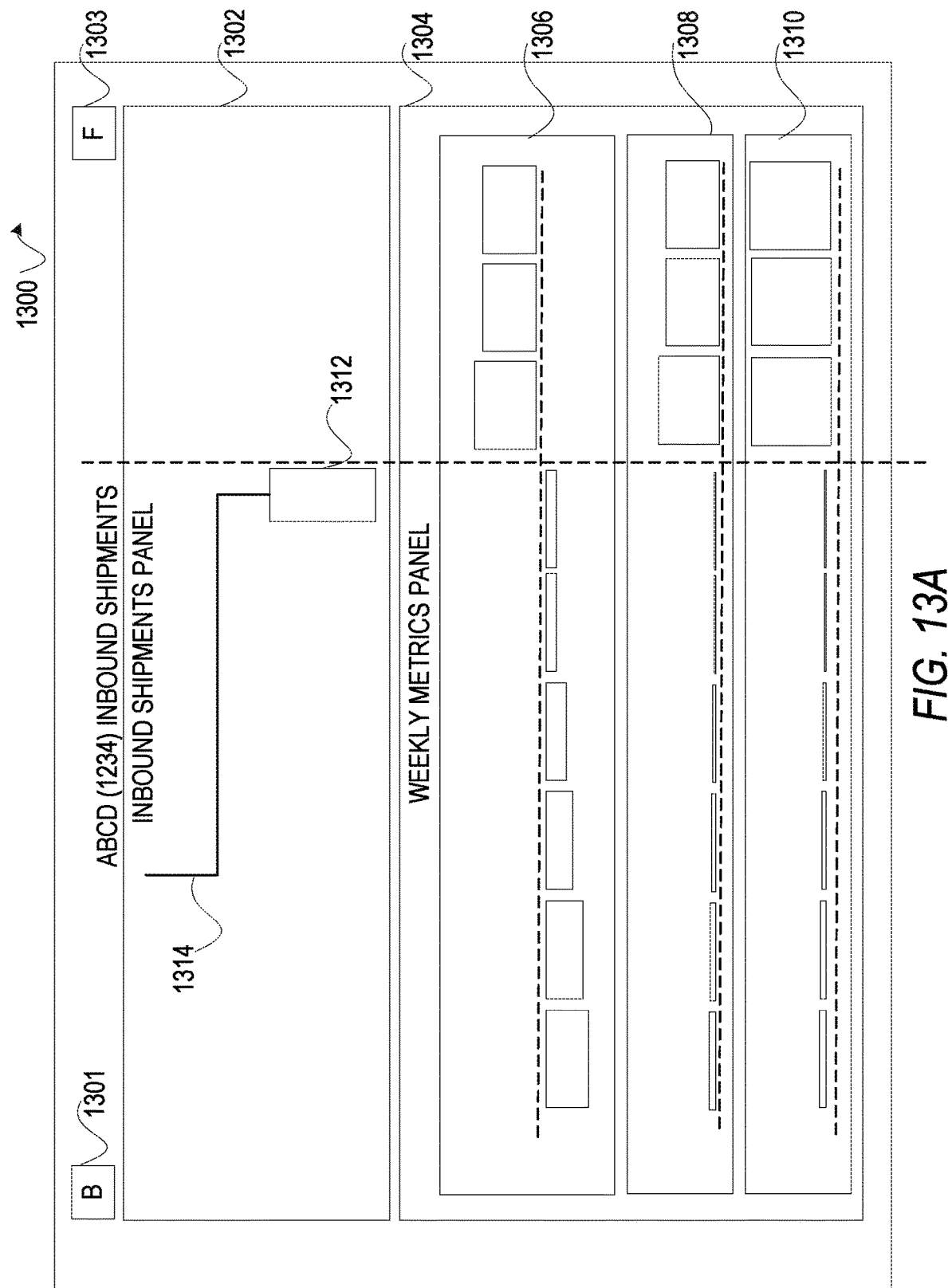
FIG. 13A illustrates an inbound shipments user interface, according to an embodiment.

FIG. 13A illustrates an inbound shipments user interface 1300, according to an embodiment. The inbound shipments user interface 1300 (e.g., third electronic user interface) may be presented at operation 514 on FIG. 5. The inbound shipments user interface 1300 may present one or more inbound shipments of a product to a node (e.g., distribution center 108) (e.g., ABCD (1234)) in the supply chain 100. The inbound shipments user interface 1300 may present the inbound shipment(s) in the context of weekly metrics (e.g., predicted supply chain operational metrics). In one embodiment, earlier inbound shipments and weekly metrics are presented on the left of the inbound shipments user interface 1300 (e.g., farthest left histogram bar is first week of May) and later inbound shipments and weekly metrics are presented on the right of the inbound shipments user interface 1300 (e.g., farthest right histogram bar is last week of June). For example, the inbound shipments user interface 1300 includes a window of nine weeks of inbound shipments and weekly metrics where each week is presented with a histogram bar. According to other embodiments, the number of histogram bars in the histogram window may vary. In one embodiment, the window of inbound shipments and weekly metrics may be rolled. For example, the inbound shipments user interface 1300 includes a user interface element 1301 that is selected to roll (e.g., slide) the window of inbound shipments and weekly metrics backward in time to expose earlier weeks of inbound shipments and weekly metrics. Further for example, the inbound shipments user interface 1300 includes a user interface element 1303 that is selected to roll (e.g., slide) the window of inbound shipments and weekly metrics forward in time to expose later weeks of inbound shipments. Other embodiments may utilize other types of user interface controls.

The inbound shipments user interface 1300 includes an inbound shipments panel 1302 and a weekly metrics panel 1304. The inbound shipments panel 1302 may include user interface elements representing one or more inbound shipments. For example, the inbound shipments panel 1302 includes a user interface element 1314 representing an inbound shipment as leaving a first node (e.g., "XYZ HUB (1234)") (e.g., outbound node) in the supply chain 100 at the end of week "two" and a user interface element 1312 representing the inbound shipment as arriving at a second node (e.g., "ABCD (1234)") (e.g., inbound node) in the supply chain 100 at the end of week six. The user interface element 1312 representing the inbound shipment may be associated with a means of transportation, a quantity of product, and other shipment properties that are used to characterize the shipment of the product. The means of shipment may include different methods of shipment including trucking, sea cargo, train, etc. In addition, the means of transportation may include different modes of transportation including "economical transportation," "normal transportation," "expedited transportation," and the like. According to an embodiment, the user interface element 1312 for the inbound shipment may be selected to present an input box (e.g., input check box) that may be selected (e.g., checked) to expedite shipment of the product from a "normal shipment" to an "expedited shipment" (e.g., air) as illustrated in FIG. 13B.

Returning to FIG. 13A, the weekly metrics panel 1304 includes predicted supply chain operational metrics in the form of predicted days of supply metric included in a days of supply panel 1306 (e.g., supply), a predicted fill rate metric included in a fill rate panel 1308 (e.g., demand), and a predicted booking to forecast ratio metric in the form of a bookings to forecast ratio panel 1310. The predicted days of supply metric, predicted fill rate metric, and predicted booking to forecast ratio metric are presented as histogram data in the form of histogram bars organized according to weeks and corresponding to each other. For example, the histogram bars for week two (e.g., user interface element 1312 representing the inbound shipment leaving first node in supply chain) includes a histogram bar for predicted days of supply, a histogram bar for a predicted fill rate, and a histogram bar for a predicted bookings to forecast ratio panel 1310. Any change to the inbound shipment(s) for a particular week causes the histogram data in the respective panels 1306, 1308 and 1310 to be recalculated and represented.

In greater detail, the days of supply panel 1306 is utilized to present the predicted supply chain operational metric for days of supply. The days of supply predicted metric is the inventory days of supply for a product at the node (e.g., distribution center 108) for a particular week. Histogram bars above a center dividing line illustrate positive days of inventory supply. For example, a histogram bar above the center dividing line may include an inventory supply of three days indicating that the inventory of the product, at the distribution center 108, will be exhausted after three days based on a current demand for the product. Histogram bars below the center dividing line illustrate negative days of inventory supply. For example, a histogram bar below the center dividing line with an inventory supply of negative three days indicates that inventory of the product, at the distribution center, is presently exhausted and with a current demand of three days.

The fill rate panel 1308 is utilized to present the predicted supply chain operation metric for fill rate. The fill rate predicted metric includes histogram bars corresponding to the percentage of customer demand (e.g., sales orders) met through immediate stock availability, without backorders or lost sales. For example, a histogram bar indicating a "100%" fill rate corresponds to filling all customer demand (e.g., sales orders) through immediate stock availability, without any backorders or lost sales. In contrast, a histogram bar indicating 0% fill rate indicates none of the customer demand has been filled for the designated week. Accordingly, the fill rate may be utilized to characterize the supply of a product to a node in the supply chain 100 as expressed by a demand of the product from the user interface element 1312 (e.g., distribution center) in the supply chain 100.

The bookings to forecast ratio panel 1310 is utilized to present the predicted supply chain operation metric for bookings to forecast ratio (e.g., forecast attainment). The bookings to forecast ratio predicted metric includes histogram bars corresponding to the percentage bookings/forecast (e.g., shipped/ordered quantity divided by forecast quantity). For example, a histogram bar indicating "100%" shipped quantity divided by forecast quantity corresponds to shipping everything that was forecasted for the designated week. In contrast, a histogram bar indicating "50%" shipped quantity divided by forecast quantity corresponds to shipping half of the forecasted shipments for the designated week.

FIG. 13B illustrates stock transfer request user interface 1320, according to an embodiment. The stock transfer request user interface 1320 may be presented at operation 514 in FIG. 5. The stock transfer request user interface 1320 (e.g., fourth electronic user interface) includes a stock transfer request 1321. The stock transfer request user interface 1320 includes an information panel 1325, an expedite request 1323, and a commit expedite request 1327. The information panel 1325 includes the product identifier 1112 that identifies the product (e.g., SKU), an outbound node identifier 1324 (e.g., "XYZ HUB (1234)"), an inbound node identifier 1326 (e.g., "ABCD (1234)"), a shipping date 1328, a receipt date 1330, a shipment identifier 1332, shipment quantity information 1334, and a status 1336. The product identifier 1112 identifies the product being shipped. The outbound node identifier 1324 identifies the node in the supply chain 100 from which the product is being shipped. The inbound node identifier 1326 identifies the node in the supply chain 100 to which the product is being shipped. The shipping date 1328 is the date the product is shipped from the outbound node. The receipt date 1330 is the date the product is scheduled to be received at the inbound node. The shipment identifier 1332 identifies the shipment in the supply chain 100. The shipment quantity information 1334 quantifies the products being shipped. For example, the shipment quantity information 1334 indicates that "7104" products are being shipped. The status 1336 is a status of the stock transfer request. For example, the status may be "CONFIRMED" or "UNCONFIRMED." According to an embodiment, the expedite request 1323 may be selected to expedite shipment of the product "Q7XT01000." For example, selection of the expedite request 1323 may cause utilization of a faster means of shipment (e.g., trucking, express air, and so forth) to ship the product "Q7XT01000." The commit expedite request 1327 may be selected to commit a "provisional expedite," as described later in this document, in reference to an alternate embodiment.

Figure 13C:
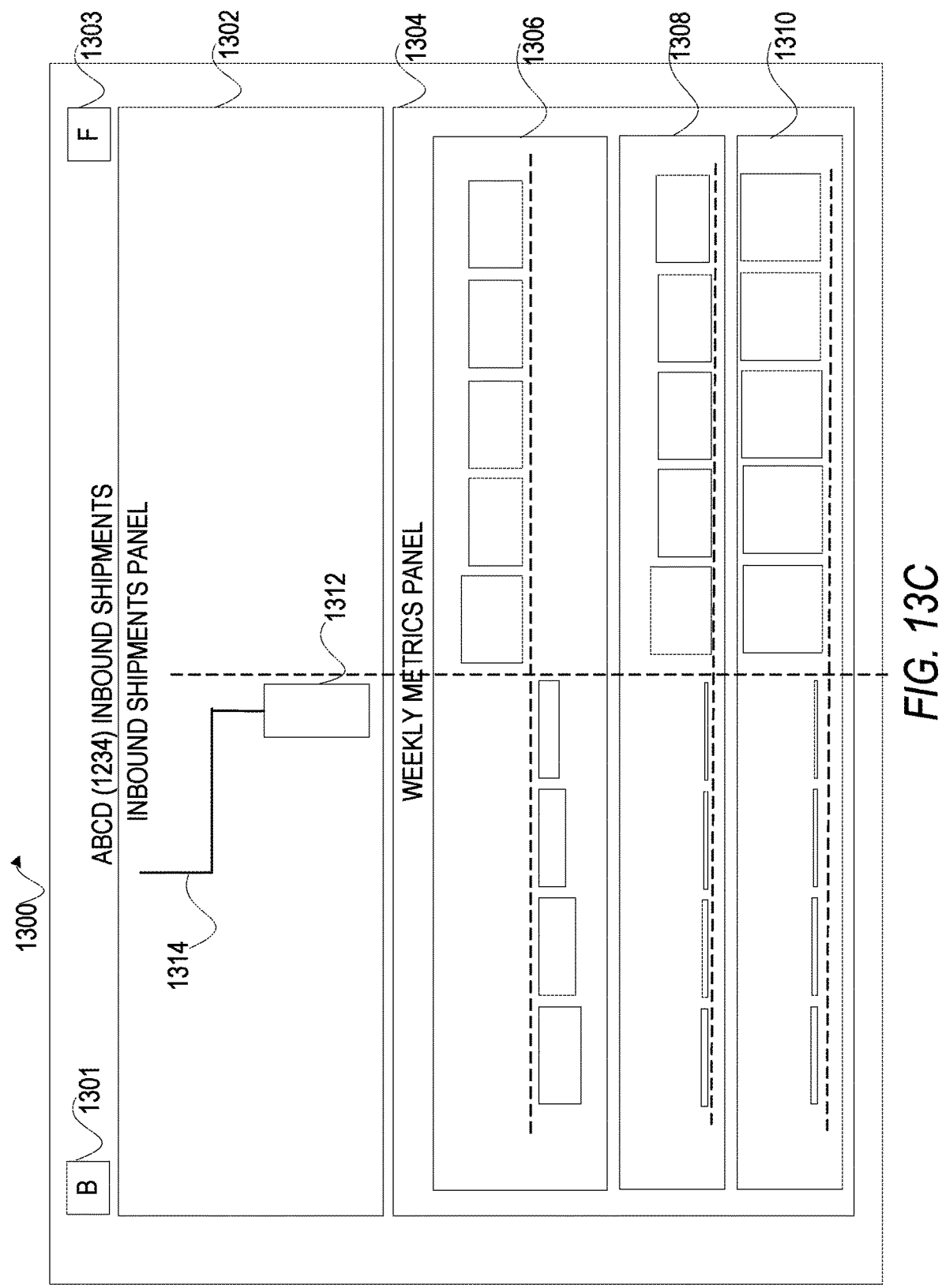
FIG. 13C illustrates the inbound shipments user interface, according to an embodiment.

FIG. 13C illustrates the inbound shipments user interface 1300, according to an embodiment, after expediting shipment. The inbound shipments user interface 1300 may be presented at operation 514 in FIG. 5. The inbound shipments user interface 1300 (e.g., third electronic user interface) illustrates expediting an inbound shipment. For example, selection of the option to expedite shipment, as illustrated in FIG. 13B, causes the arrival of the inbound shipment at ABCD (1234) to move to the left (e.g., two weeks) and the weekly metrics in the weekly metrics panel 1304 to be updated based on a new and earlier delivery date of the products. The inbound shipment moves to the left, two weeks, notwithstanding the inbound shipments leaving the outbound node (e.g., XYZ HUB) in the same week (e.g., end of week two) as before expediting. The inbound shipment has been expedited to cause the products to arrive "two" weeks earlier and impacting the predicted supply chain operational metrics, at least for the corresponding "two" weeks. For example, the predicted supply chain operational metrics that are impacted include, at least, the value at risk 1110 for the product (not shown) (e.g., decreasing the value at risk 1110), the days of supply, fill rate, and bookings to forecast ratio (e.g., forecast attainment). Accordingly, the weekly metrics panel 1304 is updated based on a new and earlier delivery date of the product. For example, the update to the weekly metric panel 1304 includes updating the days of supply panel 1306 (e.g., supply), the fill rate panel 1308 (e.g., demand), and the bookings to forecast ratio (e.g., forecast attainment) panel 1310.

Alternate Embodiment

According to an alternate embodiment, the user does not select expedite 1323 from the stock transfer request user interface 1320, as illustrated in FIG. 13B, but rather "provisional expedite request" (not illustrated). Selecting the "provisional expedite request" from the stock transfer request user interface 1320 does not immediately schedule an expediting of the shipment. Rather, the selection of the "provisional expedite request" is received by the access modules 228 and processed by the machine learning application 218 to cause the value at risk and other predicted supply chain operational metrics to be updated without scheduling an expediting of the shipment. In this embodiment, selecting the "provisional expedite request" enables the supply chain planners 230 to evaluate the impact of the contemplated action (e.g., expediting shipment). In this embodiment, the user must further commit to expediting the shipment to schedule the expediting of the shipment. For example, subsequent to selecting the "provisional expedite request," the user must further select a commit expedite request 1327 from the stock transfer request user interface 1320, as illustrated on FIG. 13B to schedule the expediting of the shipment. The "provisional expedite request" and the commit expedite request 1327 are included in the stock transfer request 1321.

B) Reallocate Outbound Shipment

FIG. 13D illustrates a reallocate outbound shipment user interface 1400, according to an embodiment. The reallocate outbound shipment user interface 1400 (e.g., fourth electronic user interface) may be presented at operation 514 in FIG. 5. The reallocate outbound shipment user interface 1400 may present one or more outbound shipments of a product at a node (e.g., hub 106) (e.g., XYZ HUB) in the supply chain 100 for a particular week (e.g., May 4, 2018). The reallocate outbound shipment user interface 1400 may be utilized to reallocate the quantity of products for a shipment that is outbound from a node in the supply chain 100. For example, the reallocate outbound shipment user interface 1400 may be utilized to increase the quantity of a product for a first outbound shipment and decrease a quantity of the product for a second outbound shipment. It will be appreciated that the net difference of product being shipped from an outbound node is zero. However, the reallocation of shipped products may result in reducing the value at risk 1110 for the product because the product may contribute to a surplus at a first outbound node (e.g., inbound node) and satisfy a deficiency at a second inbound node (e.g., inbound node).

The reallocate outbound shipment user interface 1400 includes a top panel 1402 and a bottom panel 1404. The top panel 1402 includes a week identifier 1403, the outbound node identifier 1324, and the product identifier 1112 (e.g., SKU). The week identifier 1403 identifies a week in a year. For example, the week identifier 1403 may include the Monday dates for weeks in a year (e.g., May 4, 2019). The outbound node identifier 1324 identifies the node in the supply chain 100 from which the product is being shipped, as previously described. The product identifier 1112 identifies the product that is being shipped. For example, the product identifier 1112 may include the SKU, as previously described.

The bottom panel 1404 includes rows of outbound shipment information 1406. Each row of outbound shipment information 1406 describes a shipment of the product identified with the product identifier 1112 from the node in the supply chain 100 identified with the outbound node identifier 1324 for the week identified with the week identifier 1403.

Each row of outbound shipment information 1406 includes the inbound node identifier 1326, days of supply information 1412, inventory quantity information 1414, value at risk 1110 for the product, shipment quantity information 1334, percentage of outbound shipments information 1420, new shipment quantity information 1422, and new percentage of shipment quantity information 1424. The inbound node identifier 1326 identifies the node in the supply chain that receives the shipment of the product. The days of supply information 1412 includes the number of days of inventory at the inbound node (e.g., for the row). For example, the days of supply information 1412 may include the days of supply (e.g., days of supply metric), as previously described. The inventory quantity information 1414 describes the inventory at the inbound node (e.g., for the row). For example, the inventory quantity information 1414 may include the number of products. The value at risk 1110 describes the value at risk for the product. For example, the value at risk 1110 at the inbound node 1326 may include the value at risk 1110 (e.g., predicted value at risk 1110) (e.g., value at risk 1110 metric), as previously described. The shipment quantity information 1334 describes the number of products scheduled for shipment for the identified week to the inbound node. For example, the shipment quantity information 1334 may include a count of the number of products. The percentage of outbound shipments information 1420 expresses the number of products being shipped to the designated inbound node compared with the number of products being shipped to all of inbound nodes for the week. For example, the percentage of products being shipped may be computed by dividing the count of the shipped products for the designated outbound node (e.g., 3000) with a sum of the counts of shipped products for all the inbound nodes for the week (e.g., 3000+1000+330). The new shipment quantity information 1422 corresponds to the shipment quantity information 1334; however, the new shipment quantity information 1422 is the changed number of products (e.g., new quantity) scheduled for shipment for the identified week to the inbound node. The new percentage of shipment quantity information 1424 corresponds to the percentage of outbound shipments information 1420; however, the new percentage of shipment quantity information 1424 is the changed percentage of products (e.g., new percentage) scheduled for shipment for the identified week to the inbound node.

An inventory manager may change the number of products being shipped to an inbound node by entering a number of products in the new shipment quantity information 1422. For example, the inventory manager may reduce the number of products being shipped to the CRUX inbound node by entering the number "2000" under the new shipment quantity information 1422. Entering the number "2000" under the new shipment quantity information 1422 reduces the number of products being shipped to the CRUX inbound node by "1000" products. In addition, the inventory manager may increase the number of products being shipped to the ABCD inbound node by entering the number "2000" under the new shipment quantity information 1422. Entering the number "2000" under the new shipment quantity information 1422 increases the number of products being shipped to the ABCD inbound node by "1000" products. These changes are illustrated in FIG. 13E.

FIG. 13E illustrates an outbound shipments change user interface 1430, according to an embodiment. The outbound shipments change user interface 1430 may be presented at operation 514 in FIG. 5. The outbound shipments change user interface 1430 (e.g., fifth electronic user interface) includes an outbound shipments change 1431 (not shown), as described later in this document. The outbound shipments change user interface 1430 includes an information panel 1432, a remove request 1434, and a commit new quantities request 1435. The information panel 1432 includes the product identifier 1112 (e.g., SKU), the shipping date 1328, the outbound node identifier 1324 (e.g., "XYZ HUB (1234)"), the inbound node identifier 1326 (e.g., "CRUX (123)") (e.g., "ABCD (1234)"), the shipment quantity information 1334, and the new shipment quantity information 1422. The remove request 1434 may be selected to cancel the outbound shipment change. The commit new quantities request 1435 may be selected to commit the outbound shipment change, as described later in this document, in reference to an alternate embodiment.

The outbound shipments change user interface 1430 illustrates an outbound shipments change. The outbound shipments change user interface 1430 illustrates a reduction of "1000" products being shipped to the "CRUX" inbound node (e.g., under the new shipment quantity information 1422) and an increase of "1000" products being shipped to the ABCD inbound node (e.g., under the new shipment quantity information 1422). For example, the products being shipped to the "CRUX" inbound node was reduced from "3000," in FIG. 13D, to "2000," in FIG. 13E and the products being shipped to the "ABCD" inbound node was increased from "1000." in FIG. 13D, to "2000" in FIG. 13E. Note that the reallocation of "1000" shipped products is associated with a reduction in the value at risk 1110 (e.g., predicted value at risk) for the product at ABCD from "$11,800," in FIG. 13D, to "$0.00" in FIG. 13F. In addition, note that the reallocation of "1000" shipped products from the CRUX inbound node to the ABCD node does not increase the value at risk 1110 (e.g., predicted value at risk) for the product at the CRUX inbound node which remains at "$0.00" before and after the change.

FIG. 13F illustrates the reallocate outbound shipment user interface 1400, according to an embodiment. The reallocate outbound shipment user interface 1400 (e.g., fourth electronic user interface) may be presented at operations 514 in FIG. 5. The reallocate outbound shipment user interface 1400, in FIG. 13F, illustrates a reduction of "1000" products being shipped to the "CRUX" inbound node (e.g., under the new shipment quantity information 1422) and an increase of "1000" products being shipped to the ABCD inbound node (e.g., under the new shipment quantity information 1422), as previously described.

Alternate Embodiment

According to an alternate embodiment, the user does not enter new quantity 1422 values on the reallocate weekly outbound shipments user interface 1400, as illustrated in FIG. 13D, but rather "provisional new quantities" (not illustrated). Entering "provisional new quantities" on the reallocate weekly outbound shipments user interface 1400 does not immediately schedule a reallocation of a weekly outbound shipments. Rather, the "provisional new quantities" are received by the access modules 228 and processed by the machine learning application 218 to cause the value at risk and other predicted supply chain operational metrics to be updated without scheduling a reallocation of the weekly outbound shipments. In this embodiment, entering the "provisional new quantities" enables the supply chain planners 230 to evaluate the impact of the contemplated action (e.g., reallocating weekly outbound shipments). In this embodiment, the user must further commit to scheduling a reallocation of the weekly outbound shipments. For example, subsequent to entering "provisional new quantities" on the reallocate weekly outbound shipments user interface 1400, the user must further select a commit new quantities request 1435 on the outbound shipments change user interface 1430, as illustrated on FIG. 13E, to schedule the reallocation of the weekly outbound shipments. The "provisional new quantities" and the commit new quantities request 1435 are included in the stock transfer request 1321.

Figure 13G:
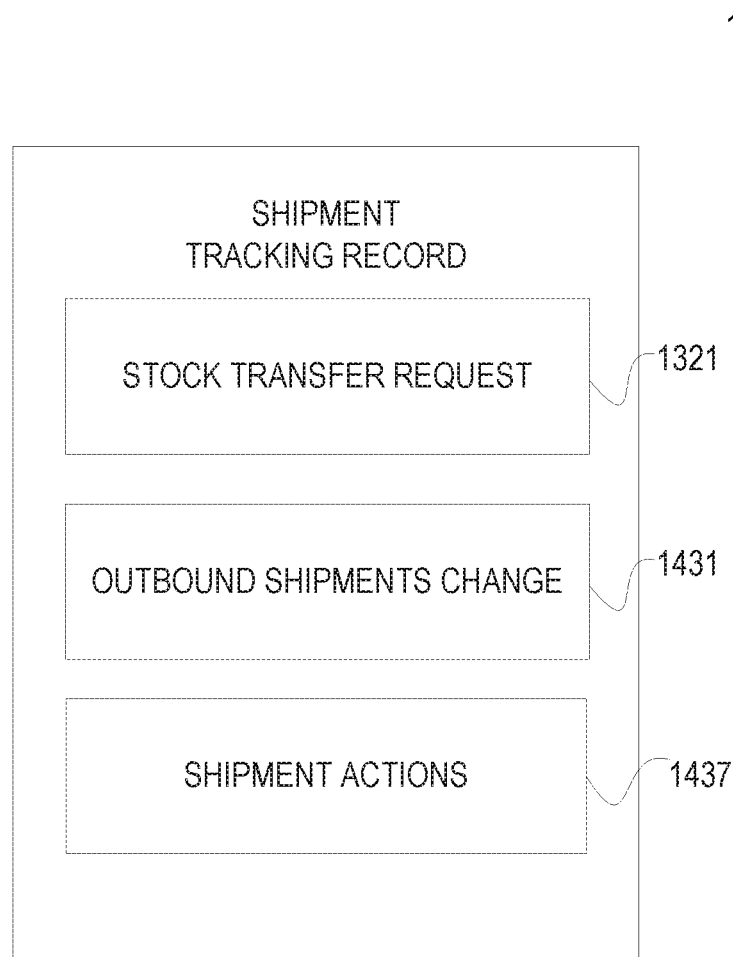
FIG. 13G illustrates an outbound shipment tracking record, according to an embodiment.

FIG. 13G illustrates a shipment tracking record 1436, according to an embodiment. The shipment tracking record 1436 may be communicated to a planning system 208 responsive to the machine-learning application 218 receiving input that causes a change to a shipment of a product. The shipment tracking record 1436 includes the stock transfer request 1321, as previously described, or the outbound shipments change 1431, as previously described, and the shipment set of actions 1437. The shipment set of actions 1437 includes a sequence of actions that may be performed by the machine-learning application 218 and/or the planning system 208 responsive to the machine-learning application 218 receiving input that causes a change to a shipment of a product. The shipment set of actions 1437 may include a sequence of actions impacting the product (e.g., delivery date of the product) including a sequence of actions to expedite a shipment of the product (e.g., first action) or a sequence of actions to reallocate quantities of products being shipped in outbound shipments (e.g., second action).

The shipment set of actions 1437 may include the sequence of actions to expedite a shipment of the product (e.g., first action) responsive to the machine-learning application 218 receiving input that causes a change to an inbound shipment of the product to be expedited, as illustrated in FIG. 13A, FIG. 13B, and FIG. 13C. For example, the sequence of actions may include actions for updating the inbound shipment of the product to utilize a different mode of transportation (e.g., shipping the product by air, train, or the like).

The shipment set of actions 1437 may include a sequence of actions to reallocate quantities of products being shipped in outbound shipments (e.g., second action) responsive to the machine-learning application 218 receiving input causing a change to a first outbound shipment of the product and receiving input causing a change to a second outbound shipment of the product, as illustrated in FIG. 13D. FIG. 13E, and FIG. 13F.

Figure 13H:
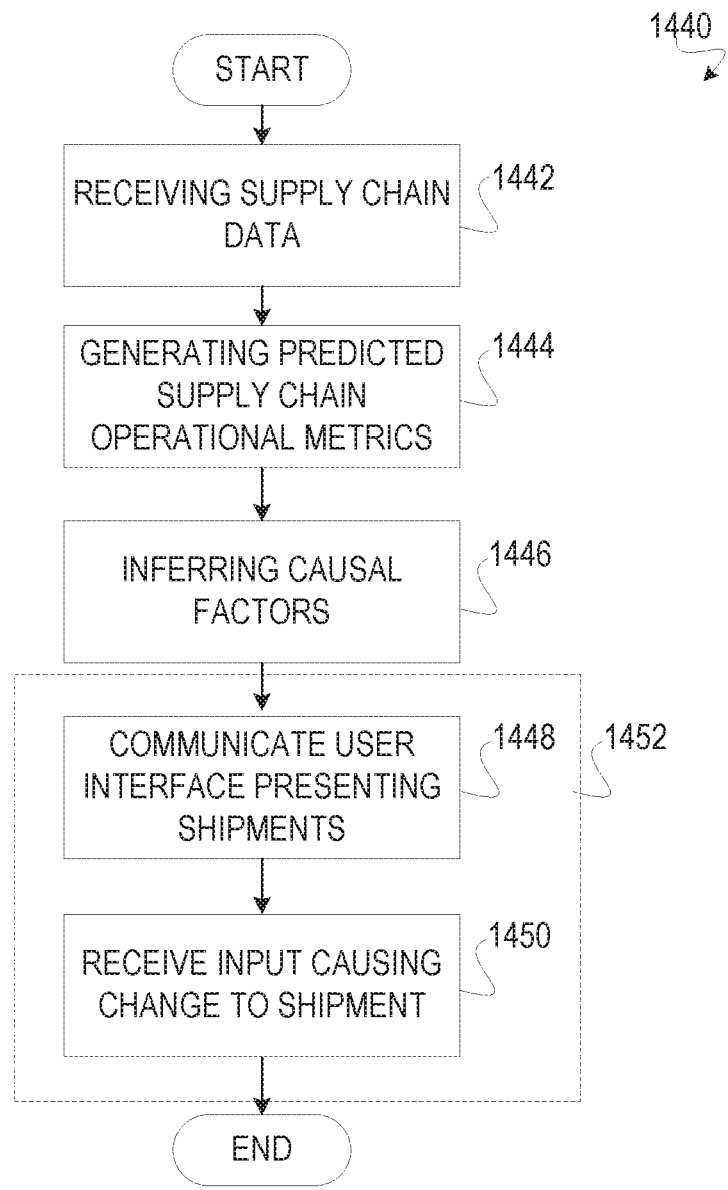
FIG. 13H illustrates a method, according to an embodiment, to control inventory in a supply chain.

FIG. 13H illustrates a method 1440, according to an embodiment, to control inventory in a supply chain, according to an embodiment. The method 1440 commences at operation 1442 with the machine-learning application 218, at the supply chain server machine 205, receiving supply chain data 306. For example, the machine-learning application 218 may receive the supply chain data 306 for delivery of a product. The supply chain data 306 may include input signals comprising operational plans and observed supply chain operational metrics, as previously described. The observed supply chain operational metrics is observed across the supply chain 100. The operation 1142 is described in further detail in operation 600 in FIG. 5.

At operation 1444, the machine-learning application 218 automatically generates predicted supply chain operational metrics. At the operation 1444, the machine-learning application 218 uses the operational plans and the observed supply chain operational metrics to generate predicted supply chain operational metrics across the nodes of the supply chain 100. The predicted supply chain operational metrics may include a value at risk 1110 that is predicted for a product. For example, the value at risk 1110 that is predicted for a product may be based on a shipment date of the product or a quantity of the product in a shipment. For example, the value at risk 1110 that is predicted for a product may include the value at risk 1110 that is predicted for the product identified by a product identifier 1112 (e.g., first product). The value at risk 1110 and the product (e.g., first product) are displayed in the supply network planning user interface 1200, as illustrated on FIG. 12. Broadly, the predicted supply chain operational metrics include fill rate, service level, inventory metric, demand forecast, forecast attainment, the value at risk 1110, inventory holding costs, expedite costs and liquidation costs, and so forth. The predicted supply chain operational metrics are generated for at least one hierarchical level including the distribution center 108, the hub 106, the plant 104, the logistic center, the customer 110 (e.g., customer location) and a geographic location (e.g., California. North America. Europe, San Jose, Santa Clara County. and the like. The operation 1144 is described in further detail in the operations illustrated in FIG. 5, excluding operations 600, 516, and 518.

At operation 1446, the machine-learning application 218 automatically infers causal factors that impact the predicted supply chain operational metrics. The machine-learning application 218 utilizes the observed supply chain operational metrics to automatically infer the causal factors. The causal factors include but are not limited to the shipment (e.g., first shipment) of a product (the first product). The operation 1446 is described in further detail in the operations illustrated in FIG. 5, excluding operations 600, 516, and 518.

At operation 1448, the machine-learning application 218 communicates, via the access applications 228 and over a network, a user interface for presenting shipments of the product (e.g., first product). The user interface may be communicated to the client machine 203. The client machine 203 may be operated by supply chain planners 230. The user interface for presenting shipments of the product may be embodied as the inbound shipments user interface 1300 (e.g., third electronic user interface), as illustrated on FIG. 13C.

At operation 1450, the machine-learning application 218 receives input (e.g., first input) causing a change to a shipment (e.g., first shipment) of a product (e.g., first product). The change to the shipment may impact the predicted supply chain operational metrics. For example, the change to the shipment may impact a value at risk 1110 for a product (e.g., first product).

An operation 1452 includes the operations 1448 and the operation 1450. The operation 1452 is described in further detail in FIG. 13I.

Figure 13I:
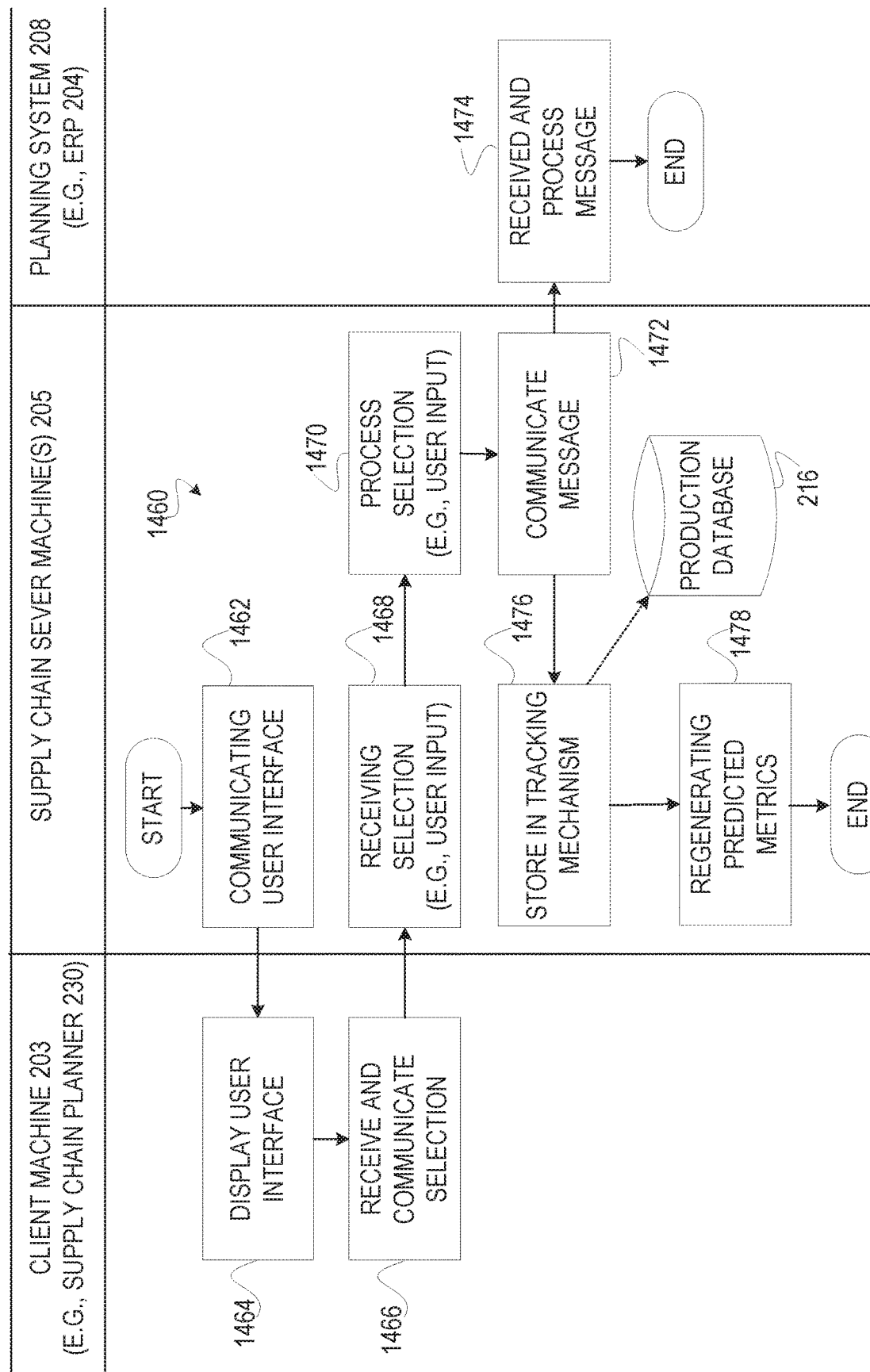
FIG. 13I is a block diagram illustrating a method, according to an embodiment, to present and process shipments.

FIG. 13I is a block diagram illustrating a method 1460, according to an embodiment, to present and process shipments. The method 1460 further describes operations performed in operations 514 and 516 of FIG. 5 and the operation 1452 in FIG. 13H. Illustrated on the left is the client machine 203; illustrated in the middle are one or more supply chain server machines 205; and illustrated on the right is the planning system 208 (e.g., enterprise resource planning system 204). The client machine 203 may be operated by a supply chain planner 230. The supply chain server machine 205 hosts the access applications 228, the machine-learning application 218, the machine-learning application trainer 224, and other applications, as illustrated in FIG. 2. The planning system 208 may include the enterprise resource planning system 204.

The method 1460 commences, at operation 1462, with the supply chain server machine 205 communicating an electronic user interface over a network (e.g., Internet) to the client machine 203. For example, the machine-learning application 218 may communicate the inbound shipments user interface 1300 (e.g., third electronic user interface) to the client machine 203.

At operation 1464, the client machine 203 receives and displays the electronic user interface (e.g., inbound shipments user interface 1300). At operation 1466, the client machine 203 receives and communicates input via the electronic user interface. For example, the client machine 203 may receive input (e.g., first input) via the inbound shipments user interface 1300 (e.g., third electronic user interface) and communicate the input to the machine-learning application 218.

At operation 1468, at the supply chain server machine 205, the machine learning application 218 receives the input, via the access applications 228, and, at operation 1470, the machine learning application 218 processes the input. For example, the machine learning application 218 may processes the input (e.g., first input) by causing a change to an inbound shipment (e.g., first inbound shipment) of the product as described in association with FIG. 13A, FIG. 13B, and FIG. 13C. The machine learning application 218 processes the input to cause a sequence of actions that expedites the inbound shipment of the product (e.g., first action), as previously described. For example, the machine learning application 218 may processes one or more actions from the shipment actions 1437 in FIG. 13G.

At operation 1472, the machine learning application 218 communicates one or more messages to the planning system 208. The messages may include the shipment tracking record 1436, as illustrated in FIG. 13G. For example, the machine learning application 218 may initialize the shipment tracking record 1436, as illustrated in FIG. 13G, with the stock transfer request 1321, as illustrated in FIG. 13B. In addition, the machine learning application 218 may initialize the production tracking record 1620 with shipment actions 1437 including a sequence of actions to expedite a shipment of the product (e.g., first action).

At operation 1474, the planning system 208 receives and processes the messages. According to one embodiment, the receiving the message(s) may cause the planning system to expedite an inbound shipment (e.g., first inbound shipment) of the product (e.g., first product). For example, the planning system 208 may processes one or more actions from the shipment actions 1437 in FIG. 13G.

At operation 1476, the machine learning application 218 stores the shipment tracking record 1436 in a tracking mechanism (e.g., table) in the production database 216. At operation 1478, the machine-learning application 218 regenerates the predicted supply chain operational metrics as described in operation 518 on FIG. 5. Accordingly, the method 1460 is utilized to expedite a shipment of a product, as described above.

Reallocate Outbound Shipment

In a second embodiment the method 1460 is utilized to receive input (e.g., first input) via the reallocate outbound shipment user interface 1400 that causes a reallocation of quantities of products being shipped in outbound shipments. The input may be received in the form of one or more messages from the client machine 203. The input may include two shipment quantities. For example, the shipment quantity of the product for a first outbound shipment from a node in the supply chain 100 may be increased and the shipment quantity of the product for a second outbound shipment from the node in the supply chain 100 may be decreased, as illustrated in FIG. 13D. FIG. 13E, and FIG. 13F. Accordingly, a surplus quantity of a product at a first node is redistributed to satisfy a deficient quantity of the product at the second node. Further, in the second embodiment, the machine-learning application 218 may process the input to cause a sequence of actions to reallocate quantities of products being shipped in outbound shipments (e.g., second action). For example, the machine-learning application 218 may processes one or more actions from the shipment actions 1437.

Further, the machine-learning application 218 may initialize and communicate the shipment tracking record 1436 to the planning system 208. For example, the shipment tracking record 1436, as illustrated in FIG. 13G, may be initialized with the outbound shipments change 1431 and the shipment actions 1437 may be initialized with a sequence of actions to reallocate quantities of products being shipped in outbound shipments (e.g., second action). Further, the machine-learning application 218 may communicate the shipment tracking record 1436 to the planning system 208 causing a decrease in a shipment quantity of the first product for the second outbound shipment and an increase in a shipment quantity of the first product for the first outbound shipment at the planning system 208. For example, the planning system 208 may processes one or more actions from the shipment actions 1437.

III Controlling Resources in a Supply Chain

A) Reschedule Production Run on Production Resource

Figure 14A:
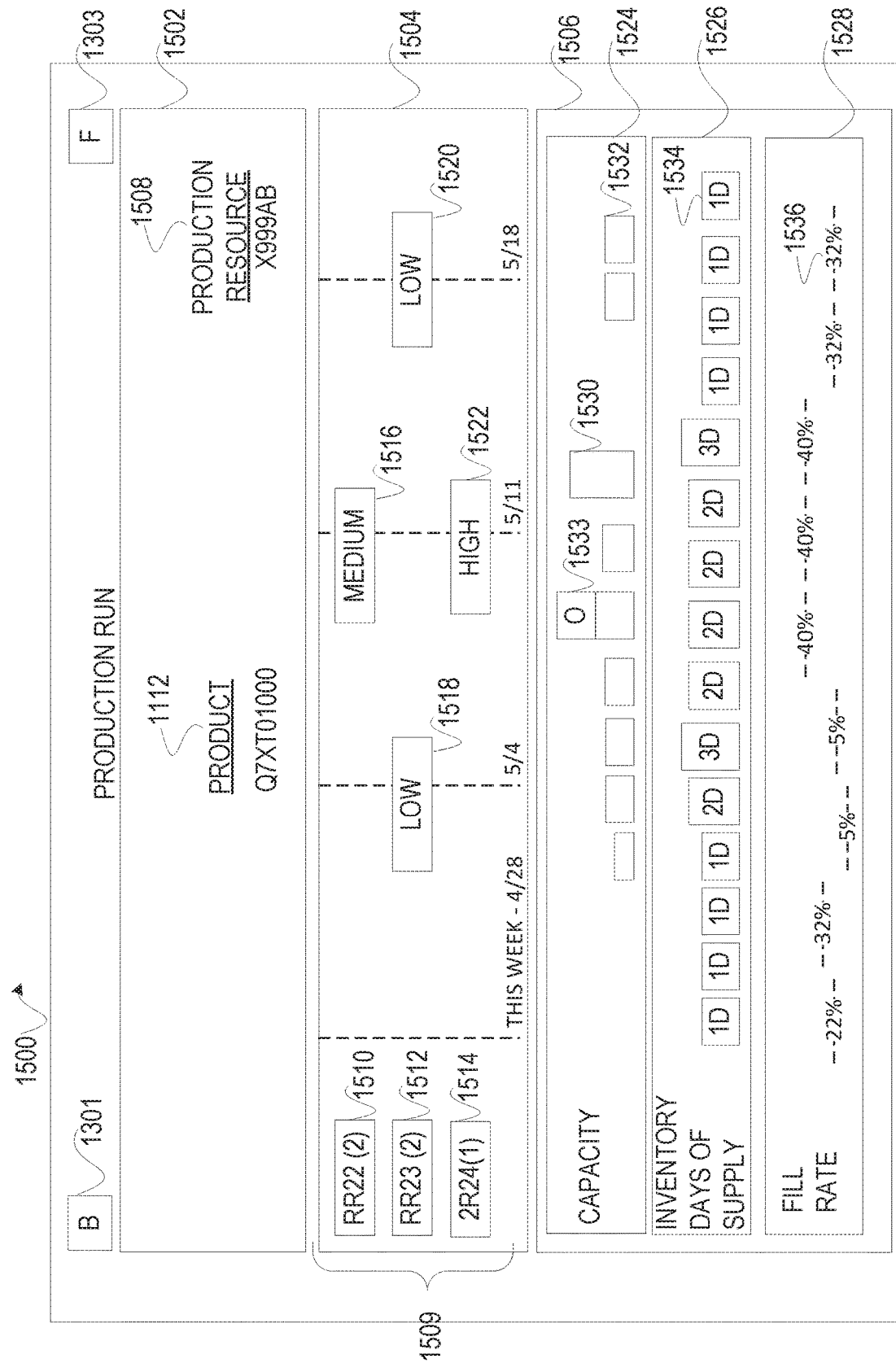
FIG. 14A illustrates a production run user interface, according to an embodiment.

FIG. 14A illustrates a production run user interface 1500, according to an embodiment. The production run user interface 1500 (e.g., sixth electronic user interface) may be presented at operation 514 in FIG. 5. The production run user interface 1500 may be utilized to reschedule a production run of a product on a production resource. The production run user interface 1500 includes a title panel 1502, a production run panel 1504, a context panel 1506, the user interface element 1301 and the user interface element 1303. The user interface element 1301 may be selected to roll (e.g., slide) the production run panel 1504 and the context panel 1506 backward in time. The production run panel 1504 and the context panel 1506 are rolled backward in time to expose production runs and contextual metrics corresponding to the production runs for earlier weeks. In addition, the user interface element 1303 may be selected to roll (e.g., slide) the production run panel 1504 and the context panel 1506 forward in time. The production run panel 1504 and the context panel 1506 are rolled forward in time to expose production runs and corresponding contextual metrics for later weeks.

The title panel 1502 includes the product identifier 1112 and a production resource identifier 1508. The product identifier 1112 identifies the product being produced. The production resource identifier 1508 identifies the production resource that is being utilized to produce the product. The production resource produces the product with a production run. Recall that a production resource may include one or more machines, one or more tools, one or more employees, or any combination thereof.

The production run panel 1504 illustrates production runs 1509 on the production resource "X999AB." The production runs 1509 include a production run 1516, a production run 1518, a production run 1520, and a production run 1522. Each of the production runs 1509 produces the product "Q7XT01000" or a sub-product. For example, the production run 1516 produces a sub-product 1510 (e.g., "RR22"), the production run 1518 and the production run 1520 produce the sub-product 1512 (e.g., "RR23"), and the production run 1522 produces a sub-product 1514 (e.g., "2R24"). The sub-products 1510, 1512, and 1514 may be distinguishable. For example, the sub-products 1510, 1512, 1514 may be different colors. Each of the production runs 1509 are ranked according to a value at risk 1110. For example, the production runs 1518 and 1520 are ranked with a "LOW" value at risk 1110; the production run 1516 is ranked with a "MEDIUM" value at risk 1110; and the production run 1522 is ranked with a "HIGH" value at risk 1110.

The context panel 1506 includes predicted supply chain operational metrics that provide a context for scheduling/rescheduling a production run. The predicted supply chain operational metrics include a capacity panel 1524 for displaying a capacity metric (e.g., capacity), an inventory days of supply panel 1526 for displaying a days of supply metric (e.g., days of supply), a fill rate panel 1528 for displaying a fill rate metric (e.g., fill rate), and a bookings to forecast ratio panel (e.g., forecast attainment) (not shown) for displaying a bookings to forecast ratio metric (e.g., forecast attainment).

The capacity metric includes histogram bars indicating utilization of a capacity of the production resource "X999AB" over time (e.g., "THIS WEEK"-"5/18."). For example, the capacity metric includes a histogram bar 1530 in the week "5/11" and a histogram bar 1532 the week of "5/18" indicating utilization of a capacity of the production resource "X999AB." The histogram bar 1530 is higher than the histogram bar 1532 indicating the production resource "X999AB" is better utilized in the week of "5/11." In addition, the capacity metric includes a histogram bar 1533 in the week "5/4." designated "O," indicating an over (e.g., inefficient) utilization of the production resource "X999AB." For example, the product resource "X999AB" may be inefficiently utilized because of paying operator overtime or for operating machines during peak power costs, and the like.

The inventory days of supply panel 1526 includes histogram bars each designated with a number of days of supply of the product "Q7XT01000" at a node in the supply chain 100 including the production resource "X999AB." For example, a histogram bar 1534 includes a days of supply designated "1D," indicating the present demand for the product at the node including the production resource "X999AB" will be exhausted after one day based on a current demand for the product. The days of supply may include negative days of supply, as previously described.

The fill rate panel 1528 includes histogram bars each designated with demand percentages of customer demand (e.g., sales orders) met through immediate stock availability, without backorders or lost sales at the node in the supply chain 100 including the production resource "X999AB." For example, a demand percentage 1536 with a percentage "32%" indicates filling 32% of customer demand (e.g., sales orders) through immediate stock availability, without any backorders or lost sales.

The production run user interface 1500 may be scrolled down to expose a bookings to forecast ratio panel including a bookings to forecast metric over time, as previously described. For example, the production run user interface 1500 may be scrolled down to expose the predicted supply chain operational metrics described above (e.g., capacity, days of supply, fill rate, and bookings to forecast ratio) each according to a geographic region. For example, the production run user interface 1500 may be scrolled down to expose the capacity panel 1524, the inventory days of supply panel 1526, the fill rate panel 1528 and a bookings to forecast ratio panel each for the geographic regions including North America. South America, Europe. Asia. Australia, Africa, and the like.

The context panel 1506 and the value at risk rankings (e.g., "LOW, "MEDIUM," "HIGH") in the production run panel 1504 provide a context for rescheduling a production run on the production resource "X999AB." For example, a resource planner may identify the production run 1522 as desirable to reschedule because its value at risk 1110 is ranked "HIGH." In addition, the resource planner may identify a more opportune time to schedule the production run 1522 based on the value at risk rankings for the other production runs and the context provided by the context panel 1506. For example, the resource planner may select the production run 1522 and drag it to the beginning of "THIS WEEK—April 28" to avoid the utilization of the production resource "X999AB" by the other production runs 1518, 1516, and 1520 and to utilize the production resource "X999AB" during a period of time where the utilization of the capacity is low, the inventory days of supply are low, and the fill rate is low. The drag and drop gesture causing the production run 1522 to be dropped to the beginning of "THIS WEEK—April 28" causes the machine-learning application 218 to receive input (e.g., first input) causing a change to the utilization of the production resource "X999AB" that impacts the predicted supply chain operational metrics including impacting the value at risk 1110 in the scheduling of the production run 1522 (e.g., first production run).

FIG. 14B illustrates a production schedule change user interface 1550, according to an embodiment. The production schedule change user interface 1550 (e.g., seventh electronic user interface) may be presented at operation 514 in FIG. 5. The production schedule change user interface 1550 includes a production schedule change 1551 (not shown). The production schedule change user interface 1550 includes an information panel 1552, a remove request 1554, and a commit same resource request 1555. The information panel 1552 includes a production order identifier 1556, a product identifier 1112 (e.g., SKU), a production resource identifier 1508, a production date 1558, and a production quantity 1560.

The production order identifier 1556 identifies a production order. The production order memorializes a change to the production schedule. The product identifier 1112 (e.g., SKU) identifies the product that is being produced. The production resource identifier 1508 identifies a production resource that is producing the product. The production date 1558 identifies a change of date for the production run on the production resource "X999AB." For example, the production date 1558 identifies an old production date of "2019-05-08" and a new production date of "2019-05-01." The production quantity 1560 is the quantity of the product being produced. For example, the production quantity is "3800." The remove request 1554 may be selected to cancel the production schedule change. The commit same resource request 1555 may be selected to commit a provisional request, as described later in this document, in reference to an alternate embodiment.

Figure 14C:
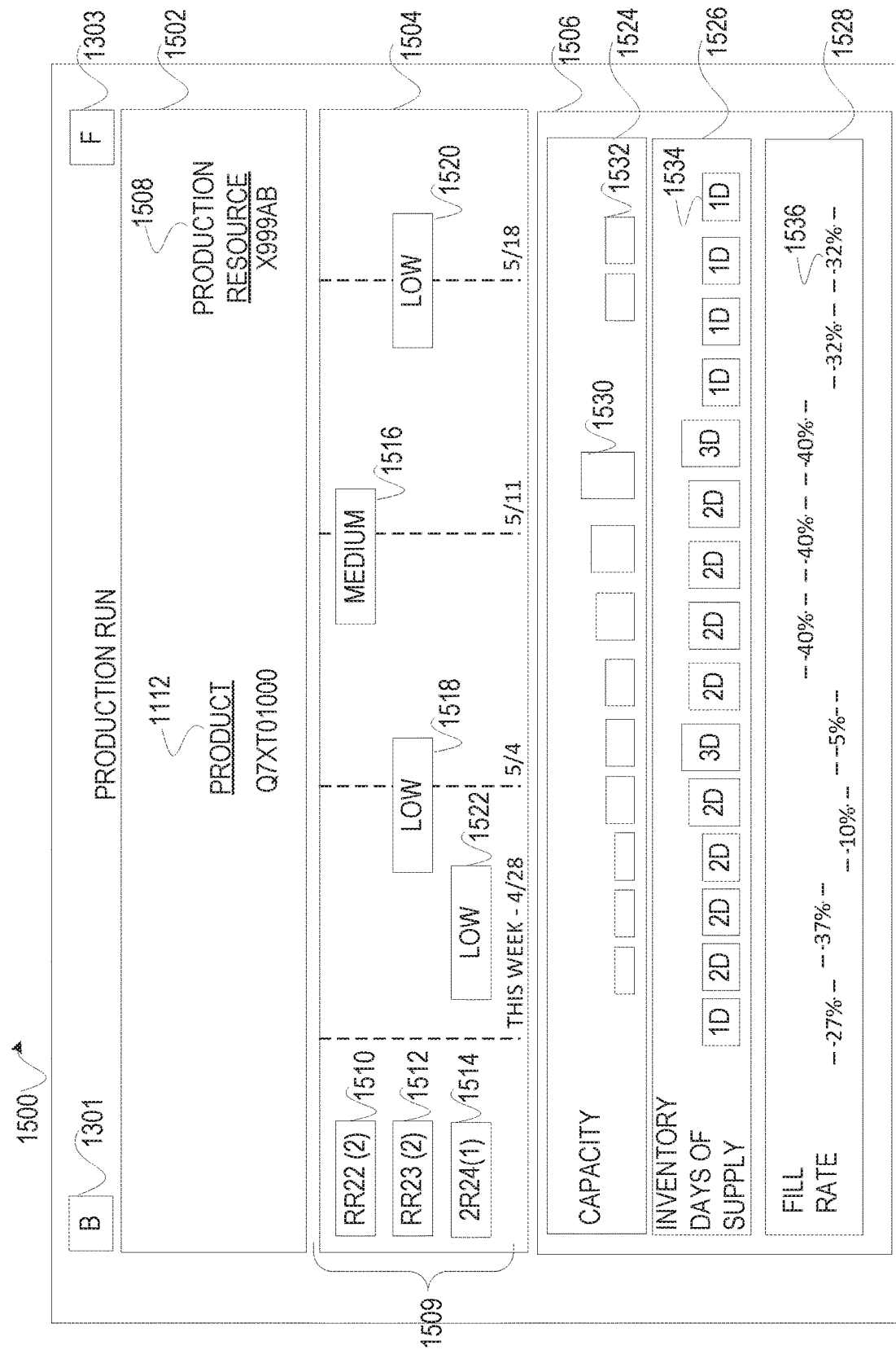
FIG. 14C illustrates the production run user interface, according to an embodiment.

FIG. 14C illustrates the production run user interface 1500, according an embodiment. The production run user interface 1500 (e.g., sixth electronic user interface) may be presented at operations 514 in FIG. 5. The production run user interface 1500 displays the production schedule change illustrated in FIG. 14B. For example, the production run user interface 1500 illustrates the production run 1522 as being dragged from May 8, 2019 to May 1, 2019. In addition, the production run 1522 is associated with updated predicted supply chain operational metrics. For example, the updated predicted supply chain operational metrics include an updated value at risk ranking for production run 1522 from "HIGH" to "LOW," an updated capacity metric showing an increase in the utilization of the production resource identified by the production resource identifier 1508 "X999AB" (see three histogram bars), an updated inventory days of supply metric increasing from one day (e.g., "1D") to two days (e.g., "2D") (see three histogram bars), and an updated fill rate increasing from "5% to 10%. "32% to 37%" and 22% to 27% (see three histogram bars) respectively.

Alternate Embodiment

According to an alternate embodiment, the user does not perform a drag and drop gesture from the production run user interface 1500, as illustrated in FIG. 14A, but rather a "provisional drop and drag gesture" (not illustrated). Performing the "provisional drop and drag gesture" from the production run user interface 1500 does not immediately cause a change to the utilization of a production resource (e.g., different date and/or time). Rather, performance of the "provisional drop and drag gesture" is received by the access modules 228 and processed by the machine learning application 218 to cause the value at risk and other predicted supply chain operational metrics to be updated without causing the change to the utilization of the production resource. In this embodiment, performing the "provisional drop and drag gesture" enables the supply chain planners 230 to evaluate the impact of the contemplated action (e.g., change to utilization of production resource). In this embodiment, the user must further commit to causing the change the utilization of a production resource (e.g., different date and/or time). For example, subsequent to performing the "provisional drop and drag gesture" the user must further select commit same resource request 1555 from the production schedule change user interface 1550, as illustrated on FIG. 14B, to cause the change to the utilization of the production resource (e.g., different date and/or time). The production schedule change 1551 includes the "provisional drop and drag gesture" and the "commit same resource request 1555."

B) Reschedule Production Run on a Different Production Resource

Figure 14D:
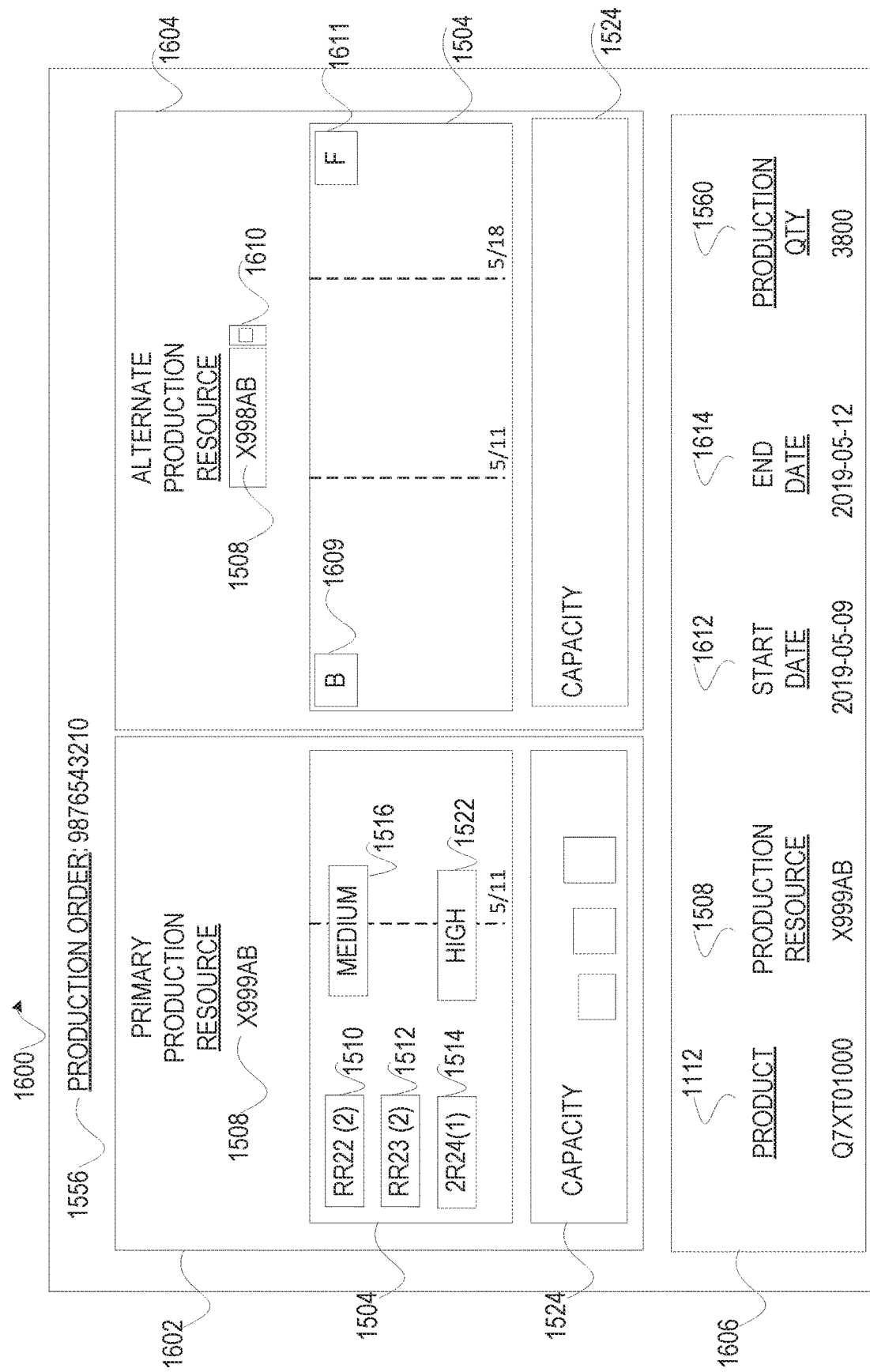
FIG. 14D illustrates a production order user interface, according to an embodiment.

FIG. 14D illustrates a production order user interface 1600, according to an embodiment. The production order user interface 1600 (e.g., eighth user interface) may be presented at operation 514 in FIG. 5. The production order user interface 1600 displays a production order for a production run. According to one embodiment, a drag and drop gesture (e.g., first input) may be received via the production order user interface 1600 causing a change to a utilization of the production resource (e.g., first production resource) that is being utilized for the production run. For example, a production run 1522 (e.g., first user interface element) may be selected from a production run panel 1504 in the primary production panel 1602 of the production order user interface 1600 (e.g., first user interface), dragged, and dropped to a production run panel 1504 in an alternate production panel 1604. Accordingly, the production run 1522 (e.g., first production run) is removed from one production resource (e.g., first production resource) and added to another production resource (e.g., second production resource). For example, the drag and drop gesture causes a change to a utilization of a production resource "X999AB" (e.g., first production resource) and a change to a utilization of a production resource "X998AB" (e.g., second production resource). Accordingly, the production resource "X999AB" is no longer utilized to produce the product and the production resource "X998AB" is utilized to produce the product responsive to receiving the drag and drop gesture. The changes to the utilization of the production resource "X999AB" (e.g., first production resource) and the production resource "X998AB" (e.g., second production resource) impacts the predicted supply chain operational metrics.

Broadly, the production order user interface 1600 is displayed responsive to receiving a selection that identifies a production run. For example, the production order user interface 1600 is displayed responsive to receiving a selection identifying the production run 1522 from the production run panel 1504, as displayed in the production run user interface 1500 illustrated on FIG. 14A. Returning to FIG. 14D, the production order user interface 1600 includes the production order identifier 1556, the primary production panel 1602, the alternate production panel 1604, and production order panel 1606. The production order identifier 1556 identifies the production order (e.g., "9876543210").

The primary production panel 1602 describes a production resource (e.g., primary) that is scheduled to be utilized for the production run selected. For example, the production order corresponds to the production run 1522, as selected from the production run panel 1504 in the production run user interface 1500, as illustrated in FIG. 14A. Returning to FIG. 14D, the primary production panel 1602 includes the production resource identifier 1508 (e.g., "X999AB"), a portion of the production run panel 1504 corresponding to the production run selected (e.g., production run 1522), and a portion of the capacity panel 1524 corresponding to the production run selected (e.g., production run 1522), both as previously described.

The alternate production panel 1604 displays a production resource that may be utilized (e.g., alternate) for the production run selected. The alternate production panel 1604 includes a production resource identifier 1508 (e.g., "X998AB"), a selector 1610, the production run panel 1504, and the capacity panel 1524. The production resource identifier 1508 (e.g., "X999AB") identifies a production resource that may be utilized as an alternate. The selector 1610 may be utilized to select another production resource as the alternate. For example, the selector 1610 may expose a list of production resources from which the alternate production resource may be selected. The production run panel 1504 and the capacity panel 1524 were previously described. In the present example, the production run panel 1504 and the capacity panel 1524 are displayed for the production resource that is selected by the selector 1610 (e.g., "X998AB"). The production run panel 1504 and the capacity panel 1524, as illustrated in the alternate production panel 1604, indicate no production runs as being scheduled for the weeks being displayed. In one embodiment, the production run panel 1504 and the capacity panel 1524 may be rolled. For example, the alternate production panel 1604 may include a user interface element 1609 that is selected to roll (e.g., slide) the production run panel 1504 and the capacity panel 1524 backward in time to expose earlier weeks of data. Further for example, the alternate production panel 1604 may include a user interface element 1611 that is selected to roll (e.g., slide) the production run panel 1504 and the capacity panel 1524 forward in time to expose later weeks of data. Other embodiments may utilize other types of user interface controls.

The production order panel 1606 includes the product identifier 1112, the production resource identifier 1508, a start date 1612, an end date 1614, and the production quantity 1560. The product identifier 1112 identifies the product being produced. The production resource identifier 1508 identifies the production resource being utilized to produce the product. For example, the production resource identifier 1508 identifies the production resource "X999AB." The start date 1612 is the scheduled date to begin the production run. The end date 1614 is scheduled to complete the production run. The production quantity 1560 is the number of products being produced in the production run.

Figure 14E:
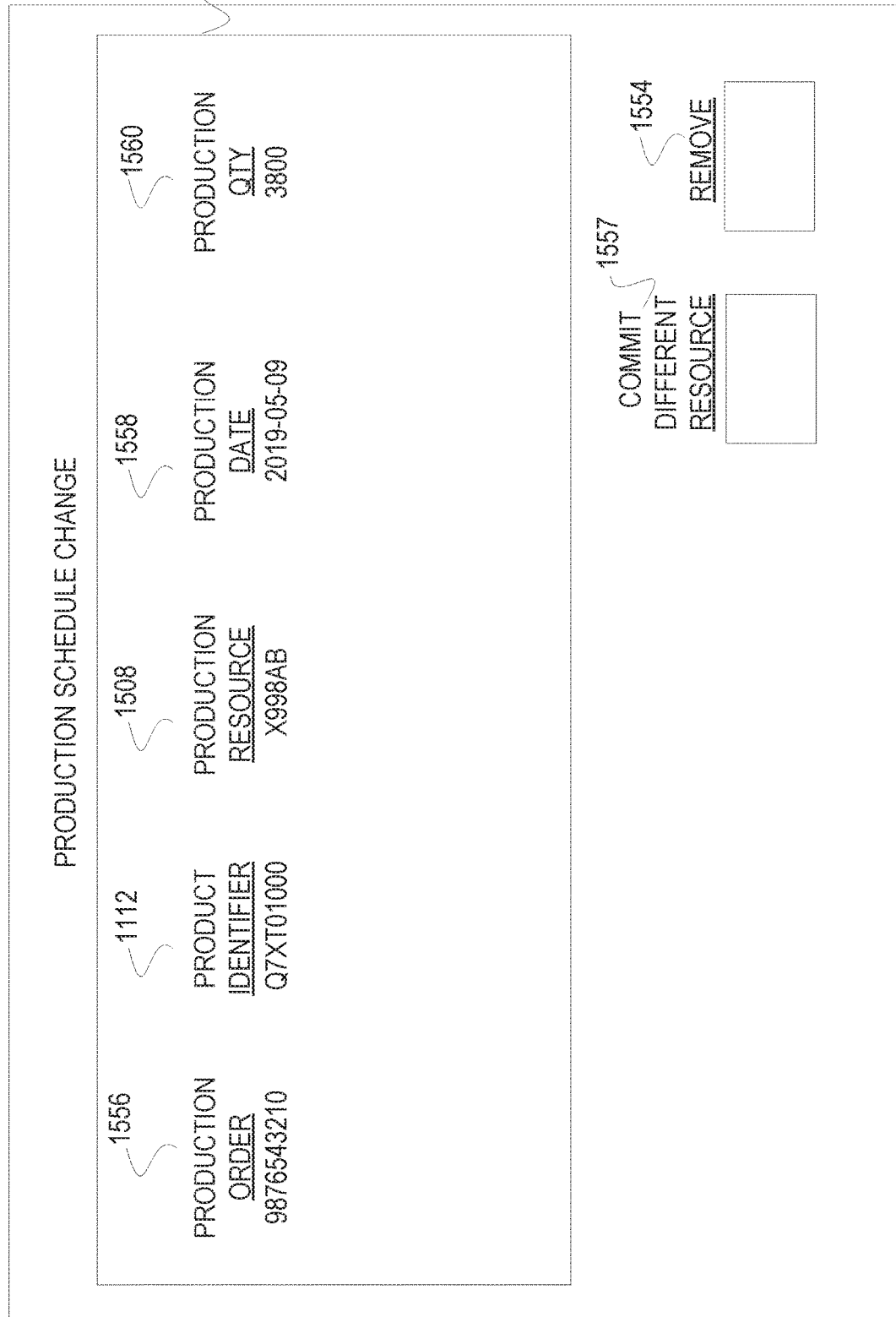
FIG. 14E illustrates a production schedule change user interface, according to an embodiment.

FIG. 14E illustrates a production schedule change user interface 1550, according to an embodiment. The production schedule change user interface 1550 (e.g., seventh electronic user interface) may be presented at operation 514 in FIG. 5. The production schedule change user interface 1550 includes the production schedule change 1551. The production schedule change user interface 1550 may be displayed responsive to receiving a drag and drop gesture (e.g., first input), described in FIG. 14D. For example, the production order identifier 1556 "9876543210" being displayed corresponds to the production run 1522 selected, dragged, and dropped, as previously described in FIG. 14D. The production schedule change user interface 1550 includes an information panel 1552, a remove request 1554 and a commit different resource request 1557. The commit different resource request 1557 may be selected to commit a provisional request, as described later in this document, in reference to an alternate embodiment. The production schedule change illustrates the production run 1522 (e.g., first production run) as (impliedly) being removed from the production resource "X999AB" (e.g., first production resource) and added to production resource "X998AB" (e.g., second production resource).

Figure 14F:
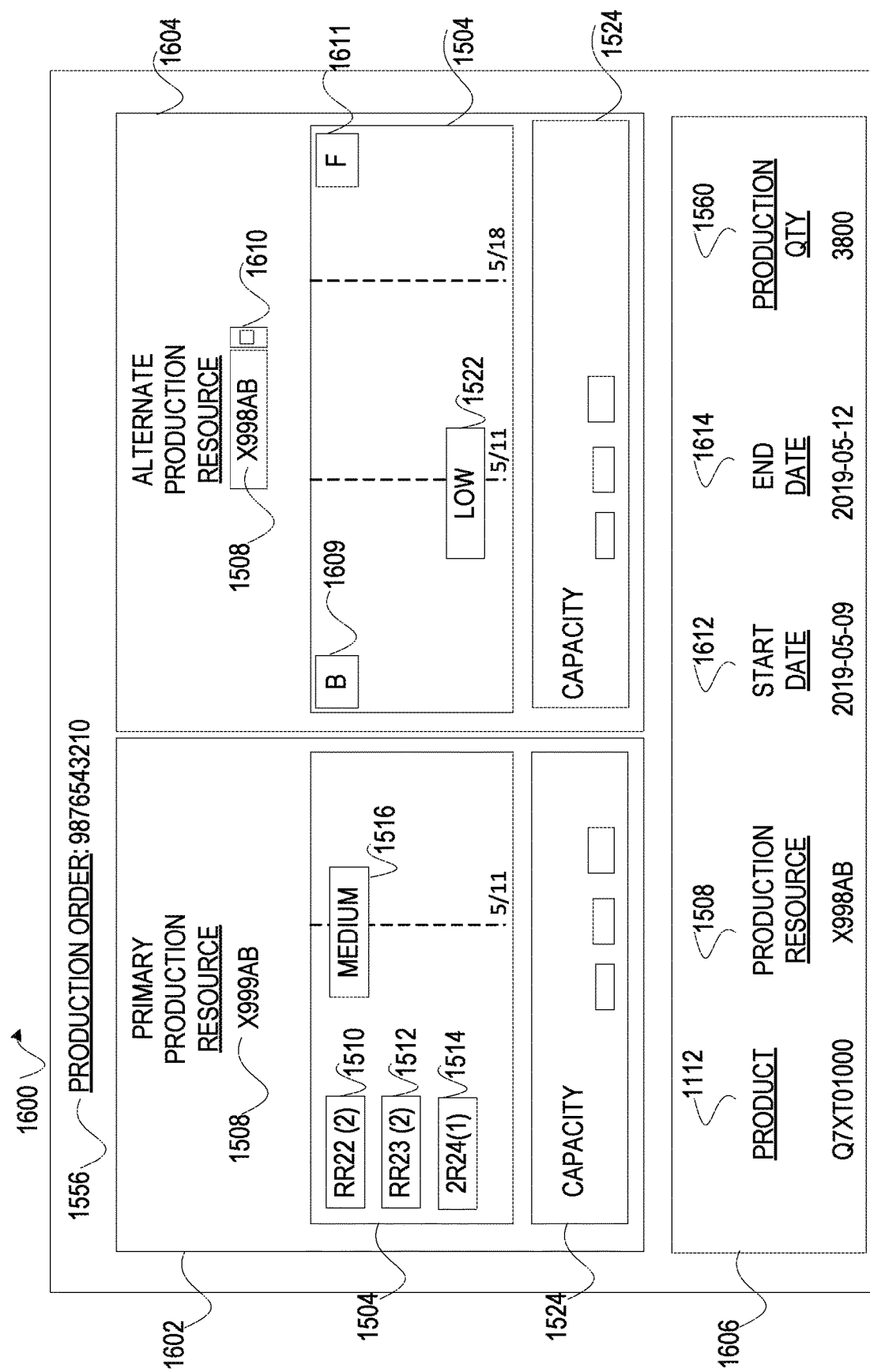
FIG. 14F illustrates the production order user interface, according to an embodiment.

FIG. 14F illustrates the production order user interface 1600, according to an embodiment. The production order user interface 1600 (e.g., eighth electronic user interface) may be presented at operation 514 in FIG. 5. The production order user interface 1600 in FIG. 14F displays the production schedule change illustrated in FIG. 14E. For example, the production run user interface 1500 in FIG. 14F illustrates the production run 1522 as being selected, dragged, and dropped into the alternate production panel 1604 causing the production run 1522 to not utilize the production resource "X999AB" (e.g., first production resource), but rather to utilize production resource "X998AB" (e.g., second production resource). In addition, the production run 1522 is associated with updated predicted supply chain operational metrics. For example, the updated predicted supply chain operational metrics include an updated value at risk ranking for the production run 1522 from "HIGH" to "LOW," an updated capacity metric in the capacity panel 1524 in the alternate production panel 1604 indicating an increase in the utilization of the production resource "X998AB" (see three histogram bars), and an updated capacity metric in the capacity panel 1524 in the primary production panel 1602 indicating a decrease in utilization of the production resource "X999AB" (see three histogram bars).

Alternate Embodiment

According to an alternate embodiment, the user does not perform a drag and drop gesture from the production order user interface 1600, as illustrated in FIG. 14D, but rather a "provisional drop and drag gesture" (not illustrated). Performing the "provisional drop and drag gesture" from the production order user interface 1600 does not immediately cause a change to the utilization of production resources (e.g., production run being run on different production resource). Rather, performance of the "provisional drop and drag gesture" is received by the access modules 228 and processed by the machine learning application 218 to cause the value at risk and other predicted supply chain operational metrics to be updated without causing the change to the utilization of the production resources. In this embodiment, performing the "provisional drop and drag gesture" enables the supply chain planners 230 to evaluate the impact of the contemplated action. In this embodiment, the user must further commit to causing the change to the utilization of the production resources (e.g., production run being run different production resource). For example, subsequent to performing the "provisional drop and drag gesture" the user must further select commit different resource request 1557 from the production schedule change user interface 1550, as illustrated on FIG. 14E, to cause the change to the utilization of the production resources (e.g., production run being run on different production resource). The production schedule change 1551 includes the "provisional drop and drag gesture" and the "commit different resource request 1557."

C.) Reschedule Production Run with a Different Quantity

In another embodiment, the production order user interface 1600, as illustrated in FIG. 14D, may be utilized to receive (e.g., first input) an updated production quantity 1560. For example, the production quantity 1560 may be changed from "3800" to "6000," causing a change to the utilization of the production resource "X999AB." For example, the production resource "X999AB" is utilized to produce "6000" products rather than "3800" products. Responsive to receiving the change in the production quantity 1560, the production schedule change user interface 1550 may be displayed with an updated production quantity 1560 value of "6000" and the predicted supply chain operational metrics updated. The production schedule change includes the production order identifier 1556, the product identifier 1112 (e.g., SKU), the production resource identifier 1508, the production date 1558, the production quantity 1560 that has been updated to "6000," and the remove request 1554. The production schedule change user interface 1550 includes the production schedule change 1551.

Alternate Embodiment

According to an alternate embodiment, the user does not update a production quantity 1560 from the production order user interface 1600, as illustrated in FIG. 14D, but rather a "provisional production quantity" (not illustrated). Receiving the "provisional production quantity" from the production order user interface 1600 does not immediately cause a change to the utilization of the production resource (e.g., production run on production resource with different quantity). Rather, receiving the "provisional production quantity" by the access modules 228 and processing the "provisional production quantity" by the machine learning application 218 causes the value at risk and other predicted supply chain operational metrics to be updated without causing the change to the utilization of the production resource. In this embodiment, receiving the "provisional production quantity" enables the supply chain planners 230 to evaluate the impact of the contemplated action. In this embodiment, the user must further commit to causing the change the utilization of the production resource (e.g., production run on production resource with different quantity). For example, subsequent to receiving the "provisional production quantity" the user must further select a "commit production quantity request" (not shown) from the production schedule change user interface 1550, as illustrated on FIG. 14E, to cause the change the utilization of the production resource (e.g., production run on production resource with different quantity). The production schedule change 1551 includes the "provisional production quantity" and the "commit production quantity request."

Figure 14G:
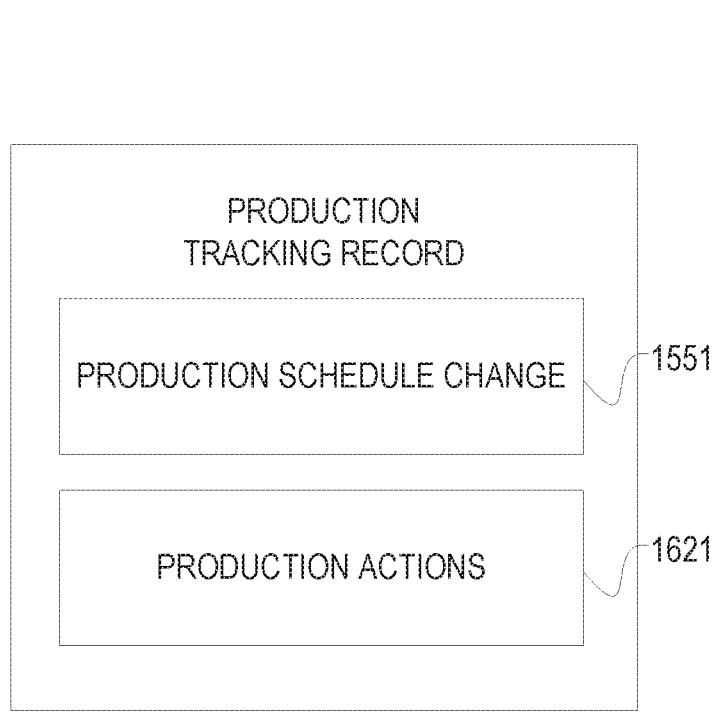
FIG. 14G illustrates a production tracking record, according to an embodiment.

FIG. 14G illustrates a production tracking record 1620, according to an embodiment. The production tracking record 1620 may be communicated to a planning system 208 responsive to the machine-learning application 218 receiving input that changes utilization of a production resource. The production tracking record 1620 includes the production schedule change 1551, as previously described, and the production actions 1621. The production actions 1621 describe a set of actions that may be performed by the machine-learning application 218 and/or the planning system 208 responsive to the machine-learning application 218 receiving input that changes utilization of one or more production resources in the supply chain 100. The production actions 1621 may include a sequence of actions impacting a delivery date of the product including a sequence of actions to reschedule a production (e.g., production run) of a product (e.g., lipstick, red) on a first production resource (e.g., third action), or a sequence of actions to reschedule a production of a product from the first production resource to a second production resource (e.g., fourth action), or a sequence of actions to increase a quantity of the production of the product on the first production resource (e.g., fifth action).

The production actions 1621 may include a sequence of actions to reschedule a production (e.g., production run) of a product (e.g., lipstick, red) on a production resource (e.g., first production resource) (e.g., third action) responsive to the machine-learning application 218 receiving input including a drag and drop gesture causing a rescheduling of a production run (e.g., first production run) on a production resource (e.g., first production resource), as illustrated in FIG. 14A, FIG. 14B, and FIG. 14C.

The production actions 1621 may include a sequence of actions to reschedule a production of a product from the first production resource to a second production resource (e.g., fourth action) responsive to the machine-learning application 218 receiving input including a drag and drop gesture causing a production run (e.g., first production run) to be removed from a production resource (e.g., first production resource) and added to a different production resource (e.g., a second production resource), as illustrated in FIG. 14D, FIG. 14E, and FIG. 14F.

The production actions 1621 may include a sequence of actions to increase a quantity of the production of the product on the first production resource (e.g., fifth action) responsive to the machine-learning application 218 receiving input causing a change to the utilization of the first production resource including receiving the input to cause an increase in a quantity of a product being produced in a production run (e.g., first production run), as illustrated in FIG. 14D. Finally, the production tracking record 1620 may be stored in the production database 216.

Figure 14H:
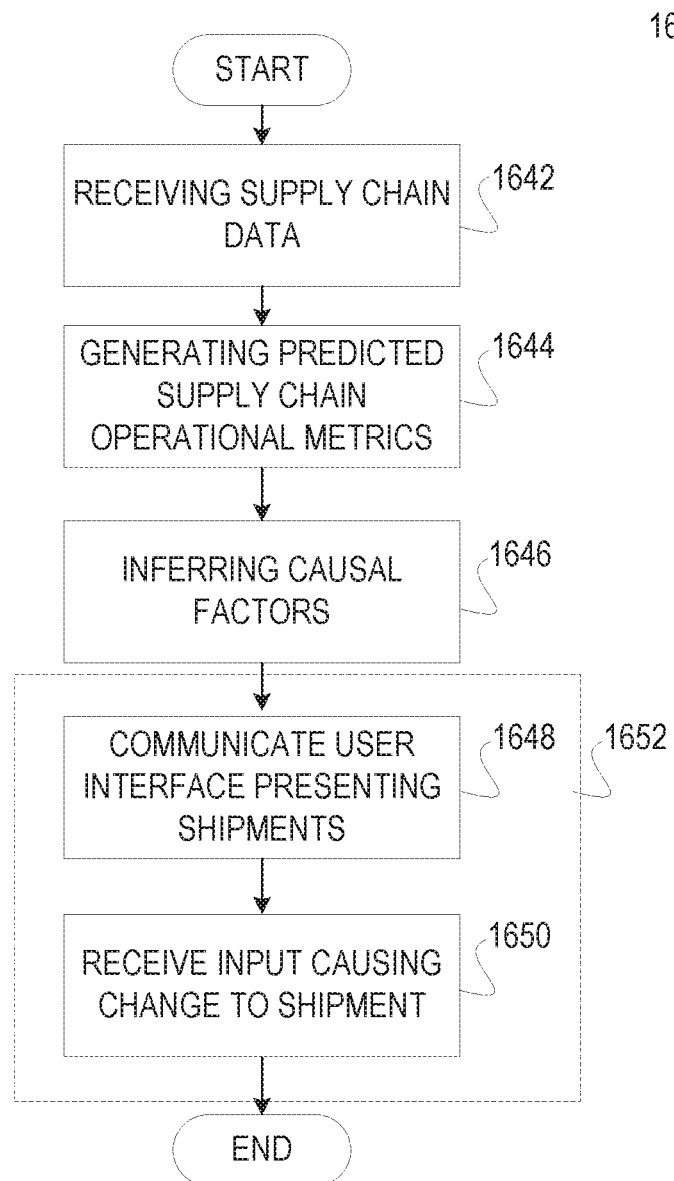
FIG. 14H illustrates a method, according to an embodiment, to control production resources in a supply chain.

FIG. 14H illustrates a method 1640, according to an embodiment, to control production resources in a supply chain 100. The method 1640 commences at operation 1642 with the machine-learning application 218, at the supply chain server machine 205, receiving supply chain data 306. For example, the machine-learning application 218 may receive the supply chain data 306 for delivery of a product. The supply chain data 306 may include input signals comprising operational plans and observed supply chain operational metrics, as previously described. The observed supply chain operational metrics is observed across the supply chain 100. The operation 1642 is described in further detail in operation 600 in FIG. 5.

At operation 1644, the machine-learning application 218 automatically generates the predicted supply chain operational metrics. For example, the machine-learning application 218 may use operational plans and observed supply chain operational metrics to generate the predicted supply chain operational metrics. The machine-learning application 218 automatically generates the predicted supply chain operational metrics across the nodes of the supply chain 100.

The predicted supply chain operational metrics may include a value at risk 1110 associated with a scheduling of a production run (e.g., first production run). For example, the scheduling of a production run may include the scheduling of a production of a product (e.g., first product) on a production resource (e.g., first production resource). The value at risk 1110 for the product identified by a product identifier 1112 (e.g., first product) may be displayed in the supply network planning user interface 1200, as illustrated on FIG. 12. Broadly, the predicted supply chain operational metrics include fill rate, service level, inventory metric, demand forecast, forecast attainment, the value at risk 1110, inventory holding costs, expedite costs and liquidation costs, and so forth. The predicted supply chain operational metrics are generated for at least one hierarchical level including the distribution center 108, the hub 106, the plant 104, the logistic center, the customer 110 (e.g., customer location) and a geographic location (e.g., California. North America, Europe, San Jose, Santa Clara County, and the like). The operation 1644 is described in further detail in the operations illustrated in FIG. 5, excluding operations 600, 516, and 518.

At operation 1646, the machine-learning application 218 automatically infers causal factors that impact the predicted supply chain operational metrics. The machine-learning application 218 utilizes the observed supply chain operational metrics to automatically infer the causal factors. The causal factors include but are not limited to a change to a utilization of the first production resource. The predicted supply chain operational metrics that are impacted include the value at risk 1110 associated with the scheduling of the first production run. For example, a value at risk 1110 for a product identified by a product identifier 1112 (e.g., first product) on a production resource (e.g., first production resource) may be impacted. The value at risk 1110 for the product (e.g., first product) on the production resource (e.g., first production resource) may be displayed in the supply network planning user interface 1200, as illustrated on FIG. 12, and updated in real-time. The operation 1646 is described in further detail in the operations illustrated in FIG. 5, excluding operations 600, 516, and 518.

At operation 1648, the machine-learning application 218 communicates, via the access applications 228 and over a network, a user interface for production runs scheduled on a production resource (e.g., first production resource). The user interface may include user interface elements (e.g., first user interface element) representing the scheduling of a production run (e.g., first production run). The scheduling of the production run may include a scheduling of a product (e.g., first product) for production with a production resource (e.g., first production resource). The user interface may be communicated to the client machine 203. The client machine 203 may be operated by supply chain planners 230. The user interface for presenting a scheduling of a production (e.g., first production run) may include the production run user interface 1500, as illustrated in FIG. 14A. For example, the production run user interface 1500 includes the user interface elements (e.g., first user interface element) representing the scheduling of the production run 1522 (e.g., first production run).

At operation 1650, the machine-learning application 218 receives input (e.g., first input) causing a change to a utilization of a production resource (e.g., first production resource). For example, the input may include selecting the production run 1522 from the production run user interface 1500, dragging the production run 1522 across the production run user interface 1500, and dropping the production run 1522 at another date/time the production run user interface 1500, as described in association with FIG. 14A, FIG. 14B, and FIG. 14C. Accordingly, the receiving the input causes a change to a utilization of a production resource by changing the date/time the production resource is utilized to produce a product. The change to the utilization of the production resource (e.g., first production resource) may impact the predicted supply chain operational metrics including a value at risk 1110. For example, changing the date/time the production resource (e.g., first production resource) is utilized to produce a product may impact the value at risk 1110 that is associated with the scheduling of the production run (e.g., first production run). An operation 1652 includes the operation 1648 and the operation 1650. The operation 1652 is described in further detail in FIG. 14I.

Figure 14I:
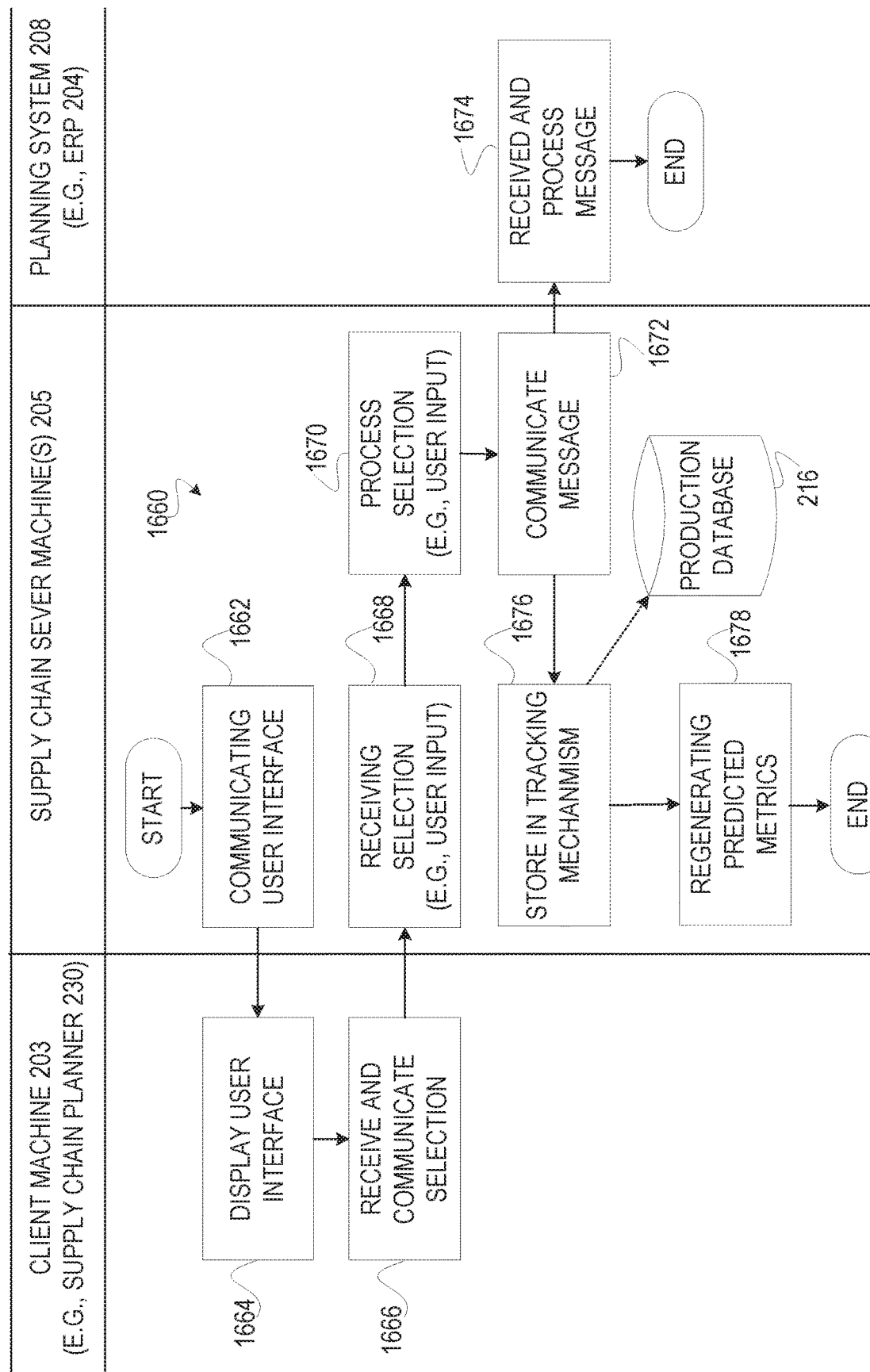
FIG. 14I is a block diagram illustrating a method, according to an embodiment, to present and process production resources.

FIG. 14I is a block diagram illustrating a method 1660, according to an embodiment, to present and process production resources. The method 1660 further describes operations performed in operations 514 and 516 of FIG. 5 and the operation 1652 in FIG. 14H. Illustrated on the left is the client machine 203; illustrated in the middle are one or more supply chain server machines 205; and illustrated on the right is the planning system 208 (e.g., enterprise resource planning system 204). The client machine 203 may be operated by a supply chain planner 230. The supply chain server machine 205 hosts the access applications 228, the machine-learning application 218, the machine-learning application trainer 224, and other applications, as illustrated in FIG. 2. The planning system 208 may include the enterprise resource planning system 204.

The method 1660 commences, at operation 1662, with the supply chain server machine 205 communicating an electronic user interface over a network (e.g., Internet) to the client machine 203. For example, the machine-learning application 218 may communicate the user interface, which may include the production run user interface 1500, as illustrated in FIG. 14A.

At operation 1664, the client machine 203 receives and displays the electronic user interface (e.g., production run user interface 1500). At operation 1666, the client machine 203 receives and communicates input via the electronic user interface. For example, the client machine 203 may receive input (e.g., first input) via the production run user interface 1500 (e.g., sixth electronic user interface).

At operation 1668, at the supply chain server machine 205, the machine learning application 218 receives the input, via the access applications 228, and at operation 1670, the machine learning application 218 processes the input. For example, the machine learning application 218 may process the input (e.g., first input) by causing a change to a utilization (e.g., first production run) of a production resource as described in association with FIG. 14A, FIG. 14B, and FIG. 14C. The machine learning application 218 processes the input to cause a sequence of actions that causing a change to a utilization (e.g., first production run) of a production resource (e.g., third action), as previously described. For example, the machine learning application 218 may processes one or more actions from the production actions 1621 in FIG. 14G.

At operation 1672, the machine learning application 218 communicates one or more messages to the planning system 208. The messages may include the production tracking record 1620, as illustrated in FIG. 14G. For example, the machine learning application 218 may initialize the production tracking record 1620, as illustrated in FIG. 14G, with the production schedule change 1551, as illustrated in FIG. 14B. In addition, the machine learning application 218 may initialize the production tracking record 1620 with production actions 1621 including a sequence of actions to reschedule a production (e.g., production run) of a product (e.g., first product) on a first production resource (e.g., third action).

At operation 1674, the planning system 208 receives and processes the message(s). According to one embodiment, the communicating the message(s) causes a change to the utilization of a production resource (e.g., first production resource) including a rescheduling of a production run (e.g., first production run) on a production resource (e.g., first production resource). For example, the planning system 208 may processes one or more actions from the production actions 1621 in FIG. 14G.

At operation 1676, the machine learning application 218 stores the production tracking record 1620 in a tracking mechanism (e.g., table) in the production database 216. At operation 1678, the machine-learning application 218 regenerates the predicted supply chain operational metrics as described in operation 518 on FIG. 5. Accordingly, the method 1660 is utilized to expedite an inbound shipment, as described above.

Second Embodiment—Reschedule Production Run on a Different Production Resource

In the second embodiment, the method 1660 is utilized to receive input (e.g., first input) via the production order user interface 1600, as illustrated on FIG. 14D, causing a change to the utilization of production resource (e.g., first production resource). For example, input may be received in the form of a drop and drag gesture causing a production run (e.g., first production run) to be removed from a production resource (e.g., first production resource) and added to an alternate production resource (e.g., second production resource), as in FIG. 14D, FIG. 14E and FIG. 14F. Further, in the second embodiment, the production tracking record 1620, as illustrated in FIG. 14G, is initialized with the production schedule change 1551, as illustrated in FIG. 14G, and production actions 1621. The production actions 1621 include a sequence of actions to reschedule a production of a product from the first production resource to a second production resource (e.g., fourth action). For example, the machine learning application 218 may processes one or more actions from the production actions 1621 in FIG. 14G. Further, the machine learning application 218 communicates the production tracking record 1620 to the planning system 208 that, in turn, causes the production run to be moved from the first production resource to the second production resource and the planning system 208 may processes one or more actions from the production actions 1621 in FIG. 14G.

Third Embodiment—Reschedule Production Run with a Different Quantity

In the third embodiment, the method 1660 is utilized to receive input (e.g., first input) via the production order user interface 1600, as illustrated on FIG. 14D, causing a change to the utilization of a production resource (e.g., first production resource). For example, the input may be received via the production quantity 1560 to cause an increase in a quantity of a product (e.g., first product) being produced in the production run 1522 (e.g., first production run) as illustrated in association with FIG. 14D. Further, in the third embodiment, the production tracking record 1620, as illustrated in FIG. 14G, is initialized with the production schedule change 1551, as illustrated in FIG. 14E, and production actions 1621. The production actions 1621 include a sequence of actions to increase a quantity of the production of the product on the first production resource (e.g., fifth action). For example, the machine learning application 218 may processes one or more actions from the production actions 1621 in FIG. 14G. Further, the machine learning application 218 communicates the production tracking record 1620 to the planning system 208 that, in turn, causes the quantity to be changed on the first production resource. For example, the planning system 208 may processes one or more actions from the production actions 1621 in FIG. 14G.

Figure 15:
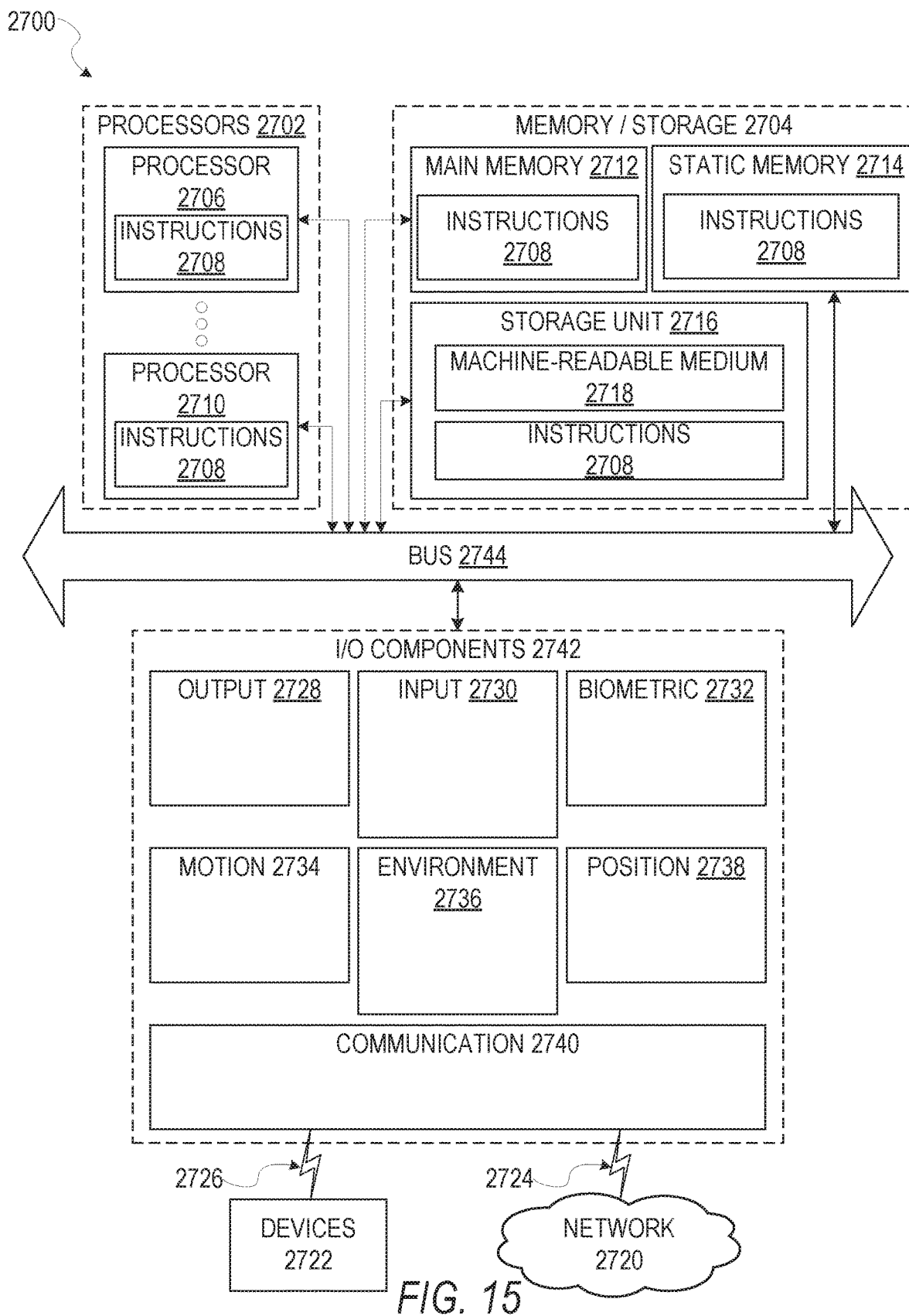
FIG. 15 is a diagrammatic representation of a machine, according to an embodiment.

FIG. 15 is a diagrammatic representation of a machine 2700 within which instructions 2708 (e.g., software, a program, an application, an applet, an app, or other executable code) for causing the machine 2700 to perform any one or more of the methodologies discussed herein may be executed. For example, the instructions 2708 may cause the machine 2700 to execute any one or more of the methods described herein. The instructions 2708 transform the general, non-programmed machine 2700 into a particular machine 2700 programmed to carry out the described and illustrated functions in the manner described. The machine 2700 may operate as a standalone device or may be coupled (e.g., networked) to other machines. In a networked deployment, the machine 2700 may operate in the capacity of a server machine or a client machine in a server-client network environment, or as a peer machine in a peer-to-peer (or distributed) network environment. The machine 2700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2708, sequentially or otherwise, that specify actions to be taken by the machine 2700. Further, while only a single machine 2700 is illustrated, the term "machine" shall also be taken to include a collection of machines that individually or jointly execute the instructions 2708 to perform any one or more of the methodologies discussed herein.

The machine 2700 may include processors 2702, memory/storage 2704, and I/O components 2742, which may be configured to communicate with each other via a bus 2744. In an example embodiment, the processors 2702 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a processor 2706 and a processor 2710 that execute the instructions 2708. The term "Processor" is intended to include multi-core processors that may comprise two or more independent processors (sometimes referred to as "cores") that may execute instructions contemporaneously. Although FIG. 15 shows multiple processors 2702, the machine 2700 may include a single processor with a single core, a single processor with multiple cores (e.g., a multi-core processor), multiple processors with a single core, multiple processors with multiples cores, or any combination thereof.

The memory/storage 2704 includes a main memory 2712, a static memory 2714, and a storage unit 2716, both accessible to the processors 2702 via the bus 2744. The main memory 2712, the static memory 2714, and storage unit 2716 store the instructions 2708 embodying any one or more of the methodologies or functions described herein. The instructions 2708 may also reside, completely or partially, within the main memory 2712, within the static memory 2714, within machine-readable medium 2718 within the storage unit 2716, within at least one of the processors 2702 (e.g., within the processor's cache memory), or any suitable combination thereof, during execution thereof by the machine 2700.

The I/O components 2742 may include a wide variety of components to receive input, provide output, produce output, transmit information, exchange information, capture measurements, and so forth. The specific I/O components 2742 that are included in a particular machine will depend on the type of machine. For example, portable machines such as mobile phones may include a touch input device or other such input mechanisms, while a headless server machine will likely not include such a touch input device. It will be appreciated that the I/O components 2742 may include many other components that are not shown in FIG. 15. In various example embodiments, the I/O components 2742 may include output components 2728 and input components 2730. The output components 2728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2742 may include biometric components 2732, motion components 2734, environmental components 2736, or position components 2738, among a wide array of other components. For example, the biometric components 2732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2734 include acceleration sensor components (e.g., accelerometer), gravitation sensor components, rotation sensor components (e.g., gyroscope), and so forth. The environmental components 2736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2738 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 2742 further include communication components 2740 operable to couple the machine 2700 to a network 2720 or devices 2722 via a coupling 2724 and a coupling 2726, respectively. For example, the communication components 2740 may include a network interface component or another suitable device to interface with the network 2720. In further examples, the communication components 2740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2722 may be another machine or any of a wide variety of peripheral devices (e.g., a peripheral device coupled via a USB).

Moreover, the communication components 2740 may detect identifiers or include components operable to detect identifiers. For example, the communication components 2740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2740, such as location via Internet Protocol (IP) geolocation, location via Wi-Fi® signal triangulation, location via detecting an NFC beacon signal that may indicate a particular location, and so forth.

Machine-Storage Media

The various memories (e.g., memory/storage 2704, main memory 2712, static memory 2714, and/or memory of the processors 2702) and/or storage unit 2716 may store one or more sets of instructions and data structures (e.g., software) embodying or used by any one or more of the methodologies or functions described herein. These instructions (e.g., the instructions 2708), when executed by the processors 2702, cause various operations to implement the disclosed embodiments. The instructions 2708 may also reside, completely or partially, within the main memory 2172, within the static memory 2714, within the storage unit 2716, within at least one of the processors 2702 (e.g., within the processor's cache memory), or any suitable combination thereof, during execution thereof by the machine 2700. Accordingly, the main memory 2172, the static memory 2714, the storage unit 2716, and at least one of the processors 2702 are examples of machine-storage media.

The instructions 2708 may be transmitted or received over the network 2720, using a transmission medium, via a network interface device (e.g., a network interface Component included in the communication components 2740) and using any one of a number of well-known transfer protocols (e.g., hypertext transfer protocol (HTTP)). Similarly, the instructions 2708 may be transmitted or received using a transmission medium via the coupling 2726 (e.g., a peer-to-peer coupling) to the devices 2722.

Transmission Medium

The term "signal medium" or "transmission medium" shall be taken to include any intangible medium that is capable of storing, encoding, or carrying the instructions 2708 for execution by the machine 2700, and includes digital or analog communications signals or other intangible media to facilitate communication of such software.

Machine-Readable Medium

The terms "machine-readable medium," "computer-readable medium" and "device-readable medium" mean the same thing and may be used interchangeably in this disclosure. The terms are defined to include both machine-storage media and transmission medium. Thus, the terms include both storage devices/media and carrier waves/modulated data signals.

Figure 16:
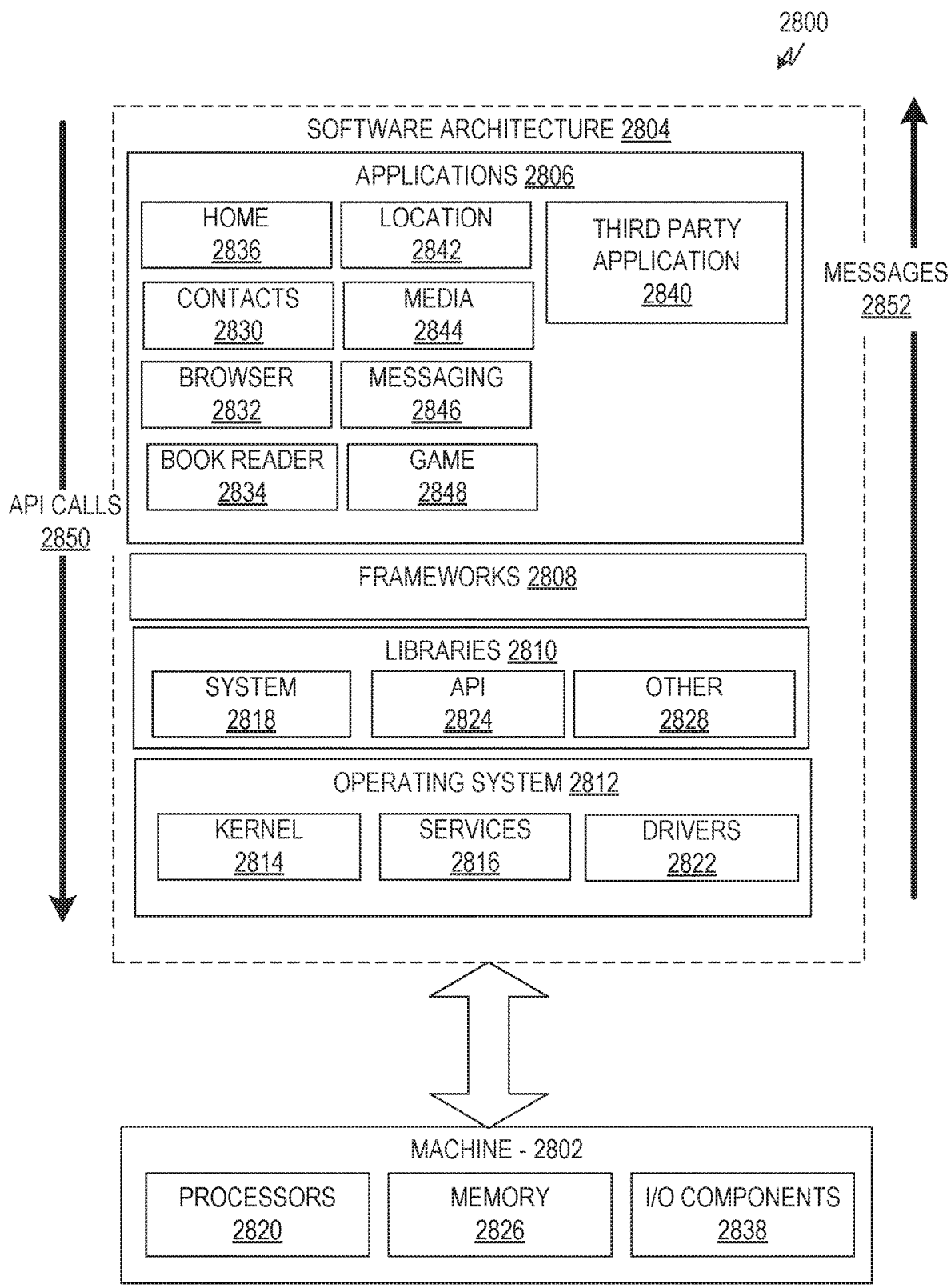
FIG. 16 is a block diagram illustrating a software architecture, according to an embodiment.

FIG. 16 is a block diagram 2800 illustrating a software architecture 2804, which can be installed on any one or more of the devices described herein. The software architecture 2804 is supported by hardware such as a machine 2802 that includes processors 2820, memory 2826, and I/O components 2838. In this example, the software architecture 2804 can be conceptualized as a stack of layers, where each layer provides a particular functionality. The software architecture 2804 includes layers such as an operating system 2812, libraries 2810, frameworks 2808, and applications 2806. Operationally, the applications 2806 invoke API calls 2850 through the software stack and receive messages 2852 in response to the API calls 2850.

The operating system 2812 manages hardware resources and provides common services. The operating system 2812 includes, for example, a kernel 2814, services 2816, and drivers 2822. The kernel 2814 acts as an abstraction layer between the hardware and the other software layers. For example, the kernel 2814 provides memory management, processor management (e.g., scheduling), component management, networking, and security settings, among other functionality. The services 2816 can provide other common services for the other software layers. The drivers 2822 are responsible for controlling or interfacing with the underlying hardware. For instance, the drivers 2822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 2810 provide a low-level common infrastructure used by the applications 2806. The libraries 2810 can include system libraries 2818 (e.g., C standard library) that provide functions such as memory allocation functions, string manipulation functions, mathematic functions, and the like. In addition, the libraries 2810 can include API libraries 2824 such as media libraries (e.g., libraries to support presentation and manipulation of various media formats such as Moving Picture Experts Group-4 (MPEG4). Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2810 can also include a wide variety of other libraries 2828 to provide many other APIs to the applications 2806.

The frameworks 2808 provide a high-level common infrastructure that is used by the applications 2806. For example, the frameworks 2808 provide various graphical user interface (GUI) functions, high-level resource management, and high-level location services. The frameworks 2808 can provide a broad spectrum of other APIs that can be used by the applications 2806, some of which may be specific to a particular operating system or platform.

In an example embodiment, the applications 2806 may include a home application 2836, a contacts application 2830, a browser application 2832, a book reader application 2834, a location application 2842, a media application 2844, a messaging application 2846, a game application 2848, and a broad assortment of other applications such as a third-party application 2840. The applications 2806 are programs that execute functions defined in the programs. Various programming languages can be employed to create one or more of the applications 2806, structured in a variety of manners, such as object-oriented programming languages (e.g., Objective-C, Java, or C++) or procedural programming languages (e.g., C or assembly language). In a specific example, the third-party application 2840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone. or another mobile operating system. In this example, the third-party application 2840 can invoke the API calls 2850 provided by the operating system 2812 to facilitate functionality described herein.

What is claimed is:

1. A system comprising:
one or more processors; and
a memory storing instructions that, when executed by the one or more processors, configures the one or more processors to perform operations comprising:
receiving supply chain data, the supply chain data including a plurality of input signals comprising operational plans and observed supply chain operational metrics, the observed supply chain operational metrics being observed across a supply chain;
automatically generating, using a machine learning application and the operational plans and the observed supply chain operational metrics, predicted supply chain operational metrics across a plurality of nodes of the supply chain including a value at risk that is predicted for a first product;
automatically inferring, using the machine learning application and the observed supply chain operational metrics, causal factors for shipping products including a first shipment of the first product, the causal factors impacting the predicted supply chain operational metrics, the first shipment including a first inbound shipment;
communicating, over a network, a user interface for shipments of the first product,
the user interface including an inbound shipments user interface for managing the supply chain,
the inbound shipments user interface including:
a window including the first inbound shipment of the first product in association with two or more metrics being displayed across a time horizon, the two or more metrics including two or more predicted supply chain operational metrics impacted by the first inbound shipment, the window being rolled responsive to a selection of a first user interface element to expose an earlier part of the time horizon in association with the first inbound shipment and the two or more metrics, the window being rolled responsive to a selection of a second user interface element to expose a later part of the time horizon in association with the first inbound shipment and the two or more metrics, the two or more metrics including a fill rate metric, a days of supply metric, a demand forecast attainment, error trends, a production capacity utilization, a critical path bill of material item lead-time, and a plurality of shortages to produce the product, and
one or more of the causal factors impacting the predicted supply chain operational metrics;
receiving a first input, over the network, the receiving the first input causing a change to a first shipment of the first product, the change to the first shipment of the first product impacting the predicted supply chain operational metrics including impacting the value at risk for the first product; and
communicating, over the network, an electronic message to a system based on the first input to expedite the first inbound shipment of the first product, the expediting of the first inbound shipment includes shipping the first product by a different mode of transportation.

2. The system of claim 1, wherein the different mode of transportation includes shipping of the first product by air.

3. The system of claim 1, wherein the user interface includes a reallocate outbound shipments user interface utilized to manage the supply chain and wherein the first shipment of the first product is presented on the reallocate outbound shipments user interface as an outbound shipment and wherein the causing the change to the first shipment of the first product includes causing a change to a first outbound shipment of the first product.

4. The system of claim 3, wherein the instructions further cause the one or more processors to perform operations further comprising receiving a second input, over the network, the receiving the second input causing a change to a second outbound shipment of the first product.

5. The system of claim 4, wherein the instructions further cause the one or more processors to perform operations further comprising: communicating, over the network, a second electronic message to the planning system causing a decrease in a shipment quantity of the first product for the second outbound shipment and an increase in a shipment quantity of the first product for the first outbound shipment.

6. A method comprising:
receiving supply chain data, the supply chain data including a plurality of input signals comprising operational plans and observed supply chain operational metrics, the observed supply chain operational metrics being observed across a supply chain;
automatically generating, using a machine learning application and the operational plans and the observed supply chain operational metrics, predicted supply chain operational metrics across a plurality of nodes of the supply chain including a value at risk that is predicted for a first product, the generating being performed by at least one processor;
automatically inferring, using the machine learning application and the observed supply chain operational metrics, causal factors for shipping products including a first shipment of the first product, the causal factors impacting the predicted supply chain operational metrics, the first shipment includes a first inbound shipment;
communicating, over a network, a user interface for shipments of the first product,
the user interface including an inbound shipments user interface for managing the supply chain,
the inbound shipments user interface including:
a window including the first inbound shipment of the first product in association with two or more metrics being displayed across a time horizon, the two or more metrics including two or more predicted supply chain operational metrics impacted by the first inbound shipment, the window being rolled responsive to a selection of a first user interface element to expose an earlier part of the time horizon in association with the first inbound shipment and the two or more metrics, the window being rolled responsive to a selection of a second user interface element to expose a later part of the time horizon in association with the first inbound shipment and the two or more metrics, the two or more metrics including a fill rate metric, a days of supply metric, a demand forecast attainment, error trends, a production capacity utilization, a critical path bill of material item lead-time, and a plurality of shortages to produce the product, and
one or more of the causal factors impacting the predicted supply chain operational metrics;
receiving a first input, over the network, the receiving the first input causing a change to a first shipment of the first product, the change to the first shipment of the first product impacting the predicted supply chain operational metrics including impacting the value at risk for the first product; and
communicating, over the network, an electronic message to a planning system based on the first input to expedite the first inbound shipment of the first product, wherein the expediting of the first inbound shipment includes shipping the first product by a different mode of transportation.

7. The method of claim 6, wherein the different mode of transportation includes shipping of the first product by air.

8. The method of claim 6, wherein the causal factors for shipping products include causal factors for variability, a value at risk for a shipping method, a value at risk for a quantity of inventory, and a value at risk for a transportation route, and a value at risk for a vendor.

9. The method of claim 6, wherein the user interface includes a reallocate outbound shipments user interface utilized to manage the supply chain and wherein the first shipment of the first product is presented on the reallocate outbound shipments user interface as an outbound shipment and wherein the causing the change to the first shipment of the first product includes causing a change to a first outbound shipment of the first product.

10. The method of claim 9, further comprising receiving a second input, over the network, the receiving the second input causing a change to a second outbound shipment of the first product.

11. The method of claim 10, further comprising:
communicating, over the network, a second electronic message to the planning system causing a decrease in a shipment quantity of the first product for the second outbound shipment and an increase in a shipment quantity of the first product for the first outbound shipment.

12. A non-transitory machine-readable medium, the machine-readable medium including instructions that when executed by a computer, cause the computer to perform operations comprising:

receiving supply chain data, the supply chain data including a plurality of input signals comprising operational plans and observed supply chain operational metrics, the observed supply chain operational metrics being observed across a supply chain;

automatically generating, using a machine learning application and the operational plans and the observed supply chain operational metrics, predicted supply chain operational metrics across a plurality of nodes of the supply chain including a value at risk that is predicted for a first product, the generating being performed by at least one processor;

automatically inferring, using the machine learning application and the observed supply chain operational metrics, causal factors for shipping products including a first shipment of the first product, the causal factors impacting the predicted supply chain operational metrics, the first shipment includes a first inbound shipment;

communicating, over a network, a user interface for shipments of the first product,
the user interface including an inbound shipments user interface for managing the supply chain,
the inbound shipments user interface including:
a window including the first inbound shipment of the first product in association with two or more metrics being displayed across a time horizon, the two or more metrics including two or more predicted supply chain operational metrics impacted by the first inbound shipment, the window being rolled responsive to a selection of a first user interface element to expose an earlier part of the time horizon in association with the first inbound shipment and the two or more metrics, the window being rolled responsive to a selection of a second user interface element to expose a later part of the time horizon in association with the first inbound shipment and the two or more metrics, the two or more metrics including a fill rate metric, a days of supply metric, a demand forecast attainment, error trends, a production capacity utilization, a critical path bill of material item lead-time, and a plurality of shortages to produce the product, and
one or more of the causal factors impacting the predicted supply chain operational metrics;

receiving a first input, over the network, the receiving the first input causing a change to a first shipment of the first product, the change to the first shipment of the first product impacting the predicted supply chain operational metrics including impacting the value at risk for the first product; and communicating, over the network, an electronic message to a planning system based on the first input to expedite the first inbound shipment of the first product, wherein the expediting of the first inbound shipment includes shipping the first product by a different mode of transportation.

13. The non-transitory machine-readable medium of claim 12, wherein the different mode of transportation includes shipping of the first product by air.

* * * * *